(12) United States Patent
Jang et al.

(10) Patent No.: US 11,381,175 B2
(45) Date of Patent: Jul. 5, 2022

(54) AC-DC POWER CONVERSION SYSTEMS WITH EXTENDED VOLTAGE GAIN

(71) Applicant: DELTA ELECTRONICS, INC., Neihu (TW)

(72) Inventors: Yungtaek Jang, Cary, NC (US); Tomas Sadilek, Durham, NC (US); Peter Barbosa, Durham, NC (US)

(73) Assignee: DELTA ELECTRONICS, INC., Neihu (TW)

( * ) Notice: Subject to any disclaimer, the term of this patent is extended or adjusted under 35 U.S.C. 154(b) by 0 days.

(21) Appl. No.: 16/885,060

(22) Filed: May 27, 2020

(65) Prior Publication Data

US 2021/0376754 A1    Dec. 2, 2021

(51) Int. Cl.
*H02M 7/219*       (2006.01)
*H02M 1/00*        (2006.01)
(Continued)

(52) U.S. Cl.
CPC ............ *H02M 7/219* (2013.01); *G05F 1/595* (2013.01); *H02M 1/0095* (2021.05);
(Continued)

(58) Field of Classification Search
CPC ............ H02M 7/00; H02M 7/02; H02M 7/04; H02M 7/05; H02M 7/10; H02M 7/103; H02M 7/106; H02M 7/155; H02M 7/1552; H02M 7/1555; H02M 7/1557; H02M 7/162; H02M 7/1623; H02M 7/1626;
(Continued)

(56) References Cited

U.S. PATENT DOCUMENTS 6,825,624 B2   11/2004  Anwar et al.
8,201,897 B2   6/2012   Bell et al.
(Continued)

FOREIGN PATENT DOCUMENTS

CN       109842287 A    *   6/2019

OTHER PUBLICATIONS

English translation of CN-109842287-A (Year: 2019).*
(Continued)

*Primary Examiner* — Thienvu V Tran
*Assistant Examiner* — Carlos O Rivera-Perez
(74) *Attorney, Agent, or Firm* — VLP Law Group, LLP; Edward C. Kwok

(57) ABSTRACT

An AC-DC power conversion system provides extended voltage gain characteristic by virtue of controlling a duty cycle of operation associated with the desired input-to-output gain. The AC-DC power conversion system includes an AC-stage, first and second inductors, first and second voltage-doubler stages, a totem-pole rectifier stage, and a DC-stage coupled across the totem-pole rectifier stage. Each voltage-doubler stage includes a first terminal, a second terminal, and a third terminal, wherein a first terminal of the AC-stage is coupled by the first inductor to the first terminal of each voltage-doubler stage and by the second inductor to the third terminal of each voltage-doubler stage. The totem-pole rectifier stage includes first and second terminals coupled, respectively, to the second terminal of the first voltage-doubler stage and the second terminal of the second voltage-doubler stage.

24 Claims, 56 Drawing Sheets

(51) Int. Cl.
  *G05F 1/595* (2006.01)
  *H02M 1/42* (2007.01)
  *H02M 7/10* (2006.01)
  *H02M 7/797* (2006.01)

(52) U.S. Cl.
  CPC .......... *H02M 1/4233* (2013.01); *H02M 7/10* (2013.01); *H02M 7/797* (2013.01); *H02M 1/0003* (2021.05)

(58) Field of Classification Search
  CPC .......... H02M 7/17; H02M 7/19; H02M 7/217; H02M 7/2173; H02M 7/219; H02M 7/2195; H02M 7/23; H02M 7/25; H02M 7/66; H02M 7/68; H02M 7/757; H02M 7/77; H02M 7/79; H02M 7/797; H02M 7/81; H02M 1/42; H02M 1/4208; H02M 1/4216; H02M 1/4225; H02M 1/4233; H02M 1/4241; H02M 1/4258; H02M 1/4283; H02M 1/0003; H02M 1/0043; H02M 1/0083; H02M 1/0085; H02M 1/0095; H02M 1/483–4837; H02M 1/487; H02M 1/0054; H02M 7/4835; G05F 1/595
  USPC ...... 363/15–17, 21.02, 21.03, 44–48, 59–61, 363/65, 67–70, 123–127; 323/205, 323/207–211
  See application file for complete search history.

(56) References Cited

U.S. PATENT DOCUMENTS 9,236,828 B1   1/2016   Wei et al.
9,318,976 B1   4/2016   Wei et al.

OTHER PUBLICATIONS

Hiti, Silva, et al., "Zero vector modulation method for voltage source inverter operating near zero output frequency", Conference Record of the 2004 IEEE Industry Applications Conference, 2004. 39th IAS Annual Meeting., Seattle, WA, USA, 2004, pp. 171-176.
"Extended Search Report, European Patent Application 21175617. 6", dated Sep. 29, 2021, 14 pages.
Jang, Yungtaek, et al., "Interleaved Boost Converter With Intrinsic Voltage-Doubler Characteristic for Universal-Line PFC Front End", IEEE Transactions on Power Electronics, Institute of Electrical and Electronics Engineers, USA, vol. 22, No. 4, Jul. 2007, pp. 1394-1401.
Lee, Fred C., et al., "Application of GaN devices for 1 kW server power supply with integrated magnetics", CPSS Transactions on Power Electronics and Applications, vol. 1, No. 1, Dec. 2016, pp. 3-12.
Monteiro, Vitor, et al., "A novel concept of unidirectional bridgeless combined boost-buck converter for EV battery chargers", 2015 IEEE 24th International Symposium on Industrial Electronics (ISIE), IEEE, Mar. 3, 2015, pp. 190-195.
Valipour, Hamed, et al., "Extended Range Bridgeless PFC Converter With High-Voltage DC Bus and Small nducto", IEEE Transactions on Power Electronics, Institute of Electrical and Electronics Engineers, USA, vol. 36, No. 1,, Jan. 2021, pp. 157-173.

* cited by examiner

AC-DC POWER CONVERSION SYSTEMS WITH EXTENDED VOLTAGE GAIN

BACKGROUND OF THE INVENTION

1. Field of the Invention

The present invention generally relates to power conversion systems. More particularly, the present invention relates to bidirectional AC-DC power conversion systems with extended voltage gain.

2. Discussion of the Prior Art

AC-DC power conversion systems are widely used in various applications, including variable-speed drives, switched-mode power supplies, and battery chargers for electric vehicles. AC-DC converters date back to uncontrolled diode rectifiers with unidirectional power flow and controllable thyristor-type rectifiers with bidirectional power flow capability. Modern rectifiers are developed to overcome significant power quality issues arising from the highly distorted currents from the AC power grid and their poor power factor. The rectifiers operated at line frequency, which resulted in large input filter sizes and slow dynamics Modern power semiconductor devices, such as metal-oxide-semiconductor field-effect transistors (MOSFETS) and insulated-gate bipolar transistors (IGBTS), make performance improvement in AC-DC power conversion possible. The single-switch boost power converter, for example, is widely used and has an inherent power conversion stage that help comply with power quality standards. However, even though active power-factor correction (PFC) has improved the single-switch boost rectifier, the power loss is still high due to conduction losses in the input diode rectifiers. As a result, significant research has led to input diode-free converters with increased efficiency. Such advances in PFC circuits are known as bridge-less topologies, and they represent the state-of-the-art in AC-DC converters.

FIG. 1 shows totem-pole boost converter 100, which is an example of a bridge-less PFC topology. As shown in FIG. 1, totem-pole boost converter 100 includes two half-bridge legs operating at line frequency. The two half-bridge legs are each connected in a totem-pole configuration: (a) a first half-bridge leg being formed by high-frequency switches $S_1$ and $S_2$ and (ii) the other half-bridge leg being formed by diodes $D_1$ and $D_2$, The bridge-less totem-pole topology ensures a reduced conduction loss relative to a conventional boost PFC circuit, as there are only two semiconductor elements in the current path at any given time, instead of three semiconductor elements in the current path. In the prior art, IGBTS with fast recovery antiparallel diodes have been used to implement totem-pole PFC circuits. In contrast, silicon MOSFETS have not been used because each silicon MOSFET has an anti-parallel diode that presents a severe reverse recovery loss.

With their negligible or non-existent reverse recovery loss, wide-bandgap devices have enabled more common use of the totem-pole configuration in AC-DC converters. In AC-DC converters, as the totem-pole DC output voltage is higher than the peak AC input voltage, the minimum voltage gain is limited to one. In applications where the input voltage is very low, controlled switches $S_1$ and $S_2$ must operate at an excessively high duty-cycle to regulate DC output voltage $V_O$, which increases conduction losses and reduces circuit efficiency. Hence, there is a need for a PFC circuit with an extended voltage gain. Additionally, to operate totem-pole boost converter 100 of FIG. 1 in a bidirectional power-flow mode, diodes $D_1$ and $D_2$ of the half-bridge leg are replaced with controlled switches (i.e., synchronous rectifiers). Furthermore, some applications require a higher gain in the regulated DC output voltage, especially when the PFC circuit operates under a low AC input voltage. One way to achieve the extended voltage gain is illustrated in FIG. 2 by AC-DC boost converter 200, which exemplifies a half-bridge PFC topology. AC-DC boost converter 200 has the advantage that, at any given time, only one of switches $S_1$ and $S_2$ is in the input current path, which further reduces conduction losses. AC-DC boost converter 200 has another advantage in a low input voltage application in which the DC output voltage is at least twice the peak AC input voltage. In that application, AC-DC boost converter has a voltage-doubler characteristic not achievable in the totem-pole PFC topology. However, AC-DC boost converter 200 has a significant drawback in that its output capacitor is much larger than the output capacitor of either the totem-pole PFC circuit of FIG. 1 or a conventional boost PFC converter, as the output capacitors of AC-DC boost converter 200 charge during one half-cycle of the input line voltage and discharge during the other half-cycle. Long periods for charging and discharging require the output capacitors of AC-DC boost converter 200 to store significantly more energy in order to limit the fluctuations around its DC voltage.

FIG. 3 shows two-switch, two-inductor, step-up DC-DC power converter 300, which illustrates a DC-DC voltage-doubler boost topology. DC-DC power converter 300 achieves a DC output voltage gain using a cascaded configuration. Unlike the totem-pole configuration of FIG. 2, in DC-DC converter 300, capacitors C and $C_B$ are charged and discharged on a switching cycle basis, which reduces significantly both the need for energy storage and the output capacitance required to limit DC output voltage ripples. By interleaving main switches $S_1$ and $S_2$, input current ripples are canceled, which considerably reduces the required size of the input filter. However, the DC-DC topology of FIG. 3 cannot be used for bidirectional AC-DC applications.

As the duty-cycle of a conventional boost PFC converter has to be maximized to achieve a high voltage gain between the AC input voltage and the DC output voltage, the switch conduction time is maximized, thereby increasing conduction losses and lowering converter efficiency. Therefore, there exists a need for a power conversion system that includes multiple stages to provide power conversion efficiency, even at a higher voltage gain.

SUMMARY

According to one embodiment of the present invention, an AC-DC power conversion system has extended voltage gain characteristics by virtue of controlling a duty cycle of operation associated with the desired input-to-output gain. The AC-DC power conversion system facilitates seamless transfer of power, in either direction, between an AC port and a DC port. The AC-DC power conversion system can be a bidirectional AC-DC power conversion system.

One embodiment of the present invention provides an AC-DC power conversion system that includes an AC-stage, first and second inductors, first and second voltage-doubler stages, a totem-pole rectifier stage, and a DC-stage coupled across the totem-pole rectifier stage. The AC-stage includes first and second terminals. Each voltage-doubler stage includes a first terminal, a second terminal, and a third terminal, wherein the first terminal of the AC-stage is coupled by the first inductor to the first terminal of each voltage-doubler stage and by the second inductor to the third terminal of each voltage-doubler stage. The totem-pole rectifier stage includes first and second terminals coupled, respectively, to the second terminal of the first voltage-doubler stage and the second terminal of the second voltage-doubler stage.

In one embodiment, the totem-pole rectifier stage includes first and second half-bridge legs each including first and second components serially connected at a common terminal, wherein the second terminal of the AC-stage is coupled to the common terminal of the second half-bridge leg, and the common terminal of the first half-bridge leg is coupled to the third terminal of each voltage-doubler stage.

In one embodiment, each voltage-doubler stage includes a capacitor and first, second, and third switches, wherein the first and second switches of the voltage-doubler stage are connected in series across the first and second terminals of the voltage-doubler stage, and the first and second switches of the voltage-doubler stage are connected at a common node, and wherein the third switch and the capacitor of the voltage-doubler stage are connected in series between the common node and the third terminal of the voltage-doubler stage.

In one embodiment of the present invention, a bidirectional AC-DC power conversion system includes two voltage-doubler stages that augment a totem-pole rectifier stage or inverter configuration in conjunction with two inductors. The AC-DC power conversion system performs active power factor correction (PFC) during power transfers from AC port to a DC port and achieves extended voltage gain characteristic and enhanced current ripple cancellation, without requiring wide duty-cycle variations. During power transfers from the DC port to the AC port, the AC-DC power conversion system realizes a sine-wave voltage or current inversion. The extended voltage gain characteristics enable the AC-DC power conversion system to deliver a low voltage to the AC port, during power transfers from the DC port to the AC port. As a result, the AC-DC power conversion system of the present invention is particularly applicable to low AC-voltage applications, when compared to conventional inverters.

According to one embodiment of the present invention, a pre-charge and balancing resistive network circuit is provided in each voltage-doubler stage to equalize the voltage across the storage capacitor of the voltage-doubler stage, before the switches in the voltage-doubler stage are activated, thereby ensuring safe operation in the AC-DC power conversion system.

For high-power applications, the bidirectional AC-DC power conversion system may include voltage-doubler stages forming any suitable number of phase-symmetrical legs of a totem-pole rectifier, so as to distribute voltage and current stresses among the switches, inductors, and capacitors of the bidirectional AC-DC power conversion system. In one embodiment, each phase-symmetrical leg includes two voltage-doubler stages, and an inductor. In that embodiment, the phase-symmetrical legs operate in conjunction with a single totem-pole rectifier phase leg formed by synchronous rectifiers. Within each phase-symmetrical leg, each voltage-doubler stage includes a first terminal, a second terminal, a third terminal, a first switch, a second switch, a third switch, and a storage capacitor. The first and second switches are connected in series between the first and second terminals, and the first and second switches are connected at a common node. The third switch and the storage capacitor of the voltage-doubler stage are connected in series between the common node and the third terminal of the voltage-doubler stage. The first terminal of each voltage-doubler stage of a phase-symmetrical leg is connected by its associated inductor to one terminal the AC port, and the third terminal of each voltage stage of the phase-symmetrical leg is connected by another inductor to either another phase-symmetrical leg or the single totem-pole phase leg.

Another embodiment of the present invention provides an AC-DC power conversion system that includes an AC-stage, first, second, and third inductors, first and second voltage-doubler stages, a totem-pole rectifier stage, and a DC-stage coupled across the totem-pole rectifier stage. The AC-stage includes a switching element and first, second, third, and neutral terminals. Each of the first and second voltage-doubler stages includes a first terminal, a second terminal, and a third terminal. The totem-pole rectifier stage includes first and second half-bridge legs. Each half-bridge leg is connected between the second terminal of the first voltage-doubler stage and the second terminal of the second voltage-doubler stage and includes first and second components serially connected at a common terminal. The DC-stage includes first and second serially connected capacitors connected at a common terminal.

In one embodiment, the switching element has first and second configurations. In the first configuration, the first terminal of the AC-stage is coupled by the first inductor to the first terminal of each voltage-doubler stage and by the second inductor to both the third terminal of each voltage-doubler stage and the common terminal of the first half-bridge leg, and the neutral terminal is coupled to the common terminal of the second half-bridge leg. In the second configuration, the first terminal of the AC-stage is coupled by the first inductor to the first terminal of each voltage-doubler stage, the second terminal of the AC-stage is coupled by the second inductor to the common terminal of the first half-bridge leg, the third terminal of the AC-stage is coupled by the third inductor to the common terminal of the second half-bridge leg, and the neutral terminal is coupled to the common terminal of the DC-stage.

According to another embodiment of the present invention, a bidirectional AC-DC power conversion system may be configured by a relay switch to connect to either a single-phase-to-neutral AC port or a three-phase-to-neutral AC port. The flexibility allows the bidirectional AC-DC power conversion system to operate with both single-phase and three-phase sources. A bidirectional switch connected in series with a storage capacitor in each voltage-doubler stage of the phase-symmetrical legs may further enhance performance. The present invention is better understood upon consideration of the detailed description below in conjunction with the accompanying drawings.

DETAILED DESCRIPTION OF THE PREFERRED EMBODIMENTS

Figure 1:
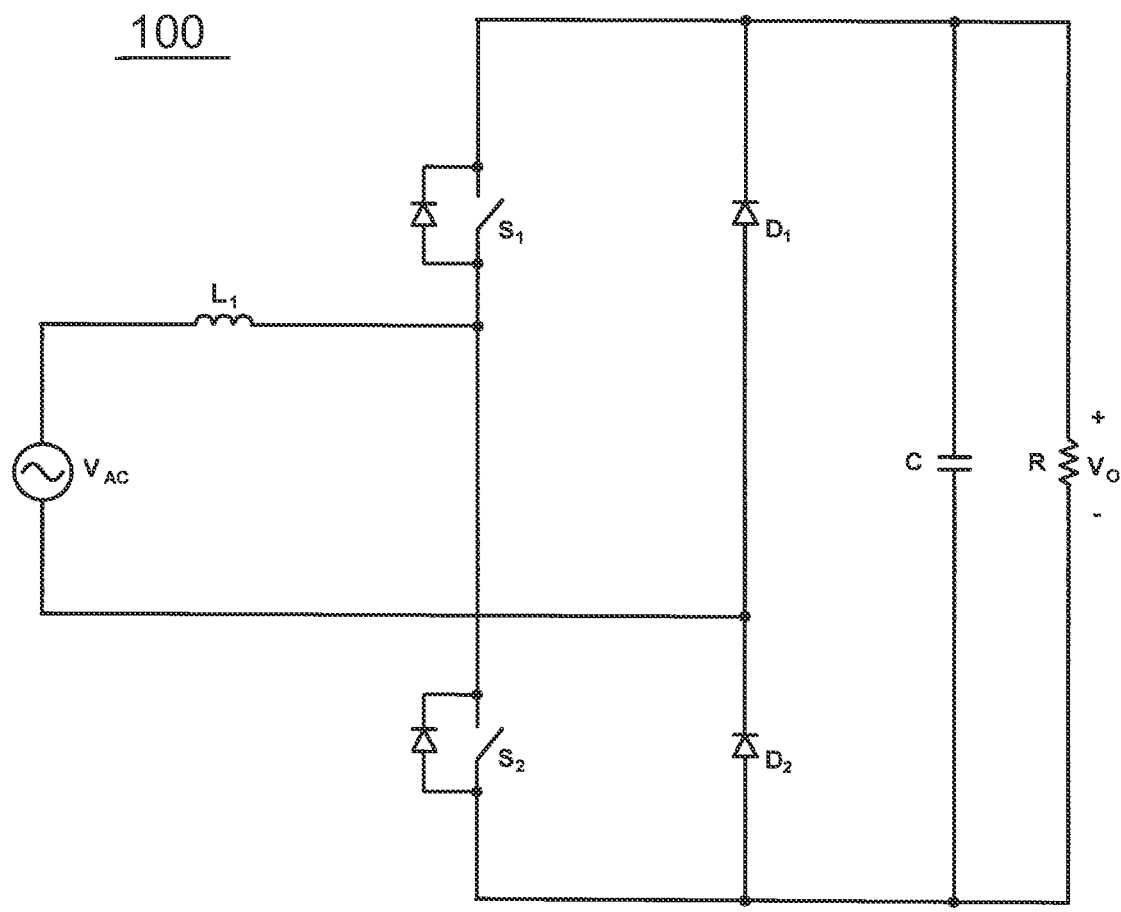
FIG. 1 shows totem-pole boost converter 100, which is an example of a bridge-less PFC topology.

According to one embodiment of the invention, a bidirectional power conversion system provides both power-factor correction (PFC) of an AC input signal or power, and extended input-to-output voltage gain, when the system delivers energy from the AC input voltage to a DC output voltage. The bidirectional power conversion system also provides a sinusoidal voltage or current as an AC output signal, with an extended input-to-output voltage gain, when the system delivers energy from a DC input voltage to an AC output voltage. The power conversion system of the present invention is suitable for applications in which energy is transferred between a high-voltage DC port and a low-voltage AC port because of the extended voltage gain characteristics.

In one of embodiment, a PFC power conversion system with an extended-gain uses a totem-pole rectifier stage, coupled with two voltage-doubler stages. Each of the voltage-doubler stage may include two series-connected switches that operate at the operating frequency of the power conversion system, a line-frequency switch that operates at line frequency of the AC voltage source, and an energy storage capacitor. The line-frequency switch is coupled between the energy storage capacitor and the common terminal between the two series-connected switches. The voltage-doubler stages share a common boost inductor that is coupled between the AC voltage source and a junction point of the voltage-doubler stages. The junction point between the storage capacitors of the voltage-doubler stages is coupled to the common terminal between the synchronized rectifiers of the totem-pole rectifier stage.

In other embodiments, a power conversion system of the present invention includes multiple phase-symmetrical legs each having two voltage-doubler stages, so as to operate in an interleaved manner in high-power applications.

FIGS. 4-21 illustrate various extended-gain PFC or inverter power conversion systems and selected voltage, current, and switch-activation control signal waveforms of their operations, in accordance with one embodiment of the present invention. An extended-gain PFC power conversion system of the present invention may also operate as a DC-to-AC inverter, when a DC source is coupled to the DC-side and an AC load is coupled to the AC-side. Because of its extended gain characteristics, an extended-gain PFC power conversion system of the present invention may deliver a regulated low AC voltage from a high DC voltage.

FIGS. 22-50 illustrate various extended-gain bidirectional PFC or inverter power conversion systems of this invention and selected voltage, current, and switch-activation control signal waveforms, in accordance with one embodiment of the present invention.

FIGS. 51-56 illustrate various extended-gain bidirectional PFC or inverter power conversion systems of the present invention, each using additional relay switches to operate with either a single-phase AC voltage source or a three-phase AC voltage source. These extended-gain power conversion systems of the present invention are suitable for applications operating between a DC battery and either a single-phase AC voltage source or a three-phase AC voltage source.

Figure 4:
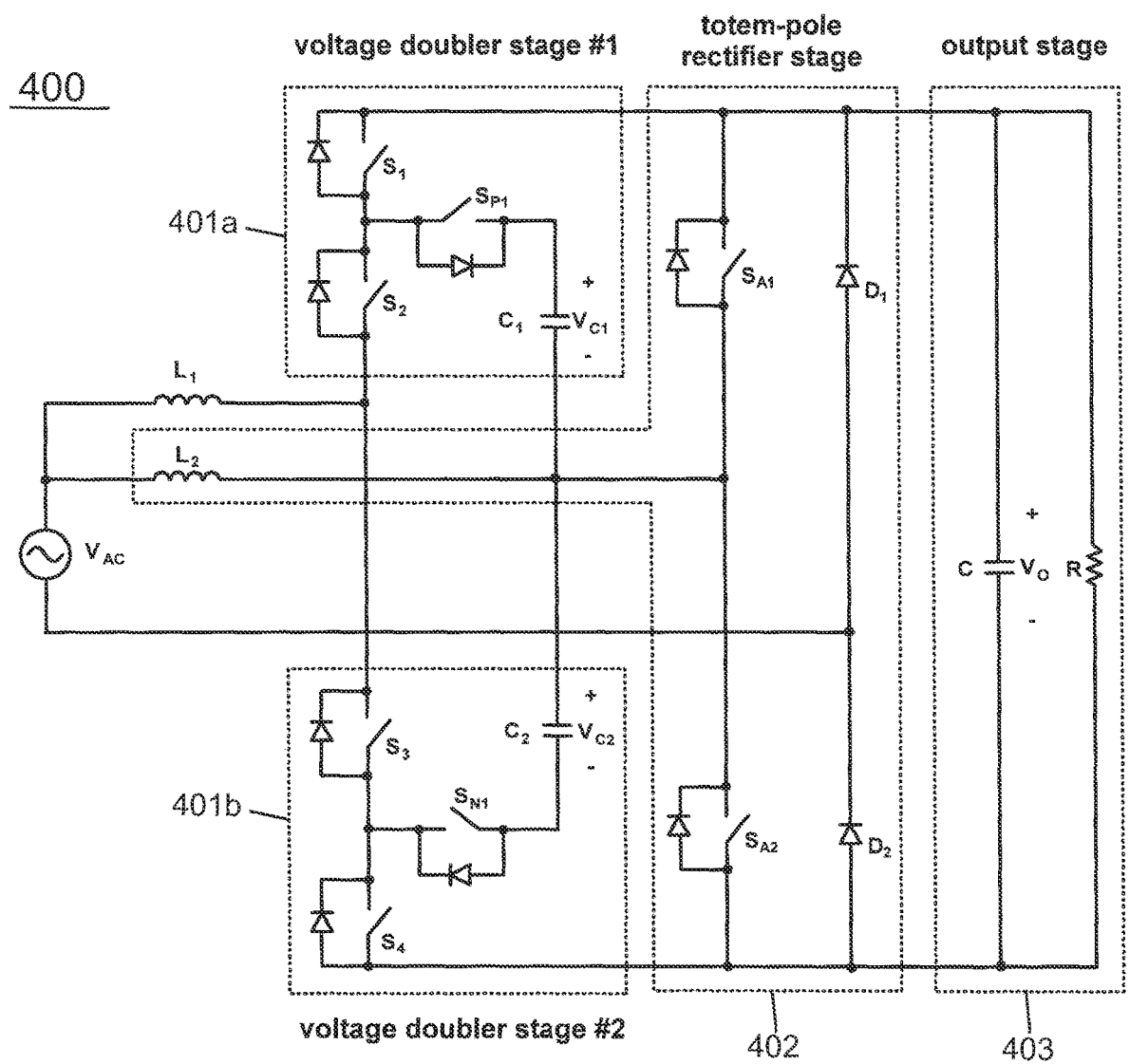
FIG. 4 shows AC-DC power conversion system 400 with an extended voltage gain, according to one embodiment of the present invention.

FIG. 4 shows AC-DC power conversion system 400 with an extended voltage gain, according to one embodiment of the present invention. As shown in FIG. 4, AC-DC power conversion system 400 includes an AC-stage, inductor $L_1$, voltage-doubler stages 401a and 401b, totem-pole rectifier stage 402, and DC-stage 403. DC-stage 403 includes an output stage 403. The AC-stage includes first and second terminals. AC-DC power conversion system 400 couples an AC voltage source that provides AC voltage $V_{AC}$ to DC-stage 403, which includes output capacitor C across output load R via the totem-pole rectifier stage 402 formed by diodes $D_1$ and $D_2$, and switches $S_{A1}$ and $S_{A2}$, and boost inductor $L_2$. Voltage-doubler stages 401a and 401b each include a first terminal, a second terminal, and a third terminal, wherein the first terminal of the AC-stage is coupled by inductor $L_1$ to the first terminal of each of voltage-doubler stage 401a and 401b and by boost inductor $L_2$ to the third terminal of each of voltage-doubler stage 401a and 401b. Totem-pole rectifier stage 402 includes first and second terminals coupled, respectively, to the second terminal of voltage-doubler stage 401a and second terminal of second voltage-doubler stage 401b. DC-stage 403 is coupled across totem-pole rectifier stage 402.

Voltage-doubler stage 401a includes energy storage capacitor $C_1$, switch $S_1$, switch $S_2$, and switch $S_{P1}$. Switches $S_1$ and $S_2$ of voltage-doubler stage 401a are connected in series across the first and second terminals of voltage-doubler stage 401a, and switches $S_1$ and $S_2$ of voltage-doubler stage 401a are connected at a common node. Third switch $S_{P1}$ and energy storage capacitor $C_1$ of voltage-doubler stage 401a are connected in series between the common node and the third terminal of voltage-doubler stage 401a.

In voltage-doubler stage 401a, series-connected switches $S_1$ and $S_2$ operate at an operating frequency of power conversion system 400, while switch $S_{P1}$ operates at the line frequency of AC voltage source (i.e., switch $S_{P1}$ is conducting when AC voltage $V_{AC}$ is positive, and is non-conducting when AC voltage $V_{AC}$ is negative). Switch $S_{P1}$ is connected between energy storage capacitor $C_1$ and the common terminal of series-connected switches $S_1$ and $S_2$. Switch $S_{P1}$ is also referred to as line-frequency switch $S_{P1}$.

Voltage-doubler stage 401b includes energy storage capacitor $C_2$, and switches $S_3$, $S_4$, and Sm. Switches $S_3$ and $S_4$ of the voltage-doubler stage 401b are connected in series across the first and second terminals of the voltage-doubler stage 401b, and switches $S_3$ and $S_4$ of the voltage-doubler stage 401b are connected at a common node. Switch $S_{N1}$ and energy storage capacitor $C_2$ of voltage-doubler stage 401b are connected in series between the common node and the third terminal of voltage-doubler stage 401b. Switch $S_{N1}$ is also referred to as line-frequency switch $S_{N1}$.

Voltage-doubler stage 401b is substantially the same as voltage-doubler stage 401a, with series-connected switches $S_3$ and $S_4$ operating at the operating frequency, while switch $S_{N1}$ operates at the line frequency of the input voltage source. Unlike line-frequency switch $S_{P1}$, however, line-frequency switch $S_{N1}$ is non-conducting when input voltage $V_{AC}$ is positive and conducting when input voltage $V_{AC}$ is negative. Energy storage capacitor $C_2$ in voltage-doubler stage 401b is connected between energy storage capacitor $C_1$ of voltage-doubler stage 401a and the common terminal of series-connected switches $S_3$ and $S_4$. As shown in FIG. 4, voltage-doubler stages 401a and 401b are connected at switches $S_2$ and $S_3$ and at capacitors $C_1$ and $C_2$.

Totem-pole rectifier stage 402 includes first and second half-bridge legs each including first and second components serially connected at a common terminal, where the second terminal of the AC-stage is coupled to the common terminal of the second half-bridge leg, and the common terminal of the first half-bridge leg is coupled to the third terminal of each of voltage-doubler stages 401a and 401b. As shown in FIG. 4, the first and second components of the first half-bridge leg of totem-pole rectifier stage 402 include switches $S_{A1}$ and $S_{A2}$, and the first and second components of the second half-bridge leg of totem-pole rectifier stage 402 include diodes D1 and D2.

In one embodiment, switch $S_{P1}$ of voltage-doubler stage 401a and switch $S_{N1}$ of voltage-doubler stage 401b includes semiconductor switches devices.

Voltage-doubler stages 401a and 401b share the inductor $L_1$, which is coupled between the AC voltage source and the common terminal between switches $S_2$ and $S_3$ of voltage-doubler stages 401a and 401b, respectively. The common terminal between energy storage capacitors $C_1$ and $C_2$ is coupled to the common terminal between switches $S_{A1}$ and $S_{A2}$ of totem-pole rectifier stage 402. In steady-state, the voltage across energy storage capacitors $C_1$ and $C_2$ is approximately one-half output voltage $V_O$, which is equal to or higher than the peak voltage of input voltage $V_{AC}$, when a proper voltage-second balance exists between inductors $L_1$ and $L_2$.

Figure 5:
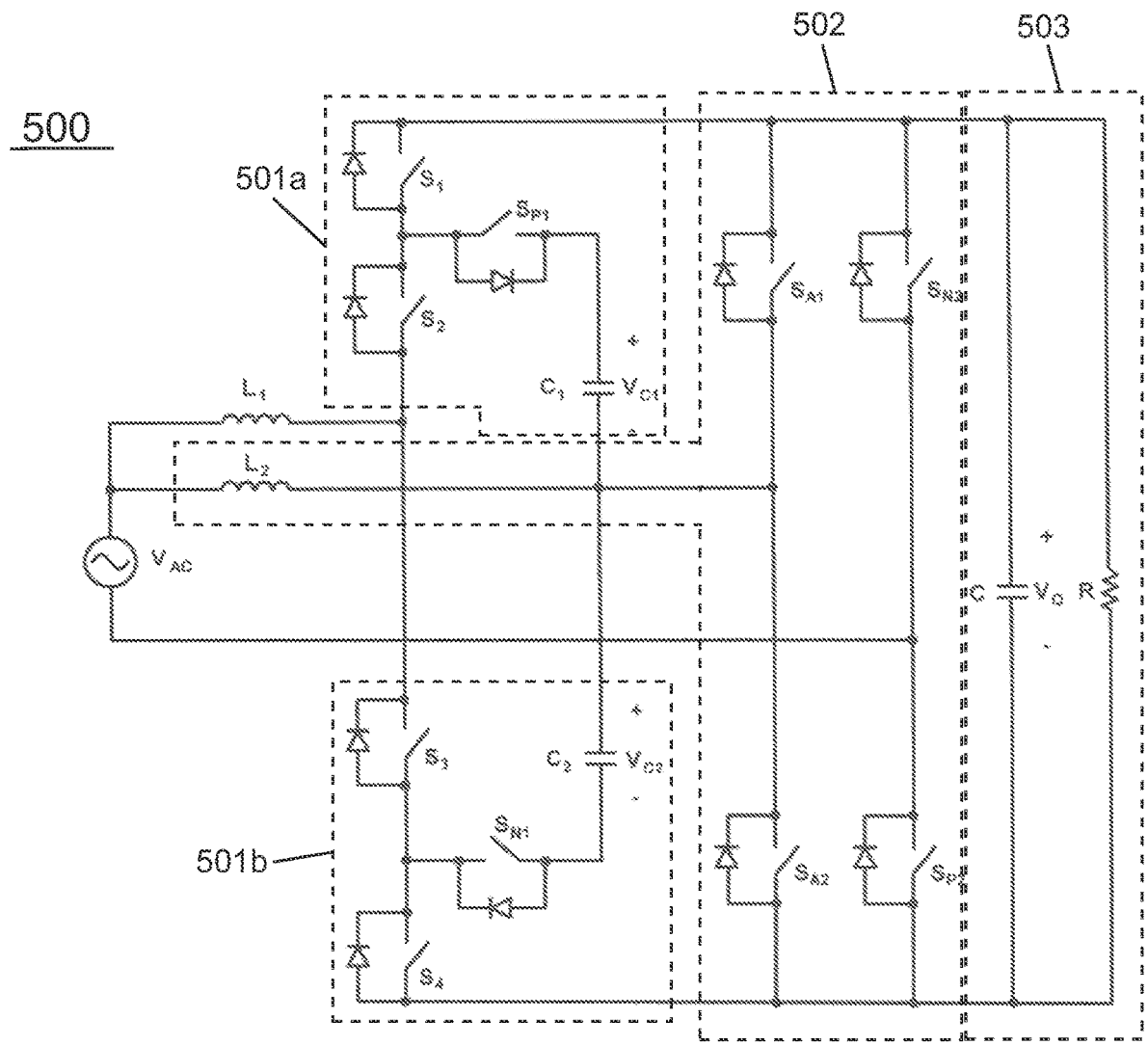
FIG. 5 shows AC-DC power conversion system 500, according to another embodiment of the present invention.

FIG. 5 shows AC-DC power conversion system 500, according to another embodiment of the present invention. AC-DC power conversion system 500 is substantially the same as AC-DC power conversion system 400 of FIG. 4, except that, in place of diodes $D_1$ and $D_2$ of totem-pole rectifier stage 402, totem-pole rectifier stage 502 provides synchronous rectifiers or switches $S_{N2}$ and $S_{P2}$. Switch $S_{P2}$ is conducting only when input AC voltage $V_{AC}$ is positive, and switch $S_{N2}$ is conducting only when input AC voltage $V_{AC}$ is negative. As shown in FIG. 5, voltage-doubler stages 501a and 501b and DC-stage 503 are configured substantially the same as voltage-doubler stages 401a and 401b and DC-stage stage 403 of FIG. 4, respectively. Totem-pole rectifier stage 502 includes first and second half-bridge legs, formed by series-connected switches $S_{A1}$ and $S_{A2}$, and series-connected switches $S_{N2}$ and $S_{P2}$, respectively. The second terminal of the AC-stage is coupled to the common terminal between switches $S_{N2}$ and $S_{P2}$, and the common terminal between switches $S_{A1}$ and $S_{A2}$ is coupled to the third terminal of each of voltage-doubler stages 501a and 501b. Switches $S_{A1}$ and $S_{A2}$ and switches $S_{N2}$ and $S_{P2}$ may each be implemented by a synchronous rectifier.

Figure 6:
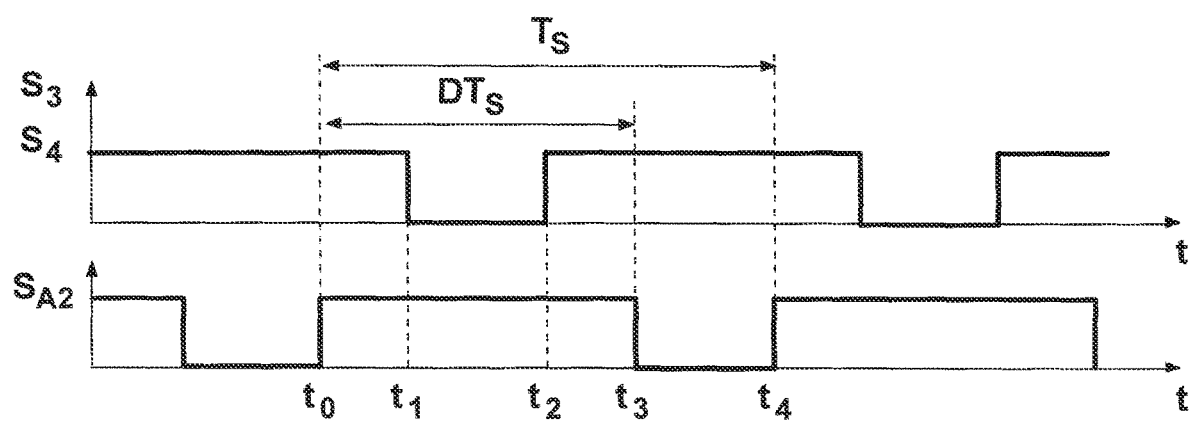
FIG. 6 is an activation timing diagram showing switch-activation control signals $S_3$, $S_4$, and $S_{42}$ that control switches $S_3$, $S_4$, and $S_{42}$ in AC-DC power conversion system 500 of FIG. 5, during the time interval when input voltage $V_{AC}$ is in a positive half-line cycle and the magnitude of input voltage $V_{AC}$ is lower than one quarter of output voltage $V_O$.

FIG. 6 is an activation timing diagram showing switch-activation control signals $S_3$, $S_4$, and $S_{A2}$ that control switches $S_3$, $S_4$, and $S_{A2}$ in AC-DC power conversion system 500 of FIG. 5, during the time interval when input AC voltage $V_{AC}$ is in a positive half-cycle and the magnitude of input AC voltage $V_{AC}$ is lower than one quarter of output voltage $V_O$. During this time period, line-frequency switches $S_{P1}$ and $S_{P2}$ are conducting. As shown in FIG. 6, switch-activation control signals $S_3$, $S_4$, and $S_{A2}$ each have a duty cycle D (i.e., each switch is conducting for a time period $DT_S$, where $T_S$ is the duration of the switching cycle). Switch-activation control signals $S_3$ and $S_4$ each are phase-shifted 180° relative to switch-activation control signal $S_{A2}$. Switch-activation control signals $S_3$, $S_4$, and $S_{A2}$ overlap in the active portions of their duty cycles (i.e., D>0.5), such that switches $S_3$, $S_4$, and $S_{A2}$ are simultaneously conducting during time intervals $(t_0, t_1)$ and $(t_2, t_3)$. The switching cycle $T_S$ is much shorter than a period of the line frequency.

Figure 7:
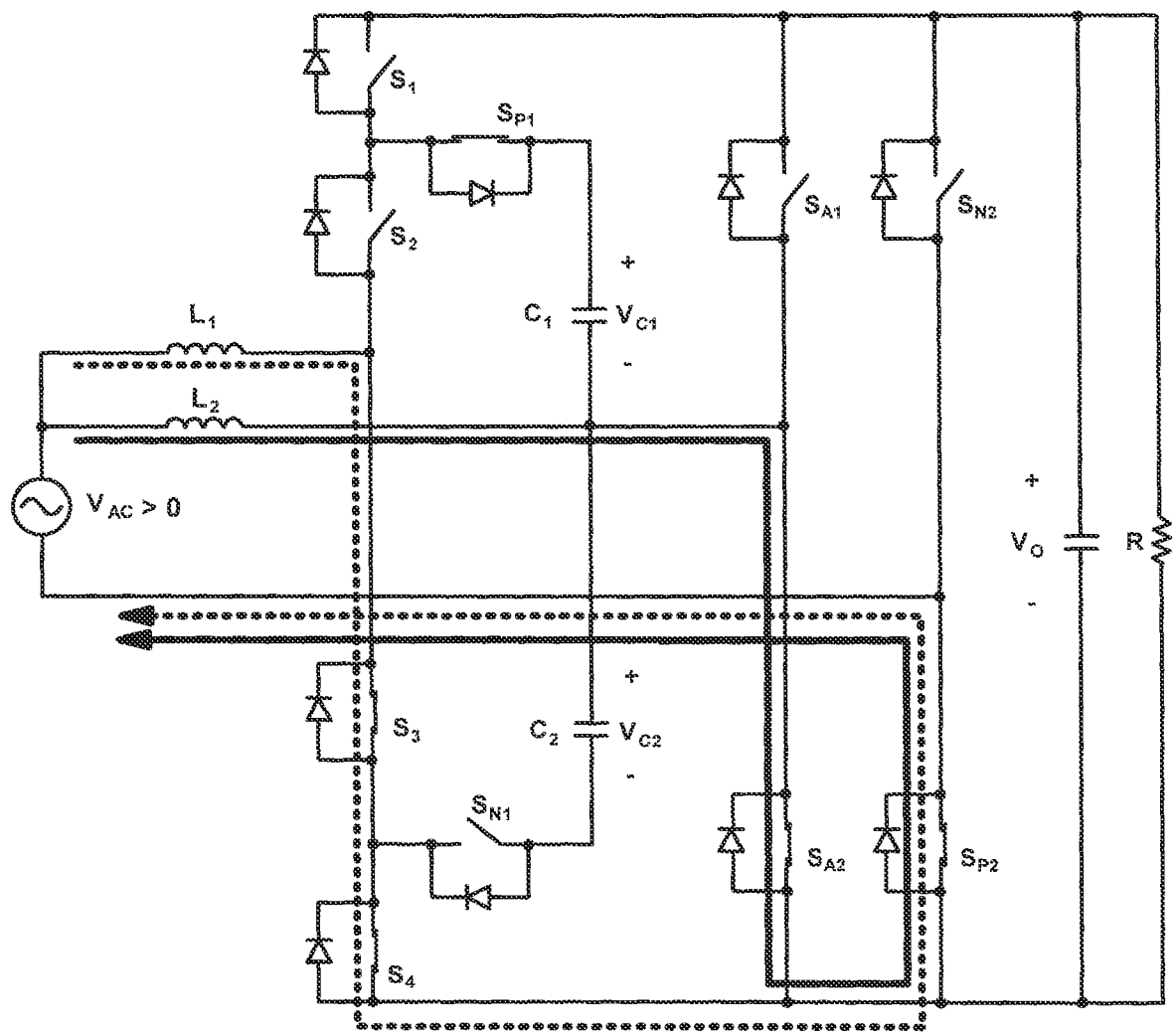
FIG. 7 shows the topological stage of AC-DC power conversion system 500 of FIG. 5 (i.e., current flow) during time interval ($t_0$, $t_1$) or time interval ($t_2$ and $t_3$).

FIG. 7 shows the topological stage of AC-DC power conversion system 500 of FIG. 5 (i.e., current flow) during time interval $(t_0, t_1)$ or time interval $(t_2$ and $t_3)$. During either time interval, switches $S_3$, $S_4$, and $S_{A2}$ are conducting. As input AC voltage $V_{AC}$ is in a positive half-cycle, line-frequency switches $S_{P1}$ and $S_{P2}$ are also conducting. Input AC voltage $V_{AC}$ is imposed across both inductors $L_1$ and $L_2$ by switches $S_3$, $S_4$, and $S_{A2}$. As a result, for the case where the inductances in inductors $L_1$ and $L_2$ are equal (with inductance L), inductor currents $i_{L1}$ and $i_{L2}$ of inductor $L_1$ and $L_2$ both increase linearly with a slope $$\frac{di_L}{dt} = \frac{V_{AC}}{L}.$$

Figure 8:
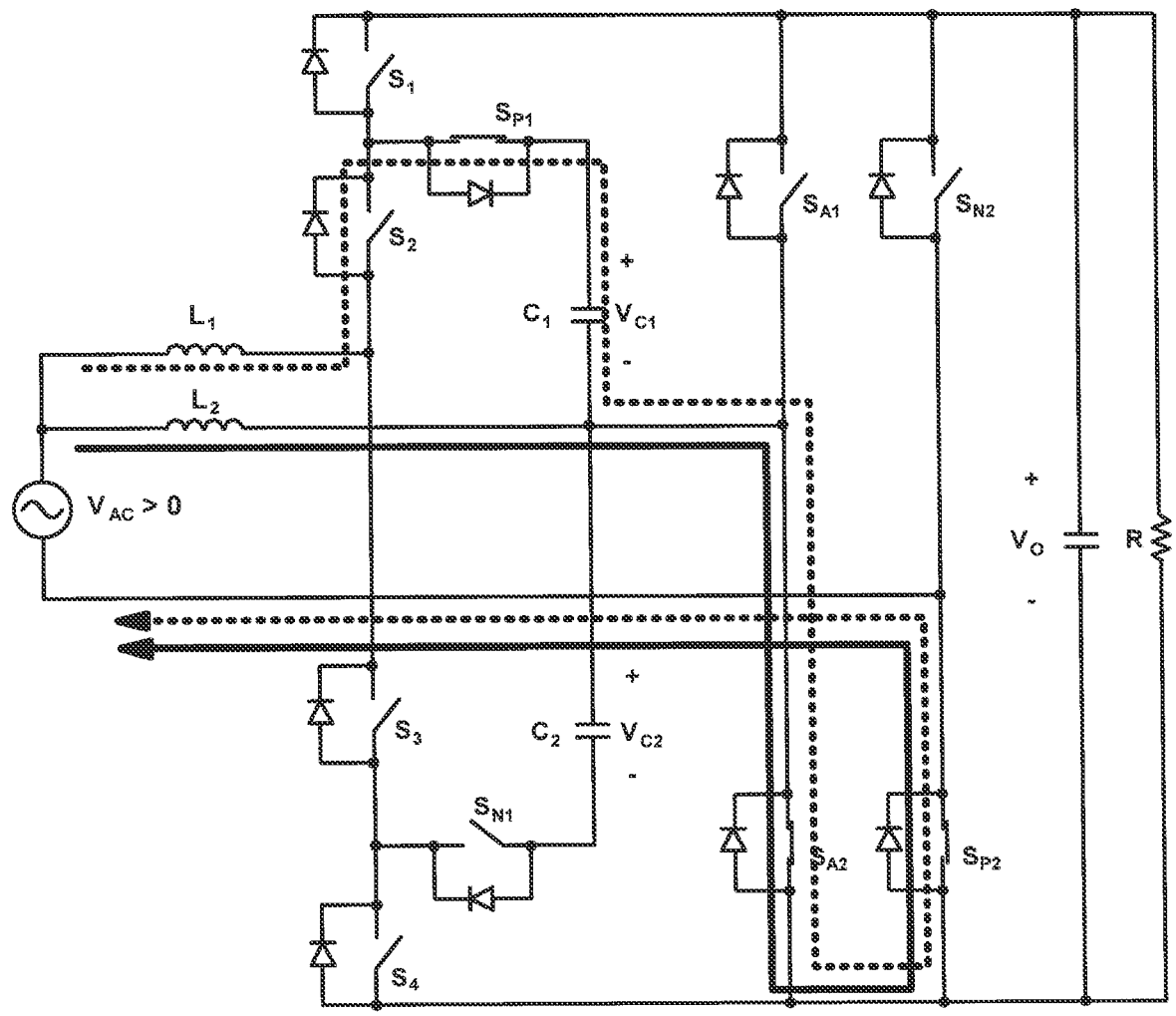
FIG. 8 shows the topological stage of AC-DC power conversion system 500 of FIG. 5 during time interval ($t_1$, $t_2$)

FIG. 8 shows the topological stage of AC-DC power conversion system 500 of FIG. 5 during time interval $(t_1, t_2)$. As shown in FIG. 8, during this time interval, switch $S_{A2}$ conducts, while switches $S_3$ and $S_4$ are not conducting. Consequently, inductor current $i_{L1}$ of inductor $L_1$ flows through the body diode of switch $S_2$ and switch $S_{P1}$, so that the energy stored in inductor $L_1$ during time interval $(t_0, t_1)$ or time interval $(t_2, t_3)$—when switches $S_3$ and $S_4$ are conducting—is now delivered to energy storage capacitor $C_1$. Assuming line-frequency of input AC voltage $V_{AC}$ is slow-varying (i.e., during time interval $(t_1, t_4)$, input AC voltage $V_{AC}$ may be considered substantially constant at $V_{AC}(t)$), voltage across energy storage capacitor $C_1$ can be derived from the volt-second balance equation for inductor $L_1$:

$$DT_S\|V_{AC}(t)\|=[V_{C1}(t)-\|V_{AC}(t)\|][T_S-DT_S] \quad (1)$$

From Eq. (1), voltage $V_{C1}$ across energy storage capacitor $C_1$ is therefore:

$$V_{C1}(t) = \frac{\|V_{AC}(t)\|}{1-D} \quad (2)$$

In steady-state operation, with a relatively large capacitance in capacitor $C_1$, voltage $V_{C1}$ is substantially constant.

Figure 9:
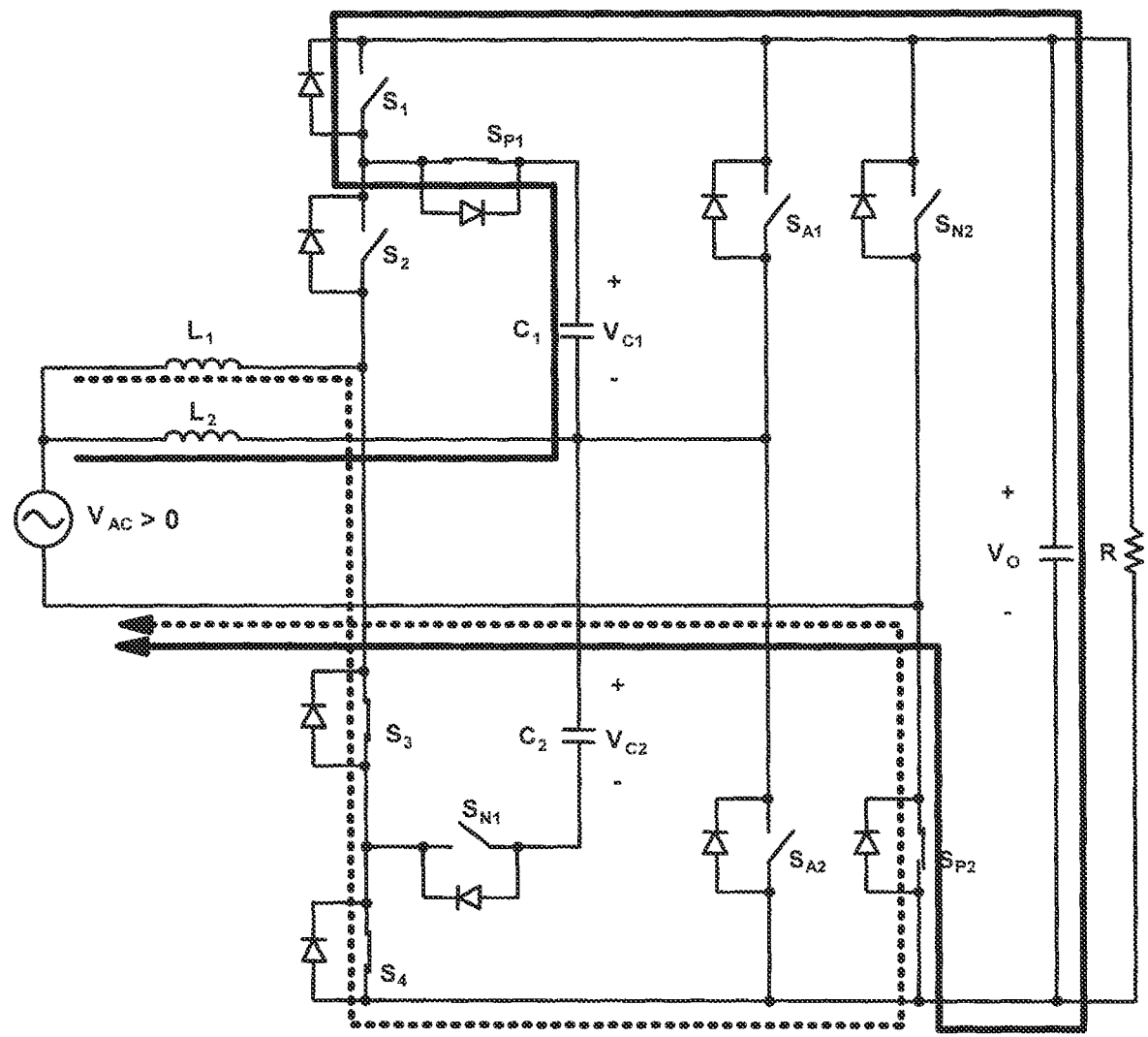
FIG. 9 shows the topological stage of AC-DC power conversion system 500 of FIG. 5 during time interval ($t_3$, FIG. 10 shows idealized voltage and current waveforms for the elements of AC-DC power conversion system 500 under the operation conditions of FIG. 6.

FIG. 9 shows the topological stage of AC-DC power conversion system 500 of FIG. 5 during time interval $(t_3, t_4)$. As shown in FIG. 9, switches $S_3$ and $S_4$ are conducting, while switch $S_{A2}$ is non-conducting, so that inductor current $i_{L2}$ of inductor $L_2$ flows through energy storage capacitor $C_1$, switch $S_{P1}$, and the body diode of switch $S_1$. Consequently, the energy in inductor $L_2$—which is stored when switch $S_{A2}$ was conducting—is now delivered to output capacitor C. During time interval $(t_3, t_4)$, energy storage capacitor $C_1$ is connected in series with output capacitor C, which allows the energy in energy storage capacitor $C_1$ stored during the time interval $(t_1, t_2)$ to be also delivered to output capacitor C. In this manner, AC-DC power conversion system 500 achieves a high voltage gain. Output voltage $V_O$ across output capacitor C can be derived from the volt-second balance equation for inductor $L_2$:

$$DT_S\|V_{AC}(t)\|=[V_O(t)-V_{C1}(t)-\|V_{AC}(t)\|][T_S-DT_S] \quad (3)$$

Equations (2) and (3) yields output voltage $V_O$:

$$V_O(t) = \frac{2\|V_{AC}(t)\|}{1-D} \quad (4)$$

From Equation (4), the voltage conversion ratio for power conversion system 500 is given by:

$$\frac{V_O(t)}{\|V_{AC}(t)\|} = \frac{2}{1-D} \quad (5)$$

When power conversion system 500 operates at a duty cycle D greater than 0.5, output voltage $V_O$ is twice the output voltage of a conventional boost converter operating at the same duty cycle. This high conversion ratio makes power conversion system 500 suitable for an application that benefits from a high input-to-output voltage gain, as a much greater duty cycle of the switch-activation control signals are not required to deliver the same high-voltage output.

Figure 10:
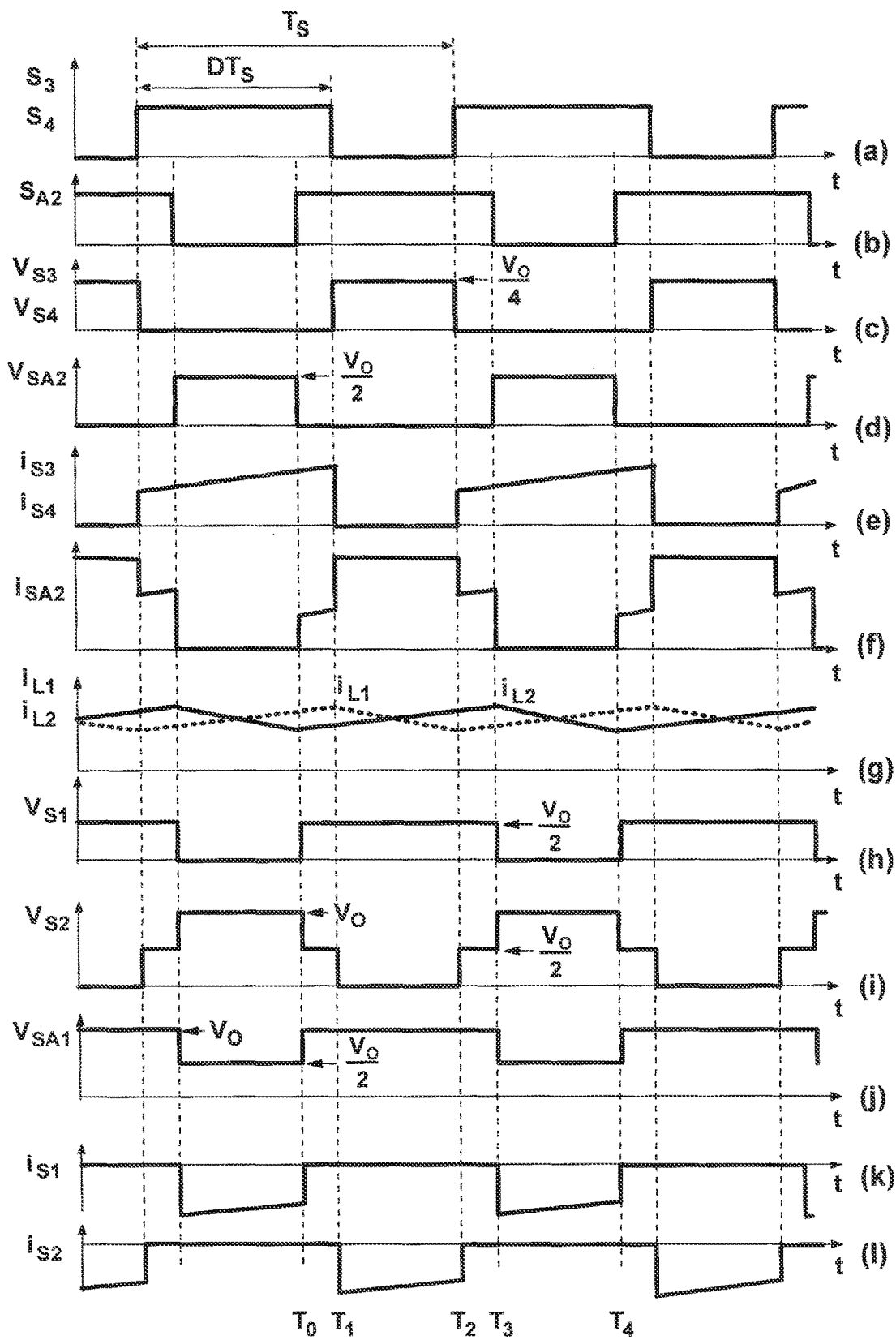

FIG. 10 shows idealized voltage and current waveforms for the elements of power conversion system 500 under the operation conditions of FIG. 6. Note that each switch in power conversion system 500 switches at a time when the voltage across it is less than one-half output voltage $V_O$, which results in a lower switching loss.

Figure 11:
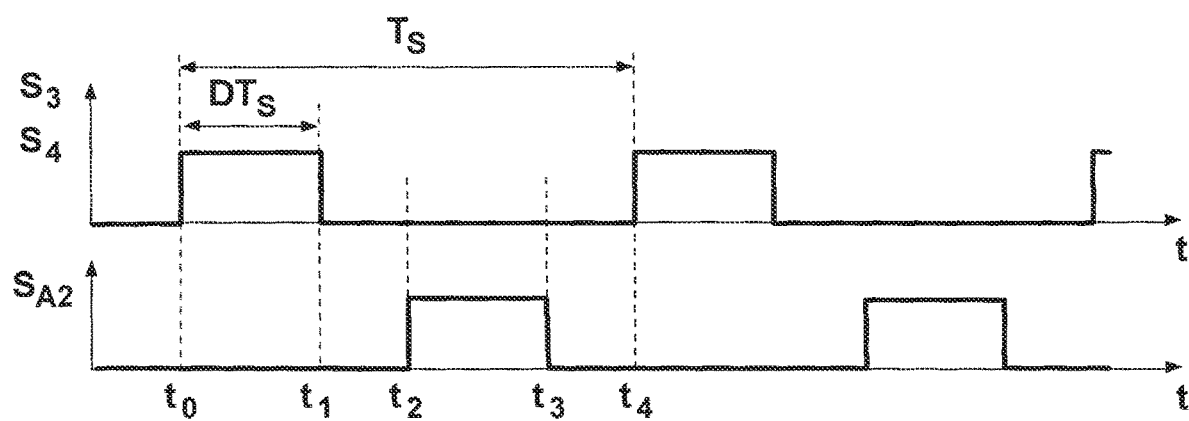
FIG. 11 is an activation timing diagram showing switch-activation control signals $S_3$, $S_4$ and $S_{42}$ that control switches $S_3$, $S_4$, and $S_{42}$ in AC-DC power conversion system 500 of FIG. 5, during the time interval when input voltage $V_{AC}$ is in a positive half-cycle and the magnitude of input voltage $V_{AC}$ is greater than one quarter of output voltage $V_O$.

FIG. 11 is an activation timing diagram showing switch-activation control signals $S_3$, $S_4$, and $S_{A2}$ that control switches $S_3$, $S_4$, and $S_{A2}$ in AC-DC power conversion system 500 of FIG. 5, during the time interval when input AC voltage $V_{AC}$ is in a positive half-cycle and the magnitude of input AC voltage $V_{AC}$ is greater than one quarter of output voltage $V_O$. During this time period, line-frequency switches $S_{P1}$ and $S_{P2}$ are conducting. As shown in FIG. 11, switch-activation control signals $S_3$, $S_4$, and $S_{A2}$ each have a duty cycle D. Switch-activation control signals $S_3$ and $S_4$ each are phase-shifted 180° relative to switch-activation control signal $S_{A2}$. The active portions of the duty cycles of switches $S_3$ and $S_4$ do not overlap the active period of the duty cycle of switch $S_{A2}$ (i.e., D<0.5), such that switches $S_3$, $S_4$, and $S_{A2}$ are non-conducting during time intervals ($t_1$, $t_2$) and ($t_3$, $t_4$). The switching cycle $T_S$ is much shorter than a period of the line frequency.

Figure 12:
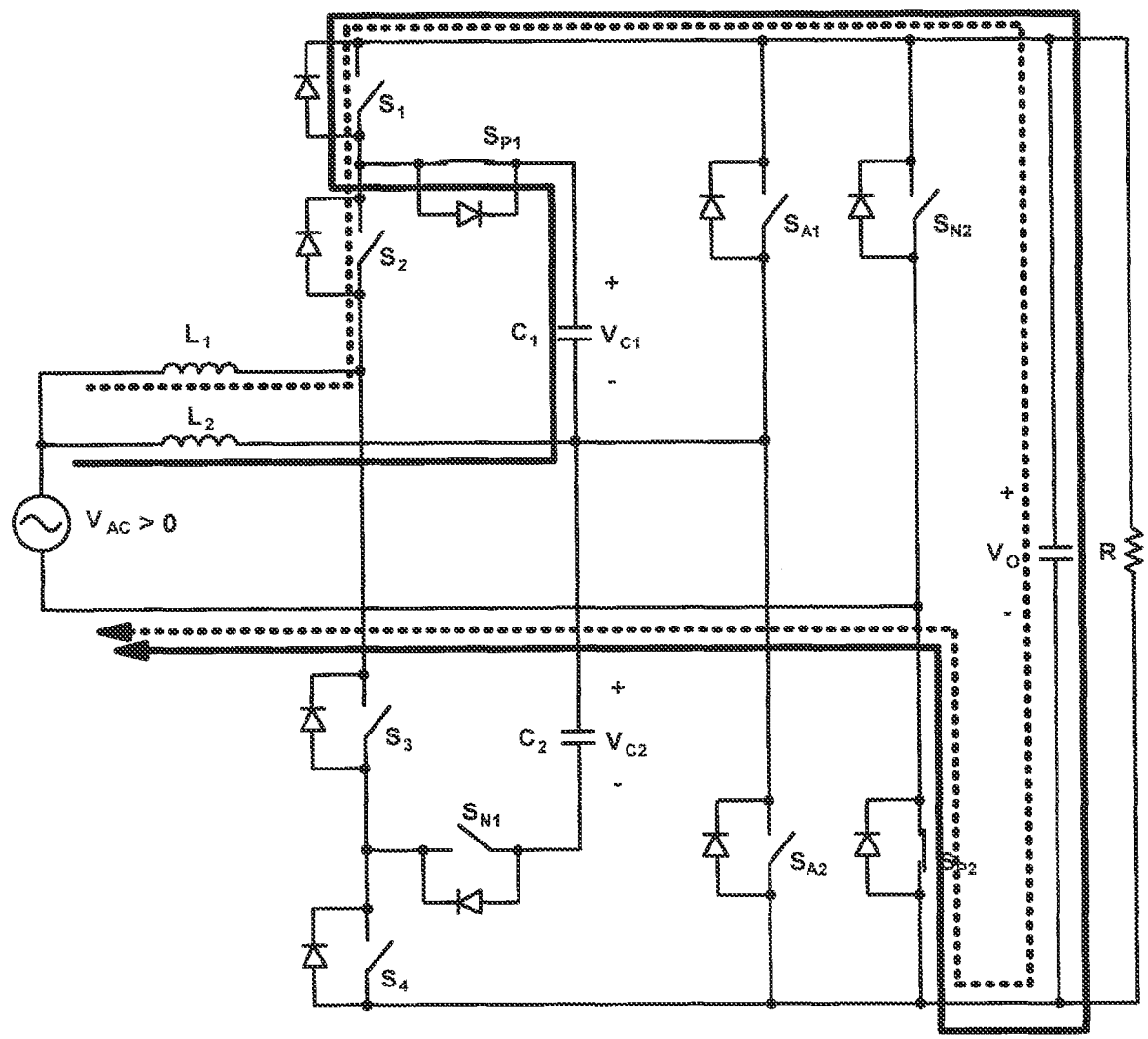
FIG. 12 shows the topological stage of AC-DC power conversion system 500 of FIG. 5 during time interval ($t_1$, $t_2$) or time interval ($t_3$ and $t_4$).

FIG. 12 shows the topological stage of AC-DC power conversion system 500 of FIG. 5 during time interval ($t_1$, $t_2$) or time interval ($t_3$ and $t_4$). During either time interval, none of switches $S_3$, $S_4$, and $S_{A2}$ are conducting. As input voltage $V_{AC}$ is in a positive half-cycle, line-frequency switches $S_{P1}$ and $S_{P2}$ are conducting. Inductor current $i_{L1}$ of inductor $L_1$ flows through the body diodes of switches $S_2$ and $S_1$, while inductor current $i_{L2}$ of inductor $L_2$ flows through switch $S_{P1}$ and the body diode of switch $S_1$. These currents then charge output capacitor C in the return current path through conducting switch $S_{P2}$. For time interval ($t_2$, $t_3$), when switches $S_3$ and $S_4$ are not conducting and switch $S_{A2}$ is conducting, the topological stage is the same as that shown in FIG. 8. For time interval ($t_0$, $t_1$), when switches $S_3$ and $S_4$ are conducting and switch $S_{A2}$ is not conducting, the topological stage is the same as that shown in FIG. 9. Voltage $V_{C1}$ across energy storage capacitor $C_1$ can be derived from the volt-second balance equation for inductor $L_2$:

$$DT_S\|V_{AC}(t)\|=[V_O(t)-V_{C1}(t)-\|V_{AC}(t)\|][T_S-DT_S] \quad (6)$$

From Equation (6), voltage $V_{C1}$ across energy storage capacitor $C_1$ is given by:

$$V_{C1}(t) = V_O - \frac{\|V_{AC}(t)\|}{1-D} \quad (7)$$

Alternatively, voltage $V_{C1}$ across energy storage capacitor $C_1$ can also be derived from the volt-second balance equation for inductor $L_1$:

$$DT_S\|V_{AC}(t)\|=[V_{C1}(t)-\|V_{AC}(t)\|]DT_S+[V_O(t)-\|V_{AC}(t)\|][T_S-2DT_S] \quad (8)$$

which provides:

$$V_{C1}(t) = \frac{\|V_{AC}(t)\| - (1-2D)V_O}{D} \quad (9)$$

Equations (8) and (9), therefore, provide output voltage $V_O$:

$$V_O(t) = \frac{\|V_{AC}(t)\|}{1-D} \quad (10)$$

Rearranging Equation (10) provides the voltage conversion ratio for power conversion system 500, when operating at duty-cycle D<0.5:

$$\frac{V_O(t)}{\|V_{AC}(t)\|} = \frac{1}{1-D} \quad (11)$$

Figure 13:
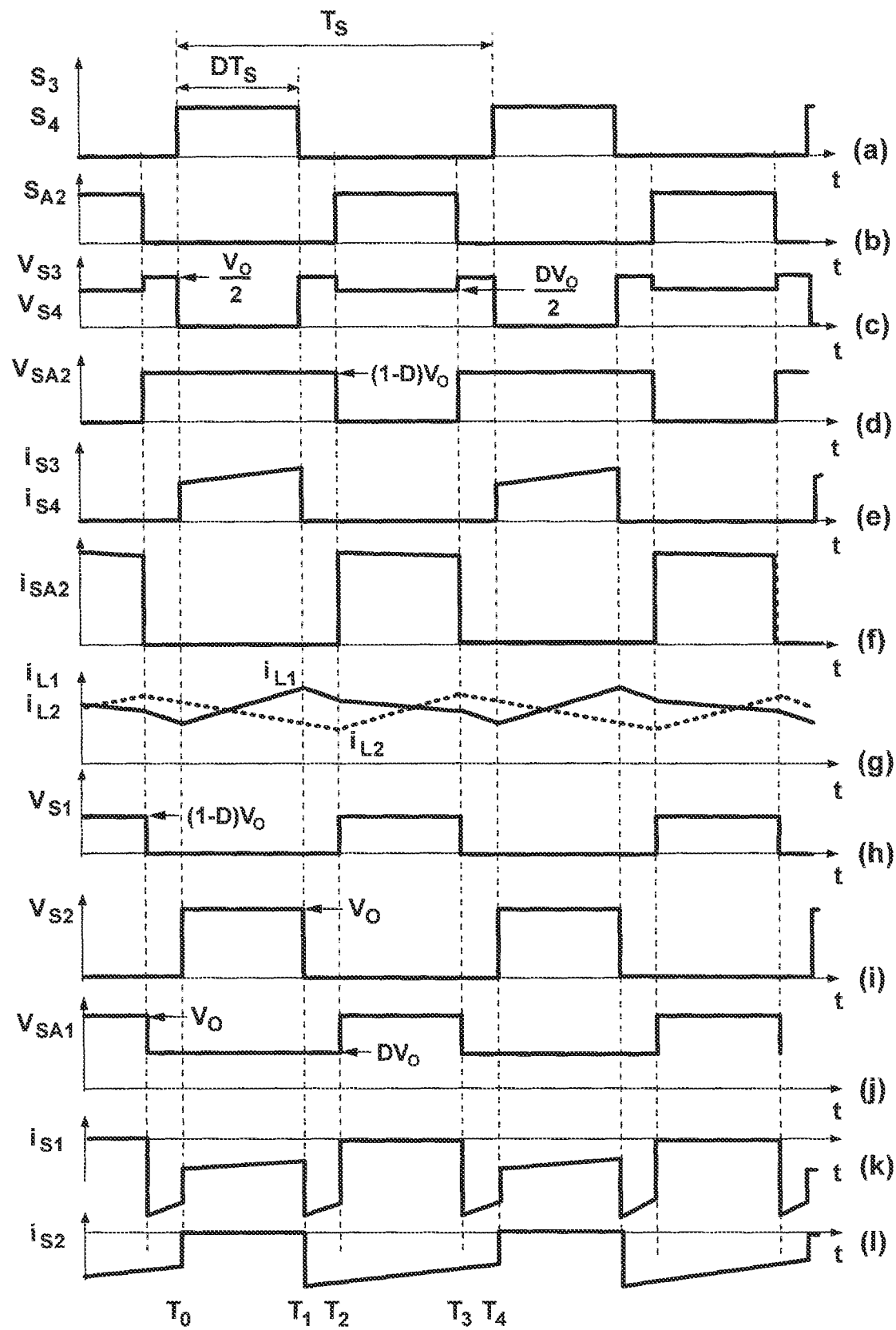
FIG. 13 shows idealized voltage and current waveforms for the elements of power conversion system 500 under the operating condition of FIG. 11.

FIG. 13 shows idealized voltage and current waveforms for the elements of power conversion system 500 under the operating condition of FIG. 11.

Figure 14:
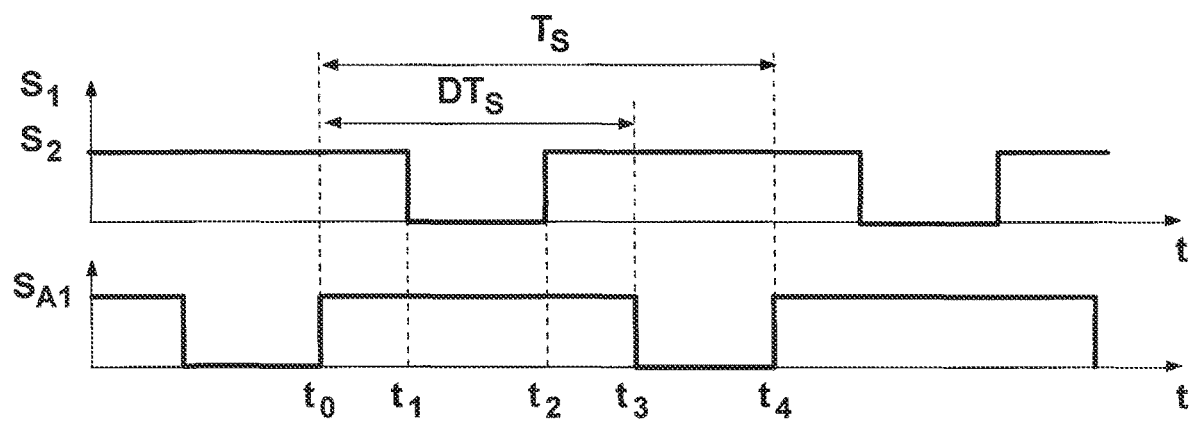
FIG. 14 is an activation timing diagram showing switch-activation control signals $S_1$, $S_2$, and $S_{41}$ that control switches $S_1$, $S_2$, and $S_{41}$ in AC-DC power conversion system 500 of FIG. 5, during the time interval when input voltage $V_{AC}$ is in a negative half-cycle and the magnitude of input voltage $V_{AC}$ is lower than one quarter of output voltage $V_O$.

FIG. 14 is an activation timing diagram showing switch-activation control signals $S_1$, $S_2$, and $S_{A1}$ that control switches $S_1$, $S_2$ and $S_{A1}$ in AC-DC power conversion system 500 of FIG. 5, during the time interval when input voltage $V_{AC}$ is in a negative half-cycle and the magnitude of input AC voltage $V_{AC}$ is lower than one quarter of output voltage $V_O$. During this time period, line-frequency switches $S_{N1}$ and $S_{N2}$ are conducting. As shown in FIG. 14, switch-activation control signals $S_1$, $S_2$, and $S_{A1}$ each have a duty cycle D. Switch-activation control signals $S_1$ and $S_2$ are each phase-shifted 180° relative to switch-activation control signal $S_{A1}$. Switch-activation control signals $S_1$, $S_2$, and $S_{A1}$ overlap in the active portions of their duty cycles (i.e., D>0.5), such that switches $S_1$, $S_2$, and $S_{A1}$ are simultaneously conducting during time intervals ($t_0$, $t_1$) and ($t_2$, $t_3$). The switching cycle $T_S$ is much shorter than a period of the line frequency.

Figure 15:
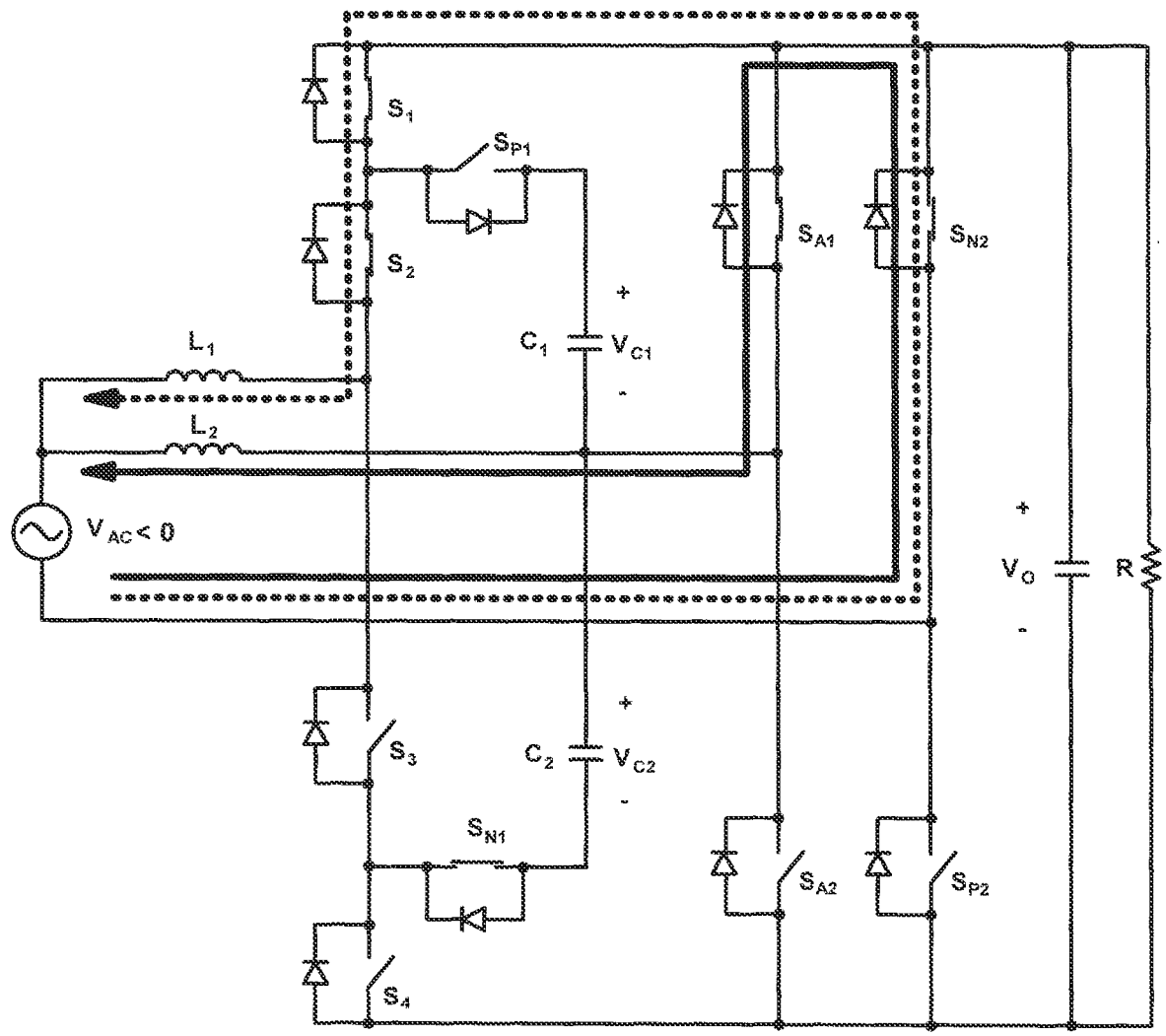
FIG. 15 shows the topological stage of AC-DC power conversion system 500 of FIG. 5 during time interval ($t_0$, $t_1$) or time interval ($t_2$ and $t_3$) under the operating conductions of FIG. 14.

FIG. 15 shows the topological stage of AC-DC power conversion system 500 of FIG. 5 during time interval ($t_0$, $t_1$) or time interval ($t_2$ and $t_3$) under the operating conductions of FIG. 14. During either time interval, switches $S_1$, $S_2$, and $S_{A1}$ are conducting. As input AC voltage $V_{AC}$ is in a positive half-cycle, line-frequency switches $S_{N1}$ and $S_{N2}$ are also conducting. Input AC voltage $V_{AC}$ is imposed across both inductors $L_1$ and $L_2$ by switches $S_1$, $S_2$, and $S_{A1}$. As a result, for the case where the inductances in inductors $L_1$ and $L_2$ are equal (with inductance L), inductor currents $i_{L1}$ and $i_{L2}$ of inductor $L_1$ and $L_2$ both increase linearly with a slope $$\frac{di_L}{dt} = -\frac{V_{AC}}{L}.$$

Figure 16:
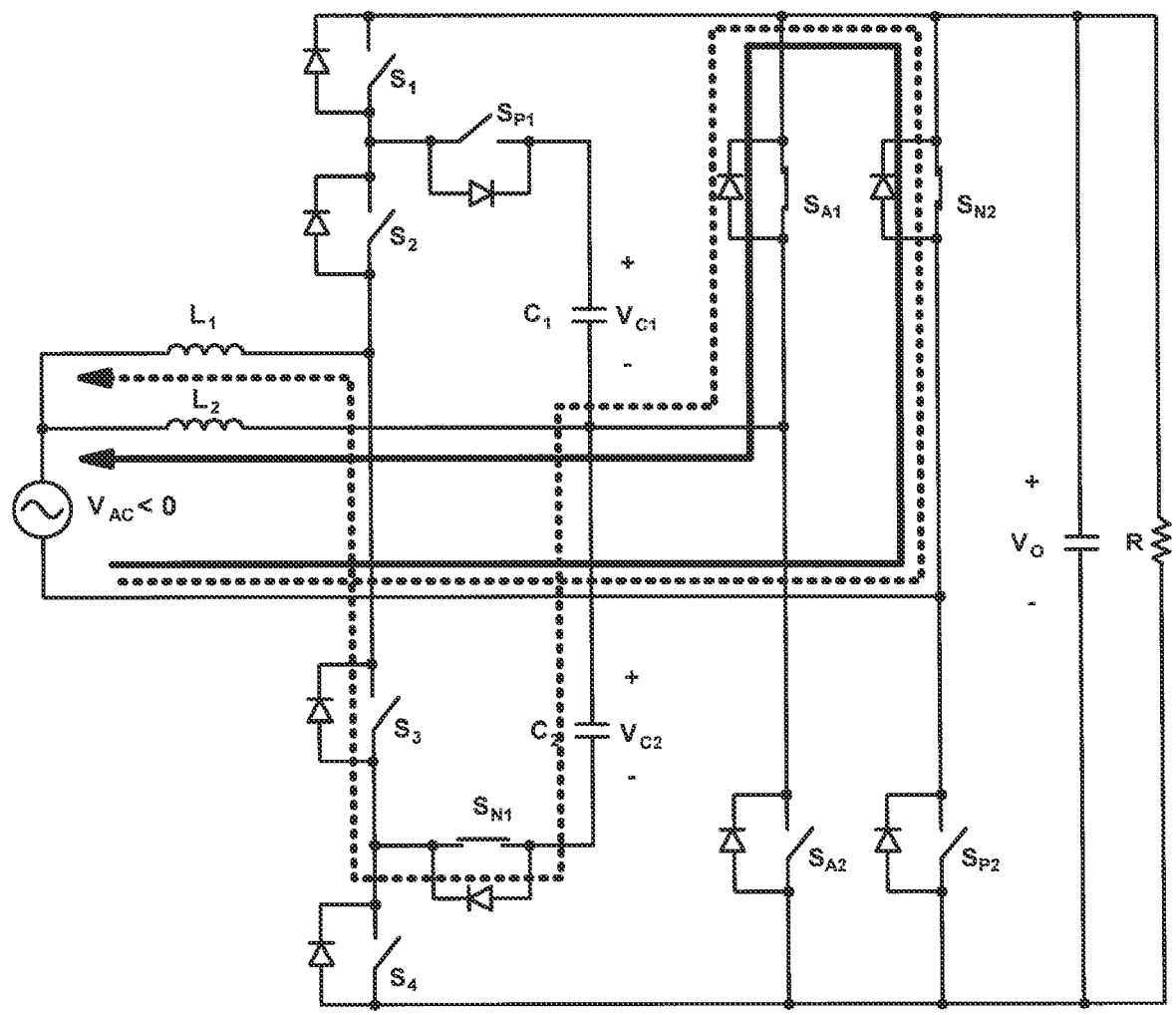
FIG. 16 shows the topological stage of AC-DC power conversion system 500 of FIG. 5 during time interval ($t_1$, $t_2$) under the operating conditions of FIG. 14.

FIG. 16 shows the topological stage of AC-DC power conversion system 500 of FIG. 5 during time interval ($t_1$, $t_2$) under the operating conditions of FIG. 14. As shown in FIG. 16, during this time interval, switch $S_{A1}$ conducts, while switches $S_1$ and $S_2$ are not conducting. Consequently, inductor current $i_{L1}$ of inductor $L_1$ flows through the body diode of switch $S_3$ and switch $S_{N1}$, so that the energy stored in inductor $L_1$ during time interval ($t_0$, $t_1$) or time interval ($t_2$, $t_3$)—when switches $S_1$ and $S_2$ are conducting—is now delivered to energy storage capacitor $C_2$. Assuming line-frequency input AC voltage $V_{AC}$ is slow-varying (i.e., during time interval ($t_1$, $t_4$), $V_{AC}$ may be considered substantially constant at $V_{AC}(t)$), voltage across energy storage capacitor $C_2$ can be derived using the approach of volt-second balance equation for inductor $L_1$, as described above with respect to Equations (1) and (2), i.e., $$V_{C2}(t) = \frac{\|V_{AC}(t)\|}{1-D}.$$

In steady-state operation, with a relatively large capacitance in capacitor $C_2$, $V_{C2}$ is substantially constant.

Figure 17:
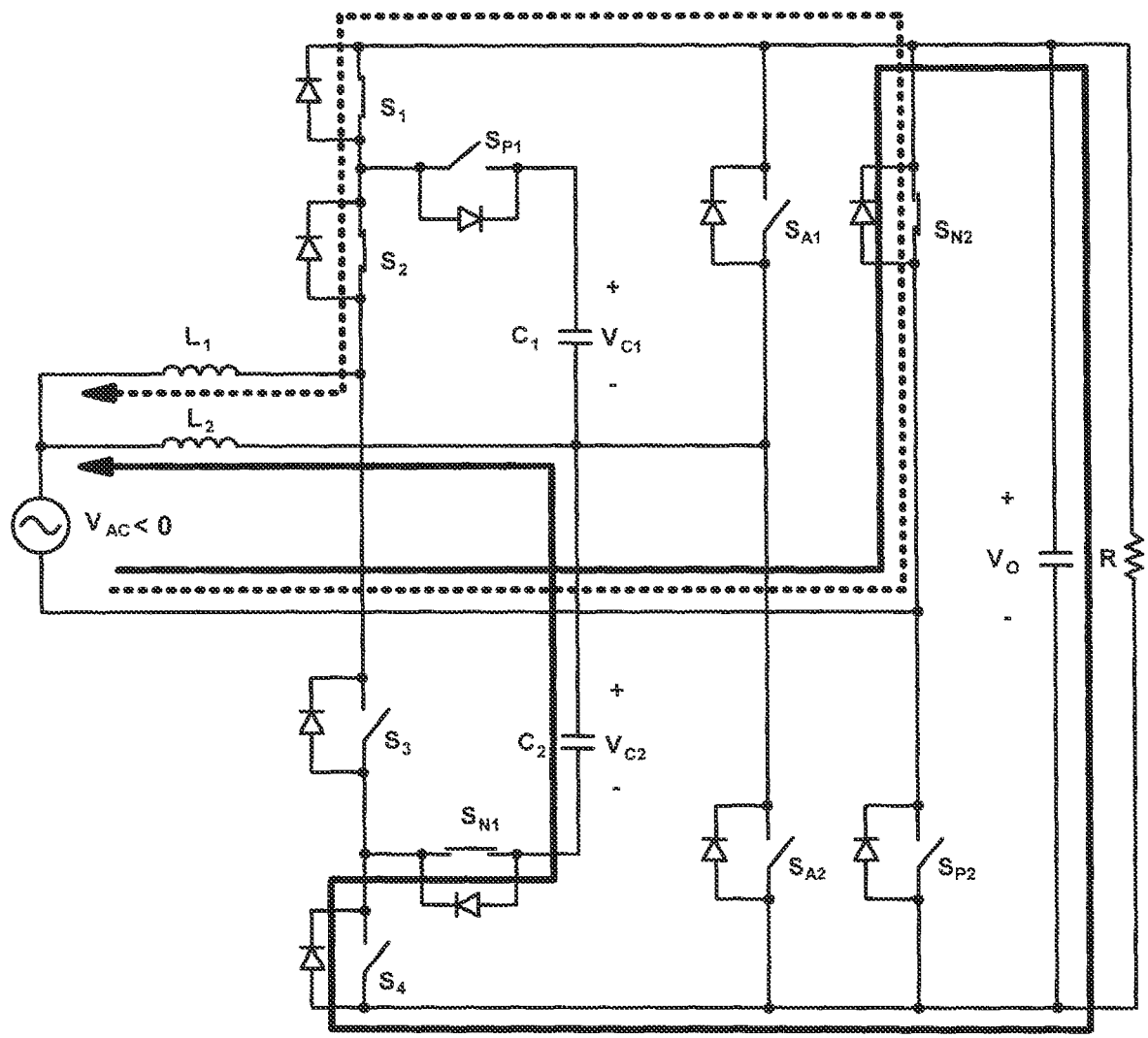
FIG. 17 shows the topological stage of AC-DC power conversion system 500 of FIG. 5 during time interval ($t_3$, $t_4$) under the operating conditions of FIG. 14.

FIG. 17 shows the topological stage of AC-DC power conversion system 500 of FIG. 5 during time interval $(t_3, t_4)$ under the operating conditions of FIG. 14. As shown in FIG. 17, switches $S_1$ and $S_2$ are conducting, while switch $S_{A1}$ is non-conducting, so that inductor current $i_{L2}$ of inductor $L_2$ flows through capacitor $C_2$, switch $S_{N1}$, and the body diode of switch $S_4$. Consequently, the energy in inductor $L_2$—which is stored when switch $S_{A1}$ was conducting—is now delivered to output capacitor C. During time interval $(t_3, t_4)$, capacitor $C_2$ is connected in series with output capacitor C, which allows the energy in capacitor $C_2$ stored during the time interval $(t_1, t_2)$ to be also delivered to output capacitor C. In this manner, AC-DC power conversion system 500 achieves a high voltage gain. Output voltage $V_O$ across capacitor C can be derived from the volt-second balance equation for inductor $L_2$, in substantially the same manner described above with respect to equations (3)-(5), i.e., $$V_O(t) = \frac{2\|V_{AC}(t)\|}{1-D}.$$

Accordingly, the voltage conversion ratio for AC-DC power conversion system 500 is also given by $$\frac{V_O(t)}{\|V_{AC}(t)\|} = \frac{2}{1-D}.$$

Figure 18:
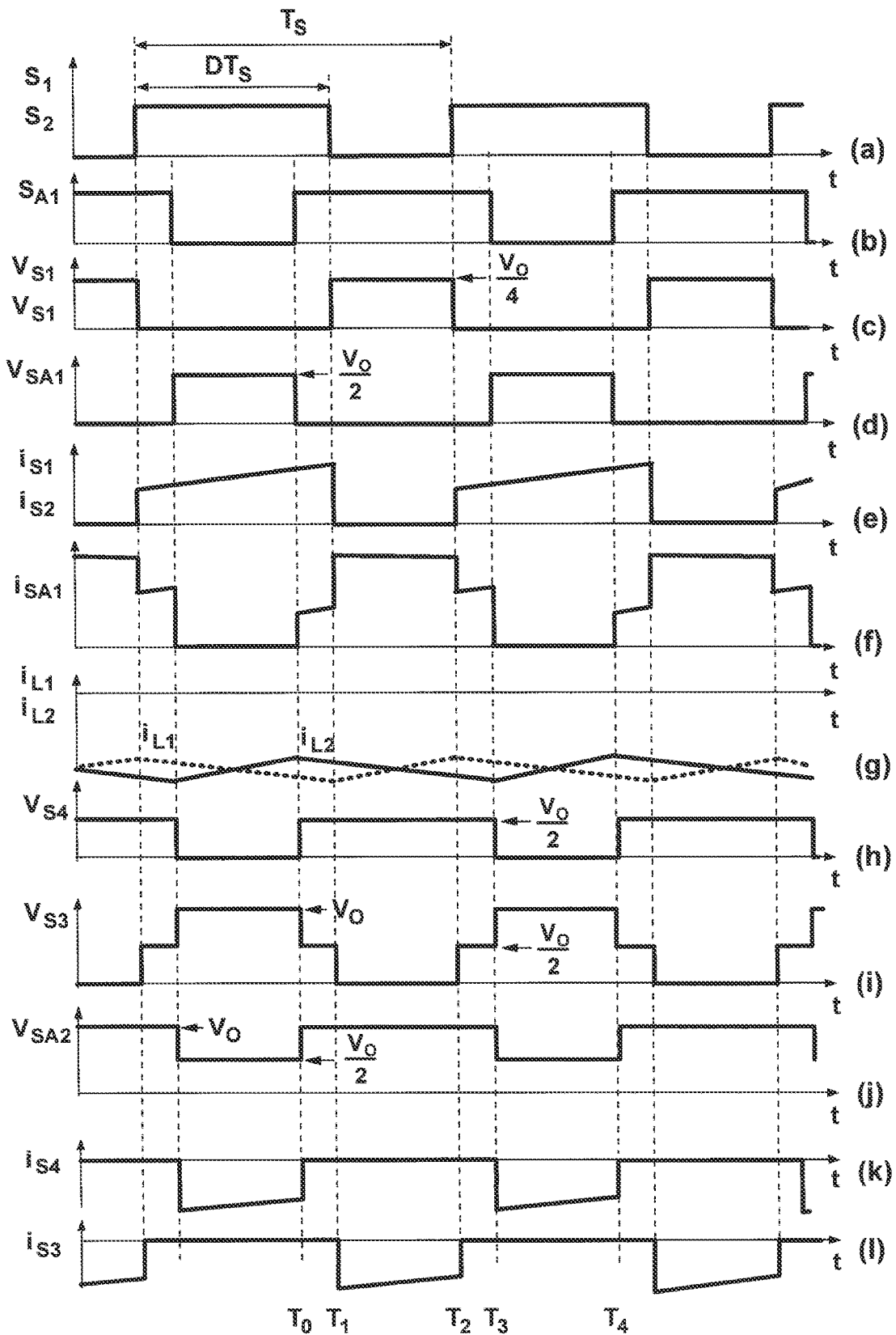
FIG. 18 shows idealized voltage and current waveforms for the elements of power conversion system 500 under the operation conditions of FIG. 14.

FIG. 18 shows idealized voltage and current waveforms for the elements of AC-DC power conversion system 500 under the operation conditions of FIG. 14.

Figure 19:
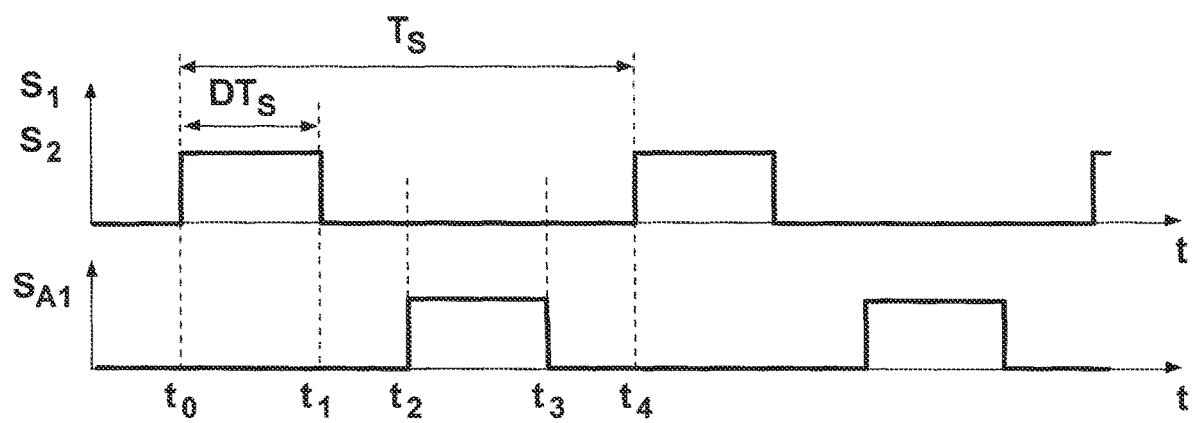
FIG. 19 is an activation timing diagram showing switch-activation control signals $S_1$, $S_2$, and $S_{41}$ that control switches $S_1$, $S_2$, and $S_{41}$ in AC-DC power conversion system 500 of FIG. 5, during the time interval when input voltage $V_{AC}$ is in a negative half-cycle and the magnitude of input voltage $V_{AC}$ is greater than one quarter of output voltage $V_O$.

FIG. 19 is an activation timing diagram showing switch-activation control signals $S_1$, $S_2$, and $S_{A1}$ that control switches $S_1$, $S_2$, and $S_{A1}$ in AC-DC power conversion system 500 of FIG. 5, during the time interval when input AC voltage $V_{AC}$ is in a negative half-cycle and the magnitude of input AC voltage $V_{AC}$ is greater than one quarter of output voltage $V_O$. During this time period, line-frequency switches $S_{N1}$ and $S_{N2}$ are conducting. As shown in FIG. 19, switch-activation control signals $S_1$, $S_2$, and $S_{A1}$ each have a duty cycle D. Switch-activation control signals $S_1$ and $S_2$ each are phase-shifted 180° relative to switch-activation control signal $S_{A1}$. The active portions of the duty cycles of switches $S_1$ and $S_2$ do not overlap the active period of the duty cycle of switch $S_{A1}$ (i.e., D<0.5), such that switches $S_1$, $S_2$, and $S_{A1}$ are non-conducting during time intervals $(t_1, t_2)$ and $(t_3, t_4)$. The switching cycle $T_S$ is much shorter than a period of the line frequency.

Figure 20:
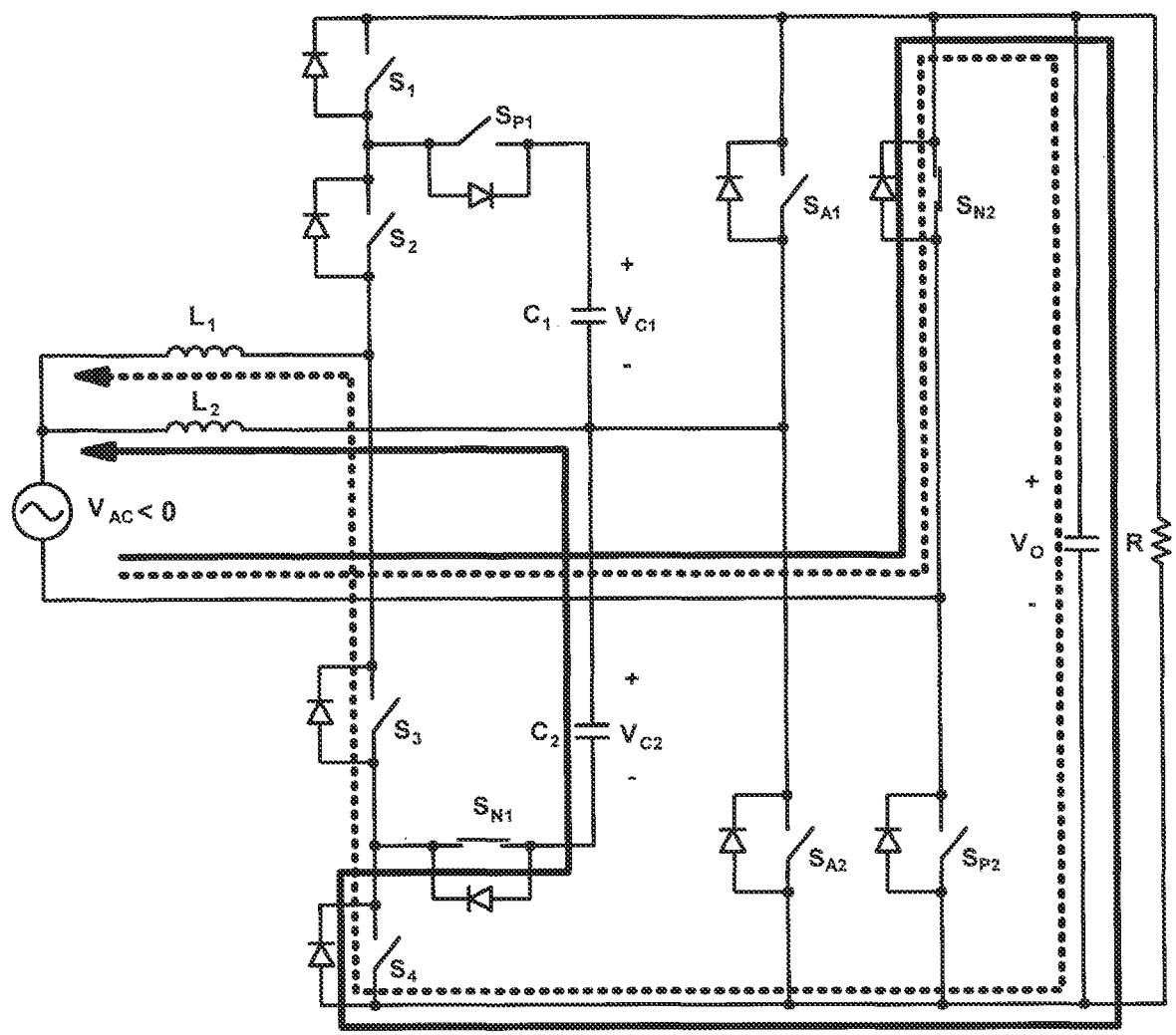
FIG. 20 shows the topological stage of AC-DC power conversion system 500 of FIG. 5 during time interval ($t_1$, $t_2$) or time interval ($t_3$ and $t_4$) under the operating conditions of FIG. 19.

FIG. 20 shows the topological stage of AC-DC power conversion system 500 of FIG. 5 during time interval $(t_1, t_2)$ or time interval $(t_3$ and $t_4)$ under the operating conditions of FIG. 19. During either time interval, none of switches $S_1$, $S_2$, and $S_{A1}$ are conducting. As input AC voltage $V_{AC}$ is in a negative half-cycle, line-frequency switches $S_{N1}$ and $S_{N2}$ are conducting. Inductor current $i_{L1}$ of inductor $L_1$ flows through the body diodes of switches $S_3$ and $S_4$, while inductor current $i_{L2}$ of inductor $L_2$ flows through switch $S_{N1}$ and the body diode of switch $S_4$. These currents then charge output capacitor C in the return current path through conducting switch $S_{N2}$. For time interval $(t_2, t_3)$, when switches $S_1$ and $S_2$ are not conducting and switch $S_{A1}$ is conducting, the topological stage is the same as that shown in FIG. 16. For time interval $(t_0, t_1)$, when switches $S_1$ and $S_2$ are conducting and switch $S_{A1}$ is not conducting, the topological stage is the same as that shown in FIG. 17. Accordingly, as described above with respect to Equations (6)-(11), using the volt-second balance equations of inductors $L_1$ and $L_2$, output voltage $V_O$ is given by $$V_O(t) = \frac{\|V_{AC}(t)\|}{1-D}$$

and the voltage conversion ratio for AC-DC power conversion system 500, when operating at duty-cycle D<0.5, is given by $$\frac{V_O(t)}{\|V_{AC}(t)\|} = \frac{1}{1-D}.$$

Figure 21:
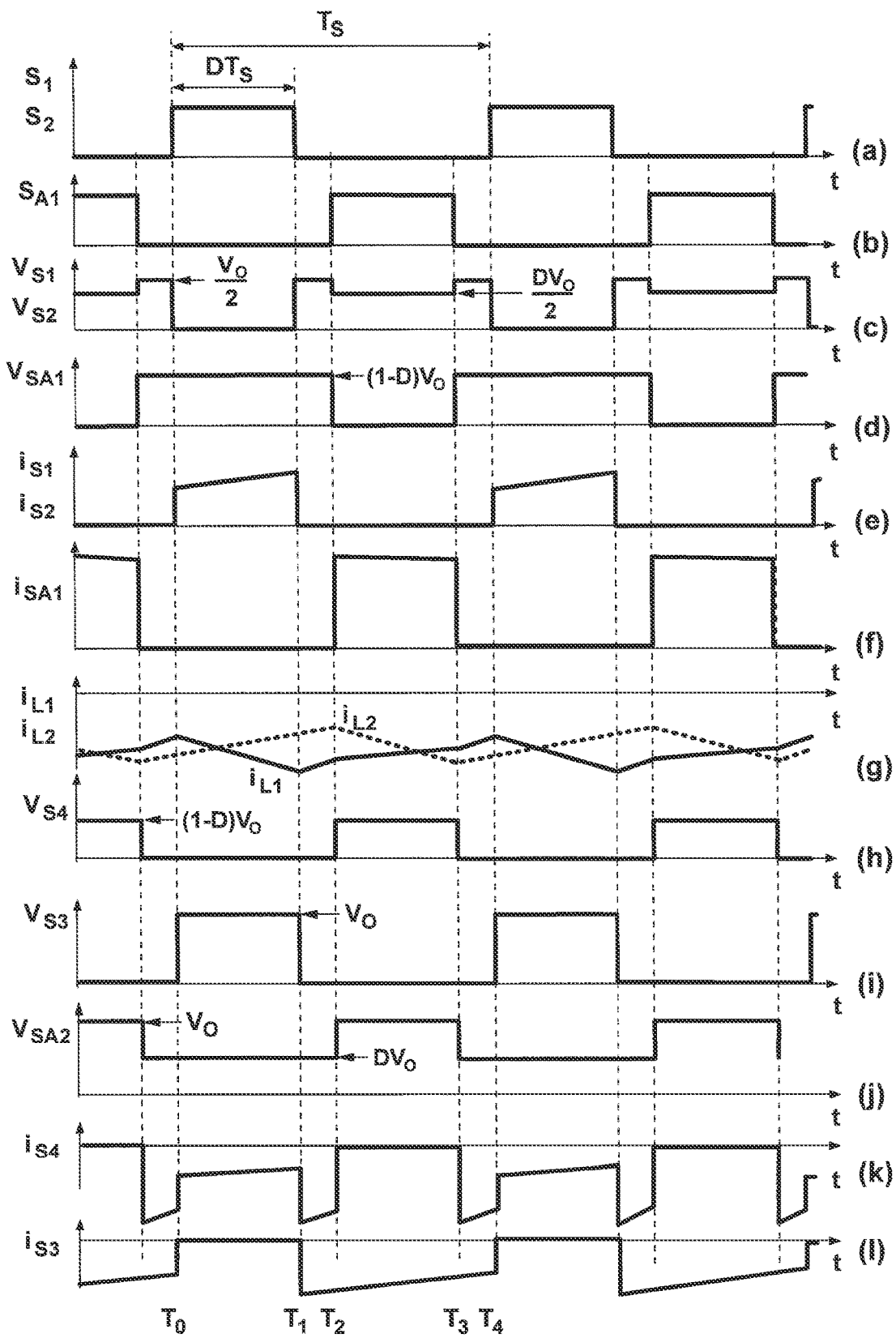
FIG. 21 shows idealized voltage and current waveforms for the elements of AC-DC power conversion system 500 under the operating condition of FIG. 19.

FIG. 21 shows idealized voltage and current waveforms for the elements of AC-DC power conversion system 500 under the operating condition of FIG. 19.

Figure 22:
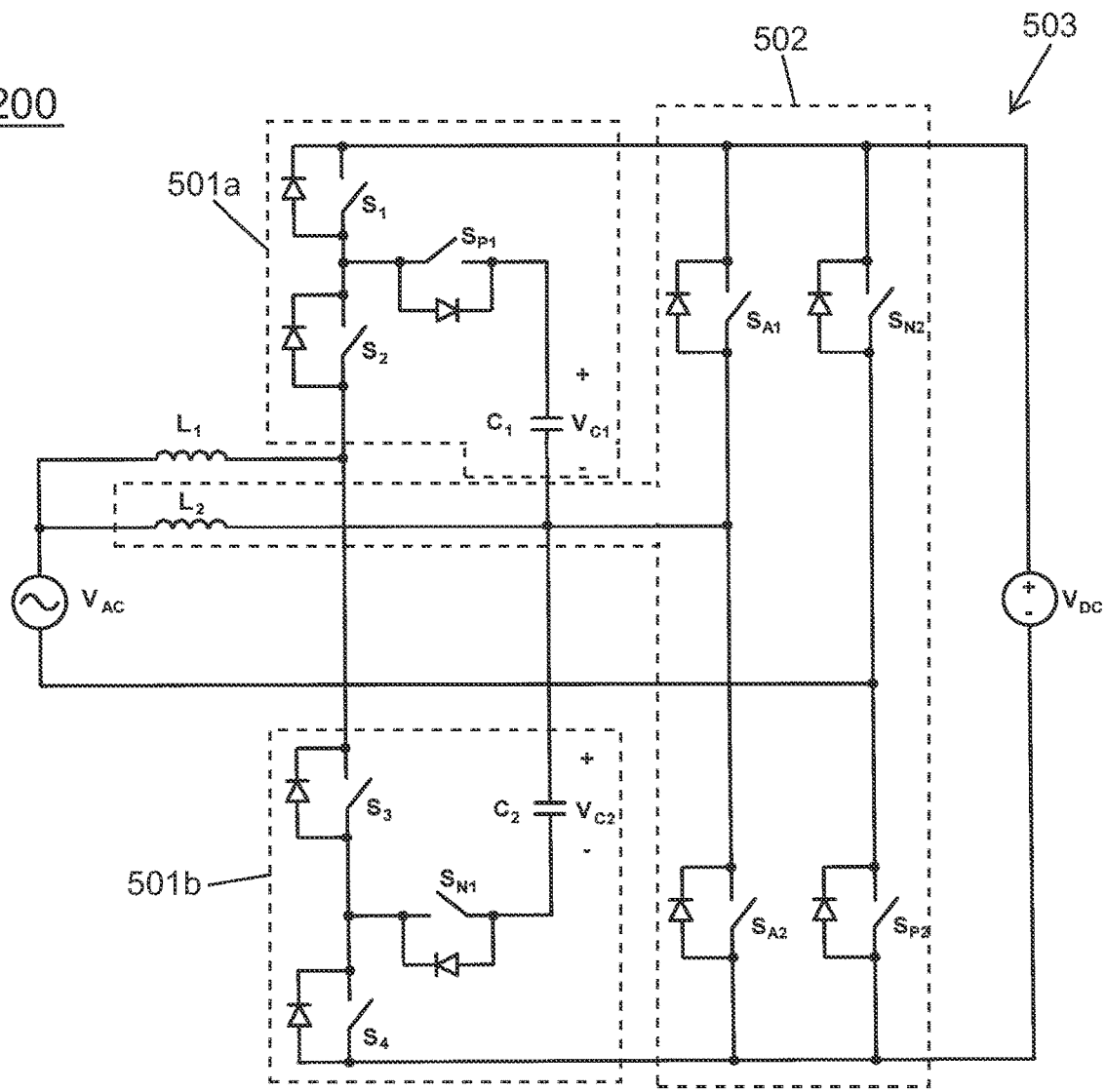
FIG. 22 shows bidirectional AC-DC power conversion system 2200, according to another embodiment of the present invention in which DC-side voltage $V_{DC}$ provides an AC-side output voltage $V_{AC}$.

AC-DC power conversion system 500 of FIG. 5 can deliver energy not only from an AC voltage source to a DC load, it can also be configured to deliver energy from a DC voltage source to an AC load. When configured to deliver power from a DC voltage source to an AC load, such a power conversion system operates as a step-down power inverter that provides a regulated low-voltage AC output voltage from a high-voltage DC input voltage. FIG. 22 shows bidirectional AC-DC power conversion system 2200, according to another embodiment of the present invention in which, in addition to PFC conversion from an AC source $V_{AC}$ to DC voltage $V_{DC}$, DC-side voltage $V_{DC}$ may provide an AC-side output voltage $V_{AC}$.

Figure 23:
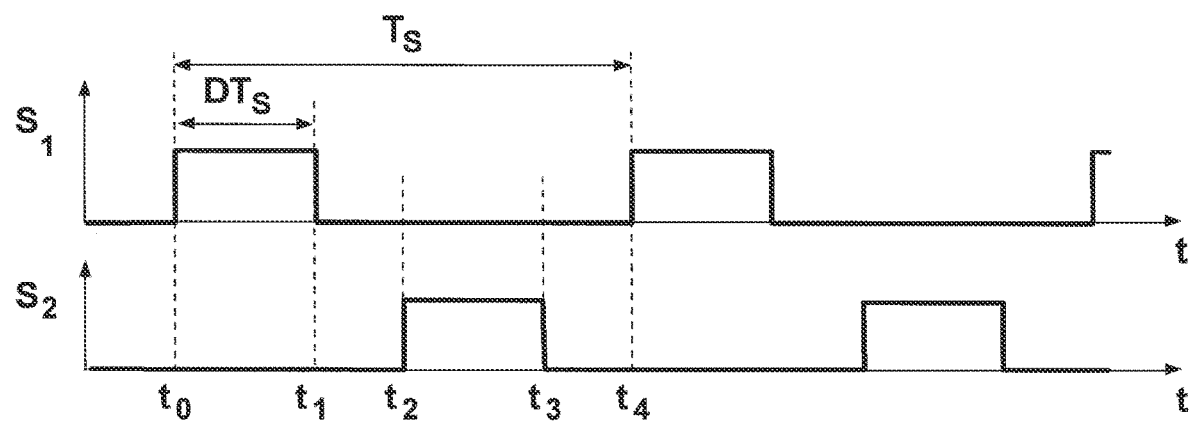
FIG. 23 is an activation timing diagram showing switch-activation control signals $S_1$ and $S_2$ that control switches $S_1$ and $S_2$ in bidirectional AC-DC power conversion system 2200 of FIG. 22, during the time interval when input voltage $V_{AC}$ is in a positive half-cycle and the magnitude of input DC voltage $V_{DC}$ is greater than one quarter of output AC voltage $V_{AC}$.

FIG. 23 is an activation timing diagram showing switch-activation control signals $S$ and $S_2$ that control switches $S_1$ and $S_2$ in bidirectional AC-DC power conversion system 2200 of FIG. 22, during the time interval when output AC voltage $V_{AC}$ is in a positive half-cycle and the magnitude of input DC voltage $V_{DC}$ is greater than one quarter of output AC voltage $V_{AC}$. During this time period, line-frequency switches $S_{P1}$ and $S_{P2}$ are conducting. As shown in FIG. 23, switch-activation control signals $S_1$ and $S_2$ each have a duty cycle D. Switch-activation control signals $S_1$ and $S_2$ are phase-shifted 180° relative to each other. The active portions of the duty cycles of switches $S_1$ and $S_2$ do not overlap (i.e., D<0.5), such that switches $S_1$ and $S_2$ are non-conducting during time intervals $(t_1, t_2)$ and $(t_3, t_4)$. The switching cycle $T_S$ is much shorter than a period of the line frequency.

Figure 24:
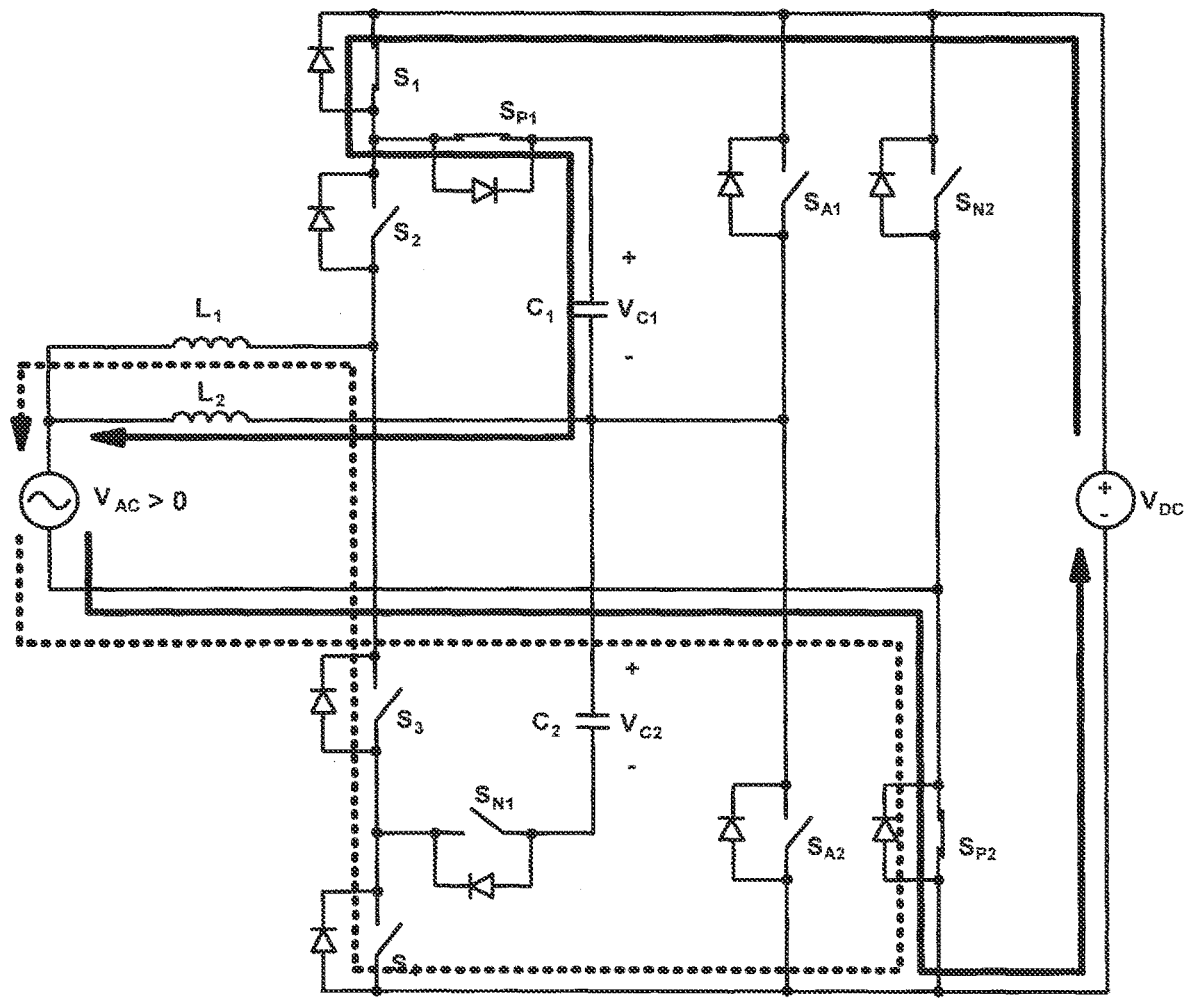
FIG. 24 shows the topological stage of bidirectional AC-DC power conversion system 2200 of FIG. 22 during time interval ($t_0$, $t_1$) under the operating conditions of FIG. 23.

FIG. 24 shows the topological stage of bidirectional AC-DC power conversion system 2200 of FIG. 22 during time interval $(t_0, t_1)$ under the operating conditions of FIG. 23. During this time interval, as shown in FIG. 24, switches $S_1$, $S_{P1}$ and $S_{P2}$ are conducting. Input voltage $V_{DC}$ is imposed across output voltage $V_{AC}$, inductor $L_2$ and capacitor $C_1$ by switches $S_1$, $S_{P1}$ and $S_{P2}$. Consequently, in the case where inductors $L_1$ and $L_2$ have the same inductance L, inductor currents $i_{L2}$ of inductor $L_2$ increases linearly at the slope $$\frac{di_{L2}}{dt} = \frac{V_{DC} - V_{C1} - V_{AC}(t)}{L_2}.$$

Output AC voltage $V_{AC}$ is imposed across inductor $L_1$ by switch $S_{P2}$ and the body diodes of switches $S_3$ and $S_4$. Inductor currents $i_{L1}$ of inductor $L_1$ decreases linearly with the slope $$\frac{di_{L1}}{dt} = -\frac{V_{AC}(t)}{L_1}.$$

In the case when inductors $L_1$ and $L_2$ have the same inductance L, their current changes at the slopes of $$\frac{di_L}{dt} = \frac{V_{DC} - V_{C1} - V_{AC}(t)}{L} \text{ and } \frac{di_L}{dt} = -\frac{V_{AC}(t)}{L},$$

respectively.

Figure 25:
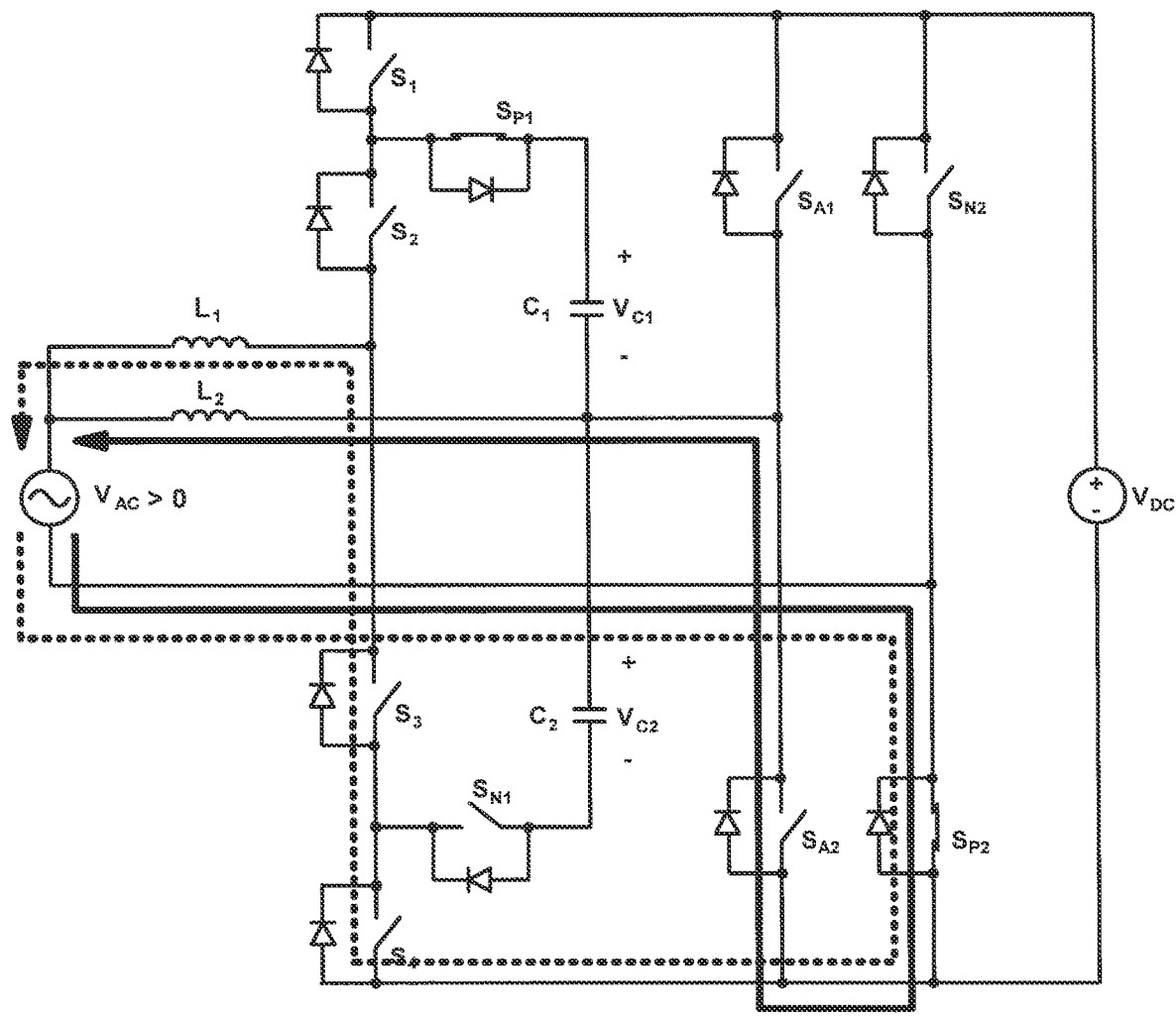
FIG. 25 shows the topological stage of bidirectional AC-DC power conversion system 2200 of FIG. 22 during time interval ($t_1$, $t_2$) or time interval ($t_3$, $t_4$) under the operating conditions of FIG. 23.

FIG. 25 shows the topological stage of bidirectional AC-DC power conversion system 2200 of FIG. 22 during time interval ($t_1$, $t_2$) or time interval ($t_3$, $t_4$) under the operating conditions of FIG. 23. As shown in FIG. 25, during either time interval, when neither switch $S_1$ nor switch $S_2$ is conducting, output voltage $V_{AC}$ is imposed across both inductor $L_1$ and inductor $L_2$ by switch $S_{P2}$ and the body diodes of switches $S_3$, $S_4$, and $S_{A2}$. As a result, inductor current $i_{L1}$ of inductor $L_1$ and inductor current $i_{L2}$ of inductor $L_2$ each decrease linearly with the slope $$\frac{di_L}{dt} = -\frac{V_{AC}(t)}{L},$$

in the case where inductors $L_1$ and $L_2$ have the same inductance L.

Figure 26:
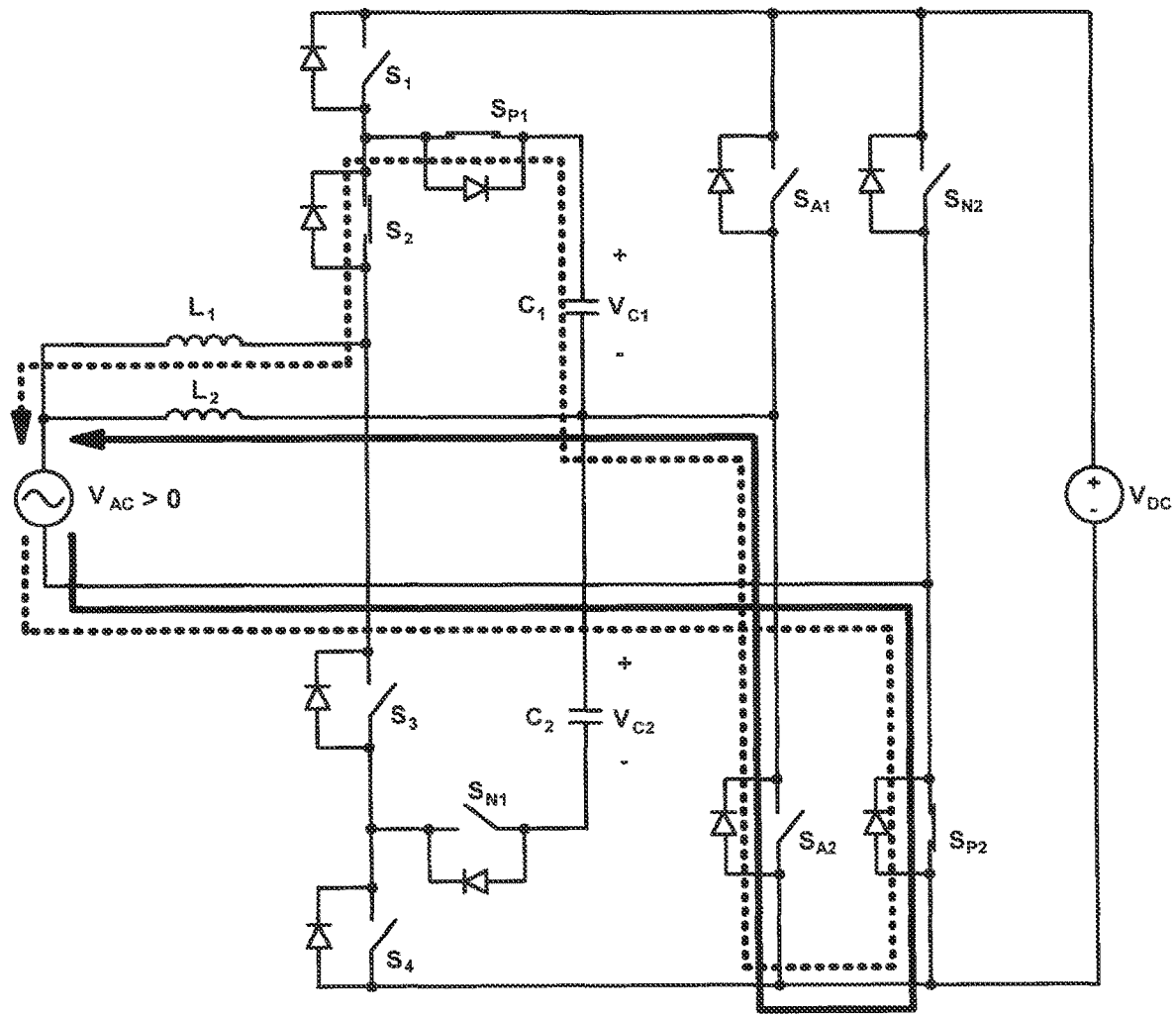
FIG. 26 shows the topological stage of bidirectional AC-DC power conversion system 2200 of FIG. 22 during time interval ($t_2$, $t_3$) under the operating conditions of FIG. 23.

FIG. 26 shows the topological stage of bidirectional AC-DC power conversion system 2200 of FIG. 22 during time interval ($t_2$, $t_3$) under the operating conditions of FIG. 23. During this time interval, as shown in FIG. 26, switch $S_2$ is conducting. Output voltage $V_{AC}$ is imposed across energy capacitor $C_1$ and inductor $L_1$ by switches $S_2$, $S_{P1}$, and $S_{P2}$ and the body diode of switch $S_{A2}$. As a result, inductor currents $i_{L1}$ of inductor $L_1$ increases linearly with the slope $$\frac{di_L}{dt} = \frac{V_{C1} - V_{AC}(t)}{L},$$

in the case where inductors $L_1$ and $L_2$ have the same inductance L. Output voltage $V_{AC}$ is also imposed across inductor $L_2$ by switch $S_{P2}$ and the body diode of switch $S_{A2}$. Inductor currents $i_{L2}$ of inductor $L_2$ decreases linearly with the slope $$\frac{di_L}{dt} = \frac{V_{AC}(t)}{L},$$

in the case where inductors $L_1$ and $L_2$ have the same inductance L.

Assuming output voltage $V_{AC}$ has a line-frequency AC voltage, which is substantially constant during switching cycle $T_S$, the voltage across energy storage capacitor $C_1$ can be derived from the volt-second balance equations for $L_1$ and $L_2$, which are, respectively:

$$[T_S-DT_S]\|V_{AC}(t)\|=[\|V_{AC}(t)\|-V_{C1}(t)][DT_S] \qquad (12)$$

$$[T_S-DT_S]\|V_{AC}(t)\|=[V_{DC}-V_{C1}(t)-\|V_{AC}(t)\|][DT_S] \qquad (13)$$

Therefore, from Equations (12) and (13), output voltage $V_{AC}$ is given by:

$$\|V_{AC}(t)\| = \frac{V_{DC}}{2} \qquad (14)$$

Hence, the voltage conversion ratio of bidirectional AC-DC power conversion system 2200 of FIG. 22, during energy transfer from DC voltage $V_{DC}$ to output voltage $V_{AC}$ and operates with duty cycle D<0.5 is given by $$\frac{\|V_{AC}(t)\|}{V_{DC}} = \frac{D}{2} \qquad (15)$$

Figure 27:
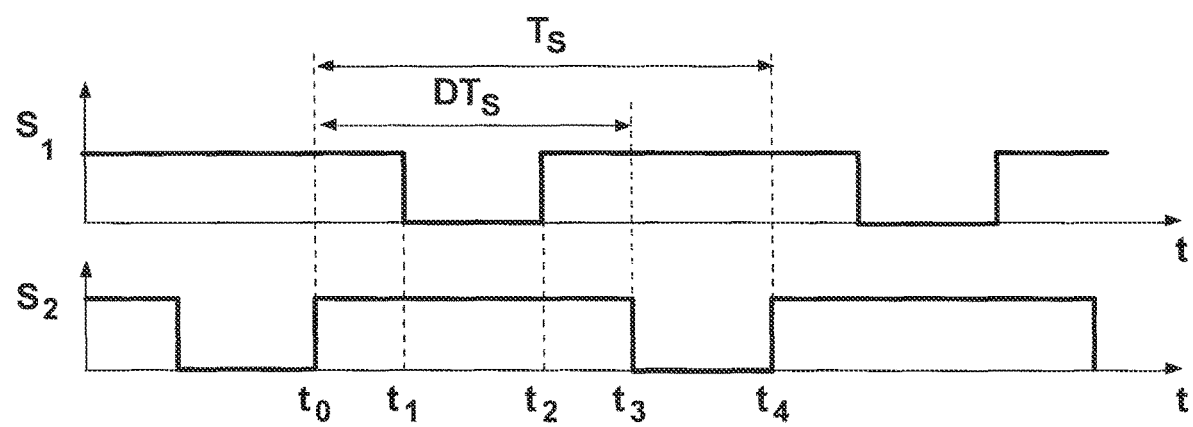
FIG. 27 shows the activation timing diagrams of the switch-activation control signals $S_1$ and $S_2$ that control switches $S_1$ and $S_2$, when output AC voltage $V_{AC}$ is in a positive half-cycle and the magnitude of output AC voltage $V_{AC}$ is between one-half and one-quarter of input voltage $V_{DC}$ for bidirectional AC-DC power conversion system 2200 of FIG. 22 when energy is delivered from input voltage source $V_{DC}$ to output voltage $V_{AC}$.

FIG. 27 shows the activation timing diagrams of the switch-activation control signals $S_1$ and $S_2$ that control switches $S_1$ and $S_2$, when output AC voltage $V_{AC}$ is in a positive half-cycle and the magnitude of output AC voltage $V_{AC}$ is between one-half and one-quarter of input voltage $V_{DC}$ for bidirectional AC-DC power conversion system 2200 of FIG. 22 when energy is delivered from input voltage source $V_{DC}$ to output voltage $V_{AC}$. Switches $S_{P1}$ and $S_{P2}$ are conducting during switching period $T_S$. Switch-activation control signals $S_1$ and $S_2$ are phase-shifted 180° relative to each other. Switch-activation control signals $S_1$, and $S_2$ overlap in the active portions of their duty cycles (i.e., D>0.5), such that switches $S_1$ and $S_2$ are simultaneously conducting during time intervals ($t_0$, $t_1$) and ($t_2$, $t_3$). The switching cycle $T_S$ is much shorter than a period of the line frequency.

Figure 28:
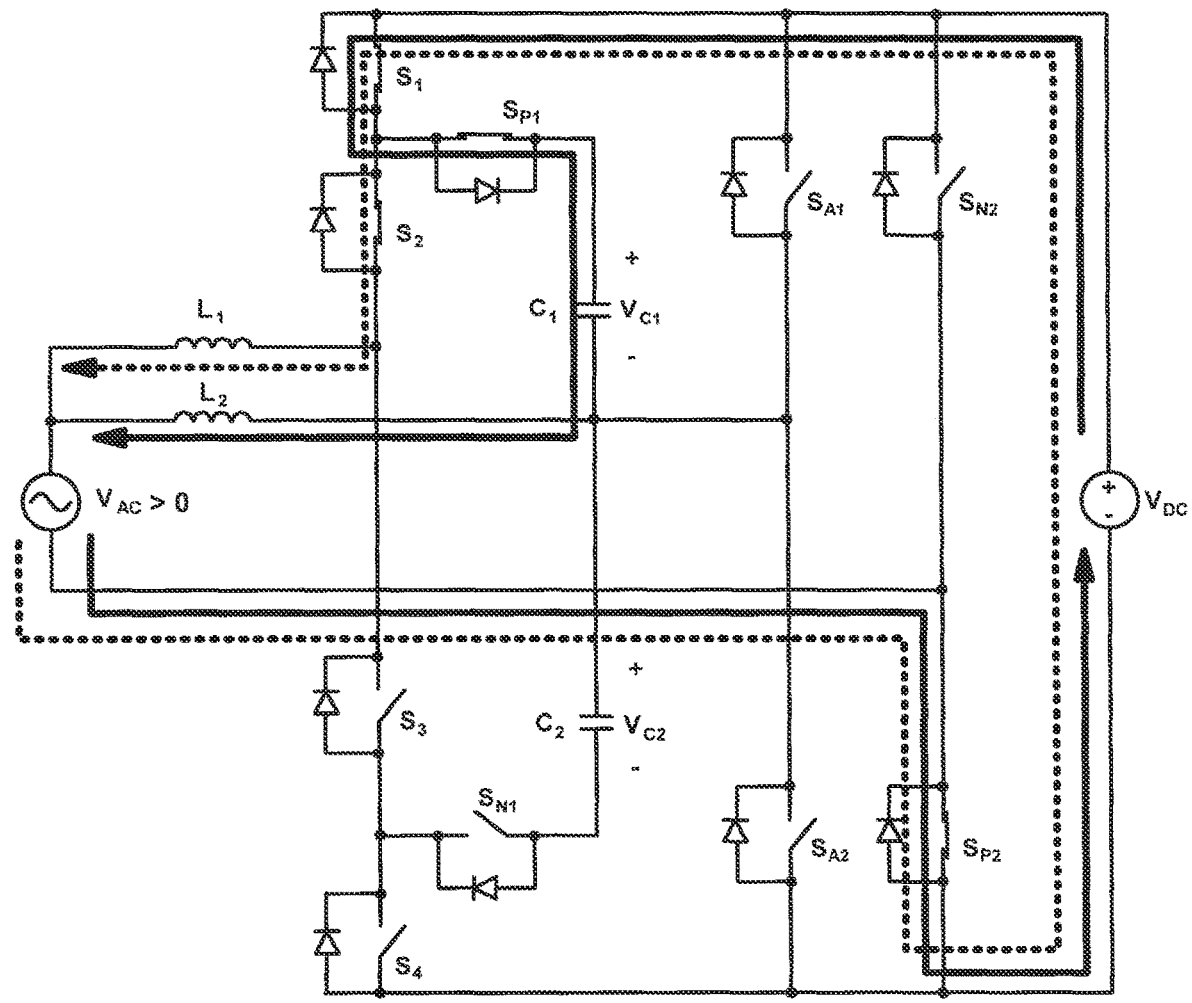
FIG. 28 shows the topological stage of bidirectional AC-DC power conversion system 2200 of FIG. 22 during time interval ($t_0$, $t_1$) or time interval ($t_2$, $t_3$) under the operating conditions of FIG. 27.

FIG. 28 shows the topological stage of bidirectional AC-DC power conversion system 2200 of FIG. 22 during time interval ($t_0$, $t_1$) or time interval ($t_2$, $t_3$) under the operating conditions of FIG. 27. During either interval, switches $S_1$, $S_2$, $S_{P1}$ and $S_{P2}$ are conducting. Input voltage $V_{DC}$ is imposed across output voltage $V_{AC}$ and inductor $L_1$ by switches $S_1$, $S_2$ and $S_{P2}$, so that inductor current $i_{L1}$ of inductor $L_1$ increases linearly with the slope $$\frac{di_L}{dt} = \frac{V_{DC} - V_{AC}(t)}{L},$$

in the case where inductors $L_1$ and $L_2$ have the same inductance L.

The topological stages of bidirectional AC-DC power conversion system 2200 for time intervals ($t_1$, $t_2$) and ($t_3$, $t_4$) under the operating conditions of FIG. 27 are substantially shown in FIGS. 26 and 24, respectively. Thus, the volt-second balance equation for inductor $L_1$:

$$[T_S-DT_S]\|V_{AC}(t)\|=[V_{DC}-\|V_{AC}(t)\|][2DT_S-T_S]+[V_{C1}(t)-\|V_{AC}(t)\|][T_S-DT_S] \qquad (16)$$

Deriving voltage $V_{C1}$ across energy storage capacitor $C_1$ from Equation (16):

$$V_{C1}(t) = \frac{\|V_{AC}(t)\| - (2D-1)V_{DC}}{1-D} \qquad (17)$$

Voltage $V_{C1}$ also can be derived from the volt-second balance equation for $L_2$:

$$\|V_{AC}(t)\|[T_S-DT_S]=[V_{DC}-V_{C1}(t)-\|V_{AC}(t)\|][DT_S] \quad (18)$$

Equation (18) provides voltage $V_{C1}$ across energy storage capacitor $C_1$ to be $$V_{C1}(t) = V_{DC} - \frac{\|V_{AC}(t)\|}{D} \quad (19)$$

From Equations (17) and (19), AC output voltage $V_{AC}$ is given by:

$$\|V_{AC}(t)\|=D^2 V_{DC} \quad (20)$$

Figure 2:
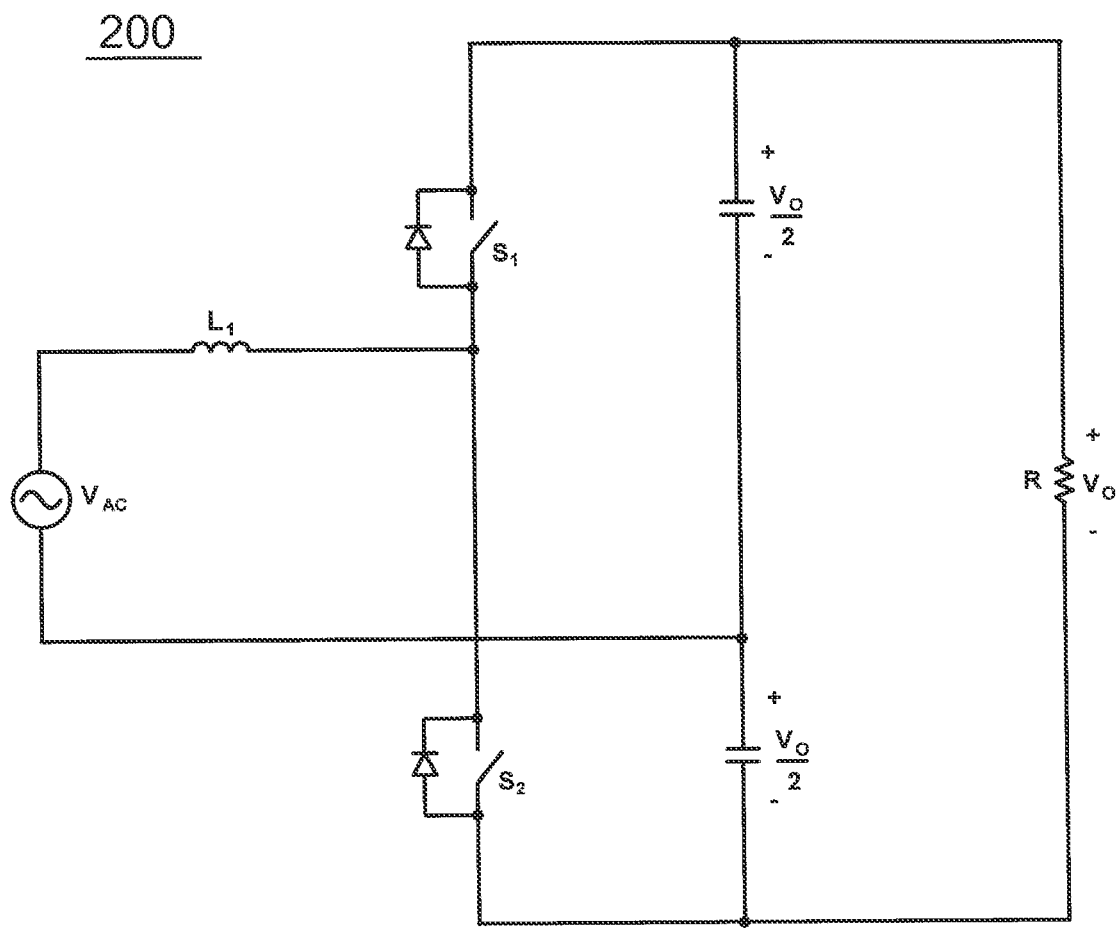
FIG. 2 shows AC-DC boost converter 200, which exemplifies a half-bridge PFC topology illustrating one way to achieve an extended voltage gain.
Figure 3:
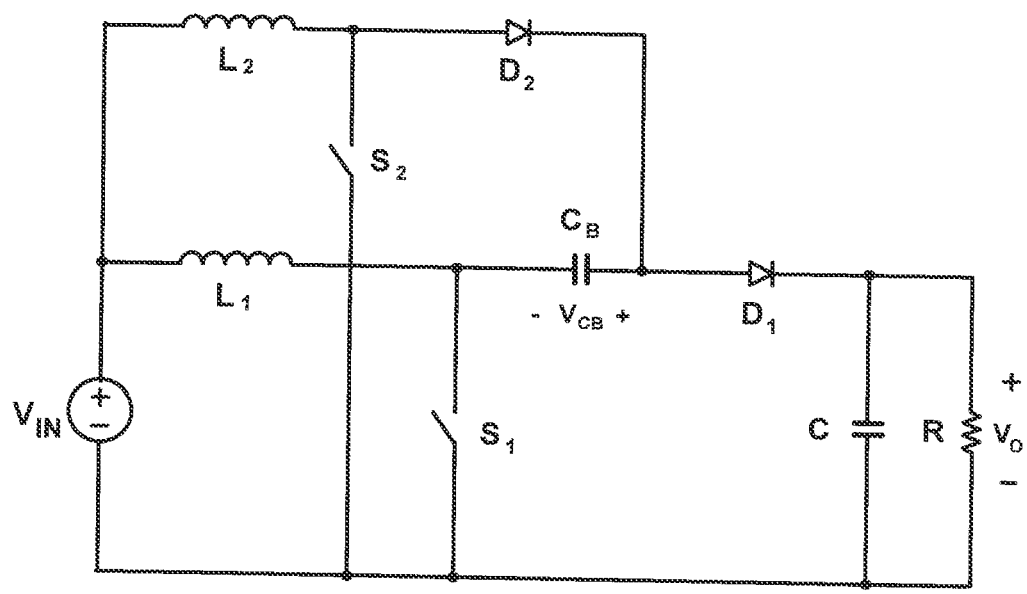
FIG. 3 shows two-switch, two-inductor, step-up DC-DC power converter 300, which illustrates a DC-DC voltage-doubler boost topology.

Hence, the voltage conversion ratio of bidirectional AC-DC power conversion system 2200 of FIG. 2, when it operates with duty cycle D>0.5 is given by:

$$\frac{\|V_{AC}(t)\|}{V_{DC}} = D^2 \quad (21)$$

From Equations (19) and (20), voltage $V_{C1}$ of energy storage capacitor is therefore given by:

$$V_{C1}(t)=(1-D)V_{DC} \quad (22)$$

Figure 29:
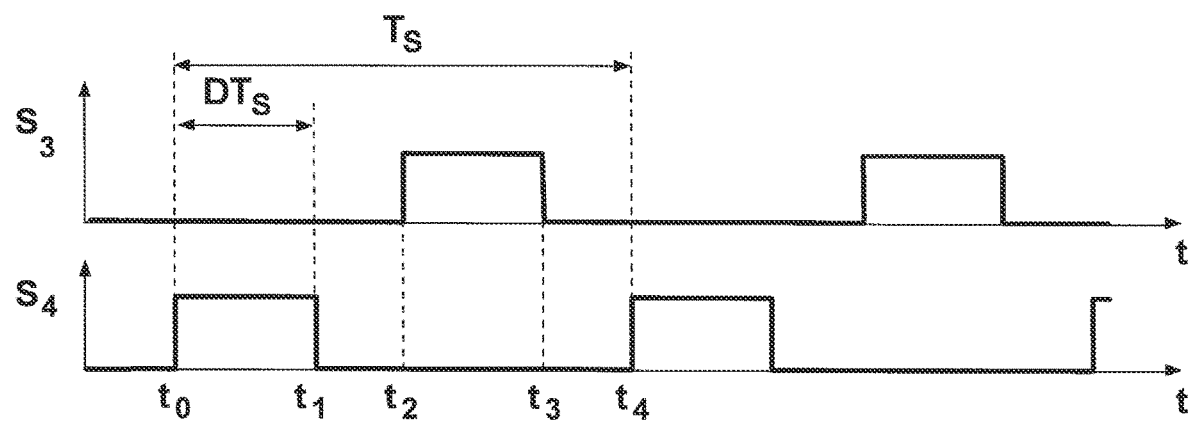
FIG. 29 is an activation timing diagram showing switch-activation control signals $S_3$ and $S_4$ that control switches $S_3$ and $S_4$ in bi-direction AC-DC power conversion system 2200 of FIG. 22, during the time interval when output voltage $V_{AC}$ is in a negative half-cycle and the magnitude of output AC voltage $V_{AC}$ is less than one quarter input DC voltage $V_{DC}$.

FIG. 29 is an activation timing diagram showing switch-activation control signals $S_3$ and $S_4$ that control switches $S_3$ and $S_4$ in bidirectional AC-DC power conversion system 2200 of FIG. 22, during the time interval when output voltage $V_{AC}$ is in a negative half-cycle and the magnitude of output AC voltage $V_{AC}$ is less than one quarter of input DC voltage $V_{DC}$. During this time period, line-frequency switches $S_{N1}$ and $S_{N2}$ are conducting. As shown in FIG. 29, switch-activation control signals $S_3$ and $S_4$ each have a duty cycle D. Switch-activation control signals $S_3$ and $S_4$ are phase-shifted 180° relative to each other. The active portions of the duty cycles of switches $S_3$ and $S_4$ do not overlap (i.e., D<0.5), such that neither switch $S_3$ nor switch $S_4$ are conducting during time intervals $(t_1, t_2)$ and $(t_3, t_4)$. The switching cycle $T_S$ is much shorter than a period of the line frequency.

Figure 30:
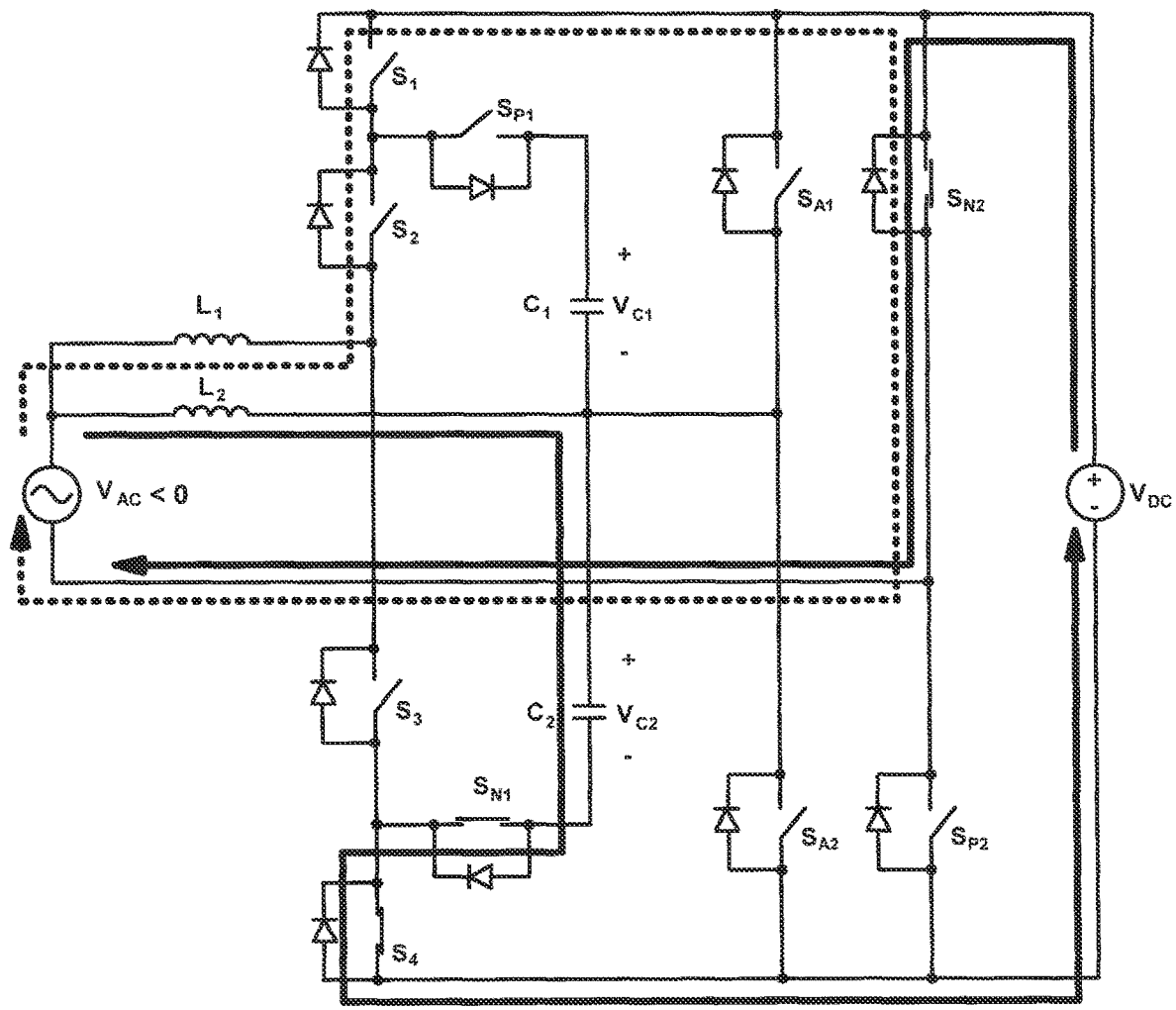
FIG. 30 shows the topological stage of bidirectional AC-DC power conversion system 2200 of FIG. 22 during time interval ($t_0$, $t_1$) under the operating conditions of FIG. 29.

FIG. 30 shows the topological stage of bidirectional AC-DC power conversion system 2200 of FIG. 22 during time interval $(t_0, t_1)$ under the operating conditions of FIG. 29. During this time interval, as shown in FIG. 30, switches $S_4$, $S_{N1}$ and $S_{N2}$ are conducting. Input voltage $V_{DC}$ is imposed across output voltage $V_{AC}$, inductor $L_2$ and capacitor $C_2$ by switches $S_4$, $S_{N1}$, and $S_{N2}$. Consequently, in the case where inductors $L_1$ and $L_2$ have the same inductance L, inductor currents $i_{L2}$ of inductor $L_2$ increases linearly at the slope $$\frac{di_L}{dt} = \frac{V_{DC} - V_{C1} - V_{AC}(t)}{L}.$$

Output AC voltage $V_{AC}$ is imposed across inductor $L_1$ by switch $S_{N2}$ and the body diodes of switches $S_1$ and $S_2$. Inductor currents $i_{L1}$ of inductor $L_1$ decreases linearly with the slope $$\frac{di_L}{dt} = -\frac{V_{AC}(t)}{L}.$$

Figure 31:
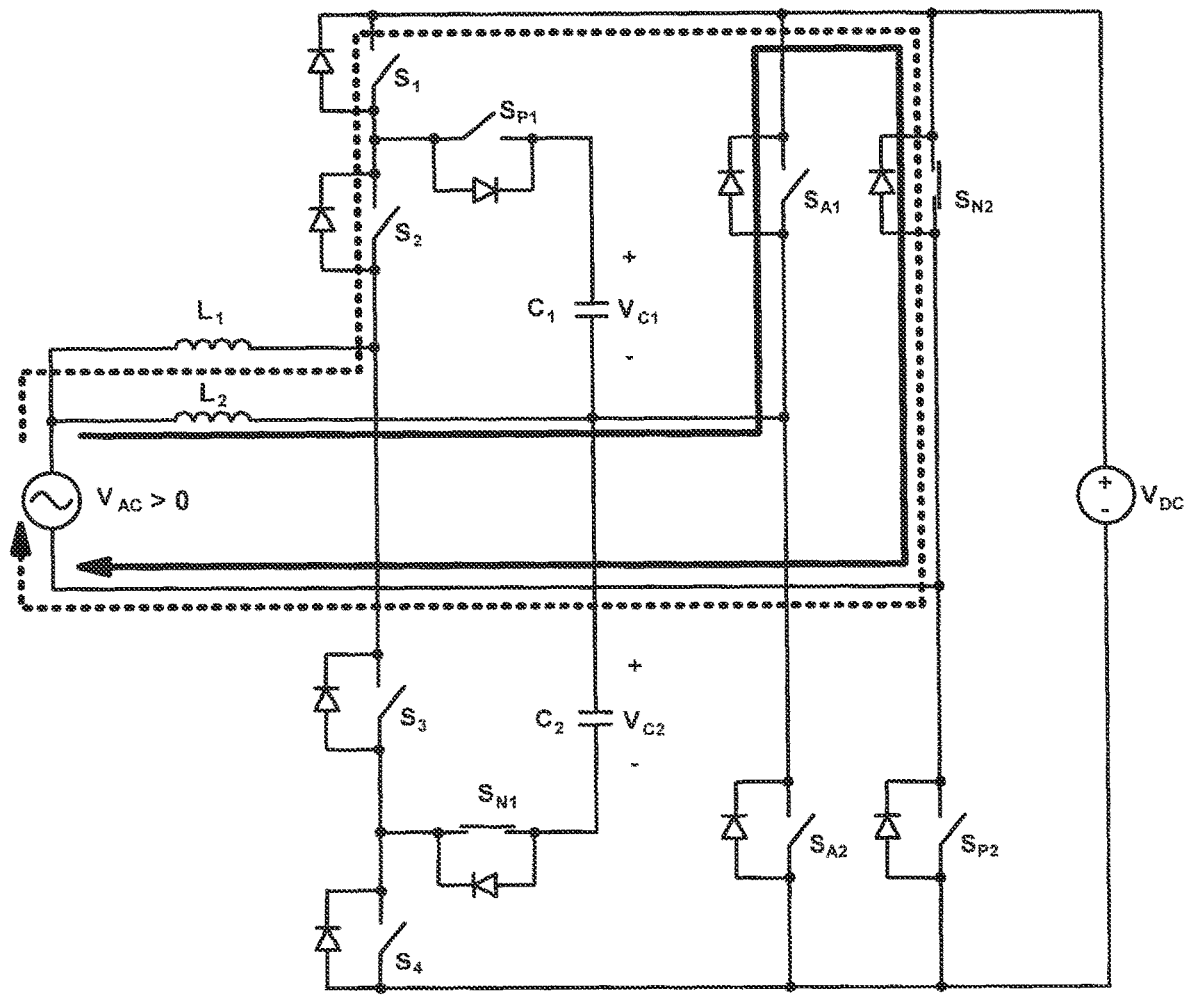
FIG. 31 shows the topological stage of bidirectional AC-DC power conversion system 2200 of FIG. 22 during time interval ($t_1$, $t_2$) or time interval ($t_3$, $t_4$) under the operating conditions of FIG. 29.

FIG. 31 shows the topological stage of bidirectional AC-DC power conversion system 2200 of FIG. 22 during time interval $(t_1, t_2)$ or time interval $(t_3, t_4)$ under the operating conditions of FIG. 29. As shown in FIG. 31, during either time interval, neither switch $S_1$ nor switch $S_2$ is conducting. Output voltage $V_{AC}$ is imposed across both inductor $L_1$ and inductor $L_2$ by switch $S_{N2}$ and the body diodes of switches $S_1$, $S_2$, and $S_{41}$. As a result, inductor current $i_{L1}$ of inductor $L_1$ and inductor current $i_{L2}$ of inductor $L_2$ each decrease linearly with the slope $$\frac{di_L}{dt} = -\frac{V_{AC}(t)}{L},$$

in the case where inductors $L_1$ and $L_2$ have the same inductance L.

Figure 32:
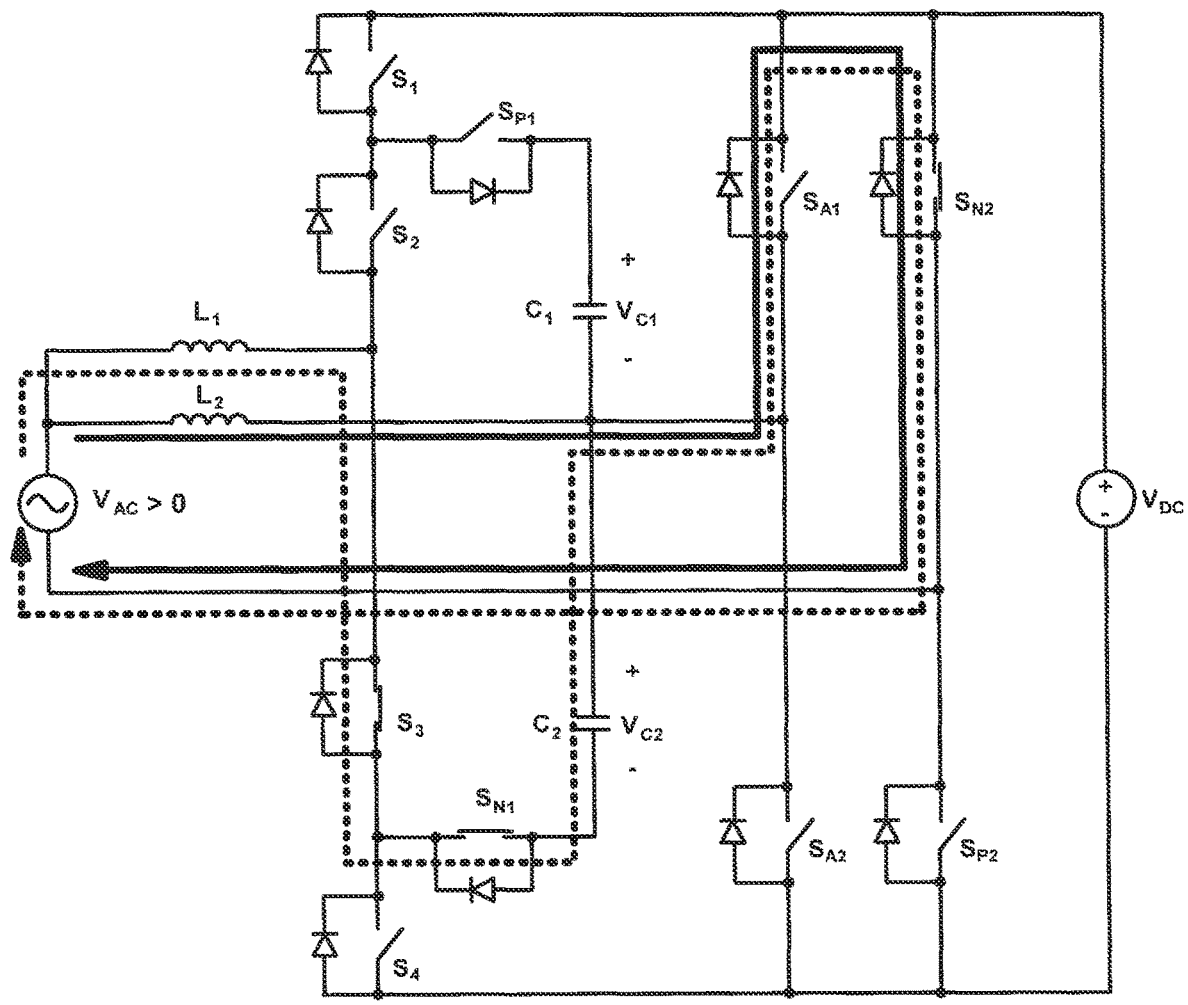
FIG. 32 shows the topological stage of bidirectional AC-DC power conversion system 2200 of FIG. 22 during time interval ($t_2$, $t_3$) under the operating conditions of FIG. 29.

FIG. 32 shows the topological stage of bidirectional AC-DC power conversion system 2200 of FIG. 22 during time interval $(t_2, t_3)$ under the operating conditions of FIG. 29. During this time interval, as shown in FIG. 32, switch $S_3$ is conducting. Output voltage $V_{AC}$ is imposed across energy capacitor $C_1$ and inductor $L_1$ by switches $S_3$, $S_{N1}$, and $S_{N2}$ and the body diode of switch $S_{41}$. As a result, inductor currents $i_{L1}$ of inductor $L_1$ increases linearly with the slope $$\frac{di_L}{dt} = \frac{V_{C1} - V_{AC}(t)}{L},$$

in the case where inductors $L_1$ and $L_2$ have the same inductance L. Output voltage $V_{AC}$ is also imposed across inductor $L_2$ by switch $S_{N2}$ and the body diode of switch $S_{41}$. Inductor currents $i_{L2}$ of inductor $L_2$ decreases linearly with the slope $$\frac{di_L}{dt} = \frac{V_{AC}(t)}{L},$$

in the case where inductors $L_1$ and $L_2$ have the same inductance L.

Figure 33:
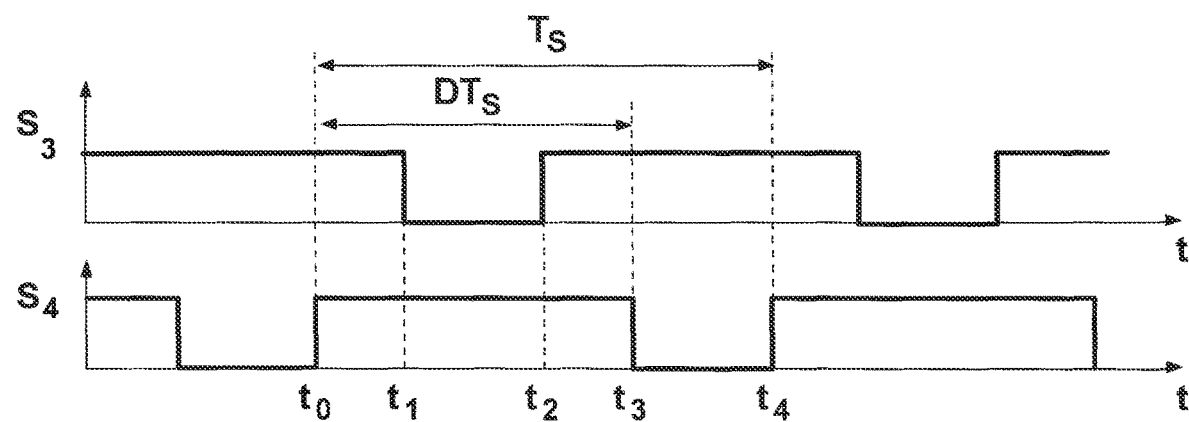
FIG. 33 shows the activation timing diagrams of the switch-activation control signals $S_3$ and $S_4$ that control switches $S_3$ and $S_4$, when output AC voltage $V_{AC}$ is in a negative half-cycle and the magnitude of output AC voltage $V_{AC}$ is between one-quarter and one-half input voltage $V_{DC}$ for bidirectional AC-DC power conversion system 2200 of FIG. 22, when energy is delivered from input voltage source $V_{DC}$ to output voltage $V_{AC}$.

FIG. 33 shows the activation timing diagrams of the switch-activation control signals $S_3$ and $S_4$ that control switches $S_3$ and $S_4$, when output AC voltage $V_{AC}$ is in a negative half-cycle and the magnitude of output AC voltage $V_{AC}$ is between one-quarter and one-half input voltage $V_{DC}$ for bidirectional AC-DC power conversion system 2200 of FIG. 22, when energy is delivered from input voltage source $V_{DC}$ to output voltage $V_{AC}$. Switches $S_{N1}$ and $S_{N2}$ are conducting during switching period $T_S$. Switch-activation control signals $S_3$ and $S_4$ are phase-shifted 180° relative to each other. Switch-activation control signals $S_3$ and $S_4$ overlap in the active portions of their duty cycles (i.e., D>0.5), such that switches $S_3$ and $S_4$ are simultaneously conducting during time intervals $(t_0, t_1)$ and $(t_2, t_3)$. The switching cycle $T_S$ is much shorter than a period of the line frequency.

Figure 34:
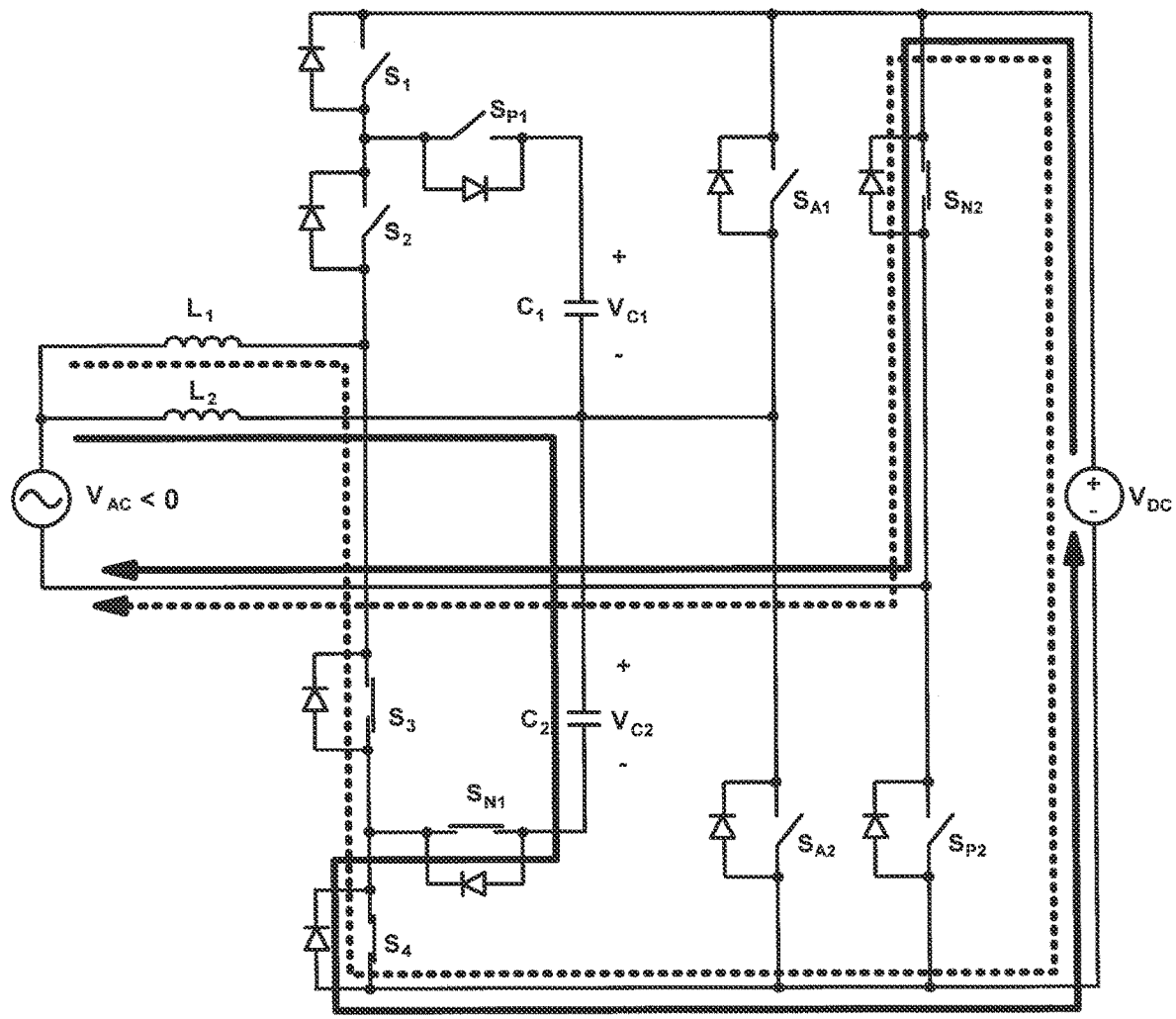
FIG. 34 shows the topological stage of bidirectional AC-DC power conversion system 2200 of FIG. 22 during time interval ($t_0$, $t_1$) or time interval ($t_2$, $t_3$) under the operating conditions of FIG. 33.

FIG. 34 shows the topological stage of bidirectional AC-DC power conversion system 2200 of FIG. 22 during time interval $(t_0, t_1)$ or time interval $(t_2, t_3)$ under the operating conditions of FIG. 33. During either interval, switches $S_3$, $S_4$, $S_{N1}$ and $S_{N2}$ are conducting. Input voltage $V_{DC}$ is imposed across output voltage $V_{AC}$ and inductor $L_1$ by switches $S_3$, $S_4$ and $S_{N2}$, so that inductor current $i_{L1}$ of inductor $L_1$ increases linearly with the slope $$\frac{di_L}{dt} = \frac{V_{DC} - V_{AC}(t)}{L},$$

in the case where inductors $L_1$ and $L_2$ have the same inductance L.

The topological stages of bidirectional AC-DC power conversion system 2200 for time intervals $(t_1, t_2)$ and $(t_3, t_4)$ are substantially shown in FIGS. 30 and 32, respectively.

Figure 35:
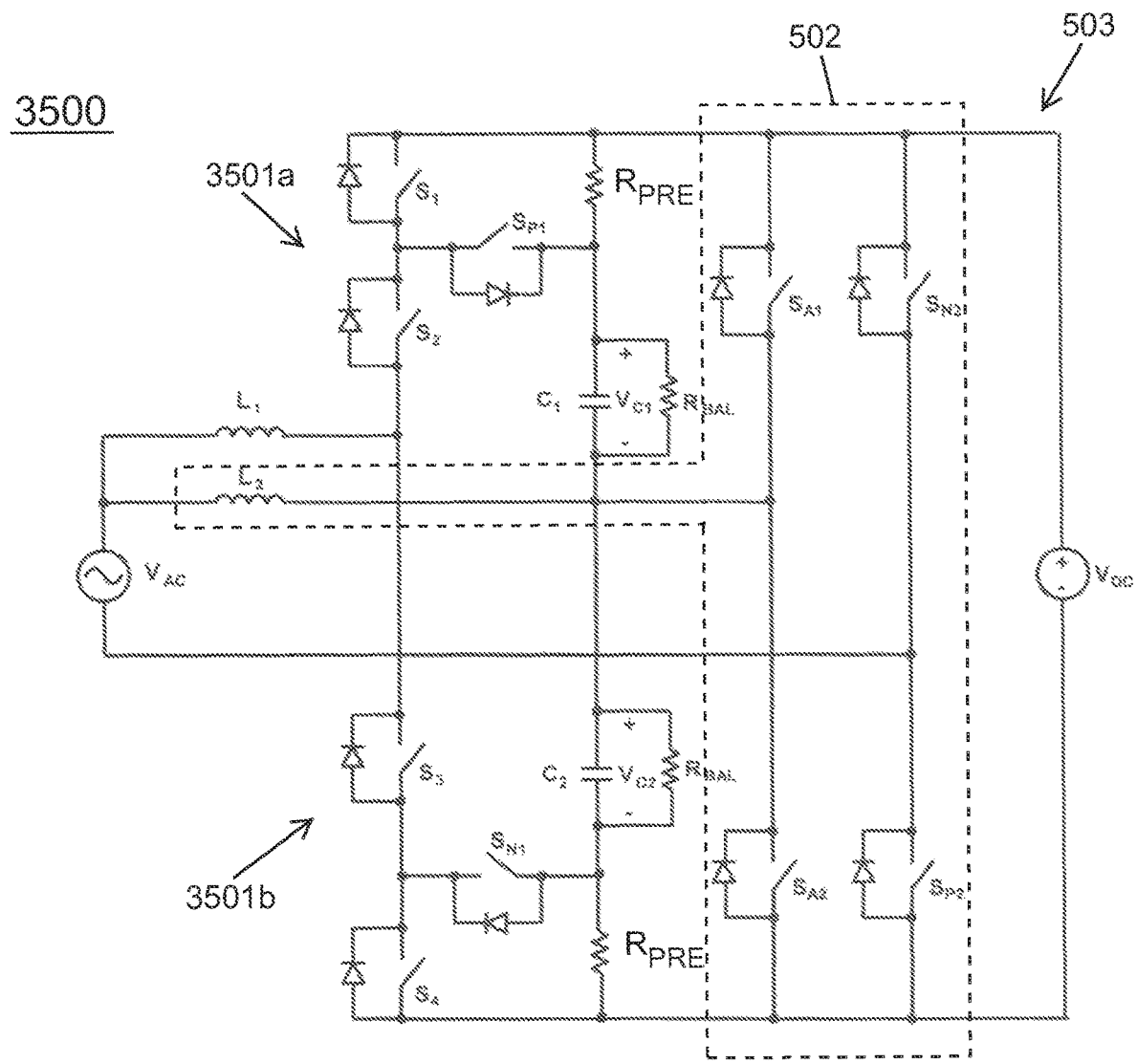
FIG. 35 shows bidirectional AC-DC power conversion system 3500, according to another embodiment of the present invention; AC-DC power conversion system 3500 includes pre-charge resistor $R_{PRE}$ and voltage-balancing resistor $R_{BAL}$ in each of voltage-doubler stage 3501a and 3501b.

FIG. 35 shows bidirectional AC-DC power conversion system 3500, according to another embodiment of the present invention; AC-DC power conversion system 3500 includes pre-charge resistor $R_{PRE}$ and balance resistor $R_{BAL}$ in each of voltage-doubler stage 3501a and 3501b. In FIG. 35, balance resistor $R_{BAL}$ in each of voltage-doubler stage 3501a and 3501b is configured to be a voltage-balancing resistor and is connected across capacitors $C_1$ and $C_2$ in voltage-doubler stages 3501a and 3501b, respectively. Before each switching cycle (i.e., before switches $S_1$, $S_2$, $S_3$ or $S_4$ are activated by their respective switch-activation control signals), the voltages across energy storage capacitors $C_1$ and $C_2$ are slowly charged by the currents through the respective pre-charge resistors $R_{PRE}$, which are coupled to input voltage $V_{DC}$. In addition, the voltages across capacitors $C_1$ and $C_2$ are equalized by the parallel connected voltage-balancing resistors $R_{BAL}$. Consequently, the voltages across energy storage capacitors $C_1$ and $C_2$ each reach approximately one-half voltage Vic before operations in bidirectional AC-DC power conversion system 3500 begin for the switching cycle.

Figure 36:
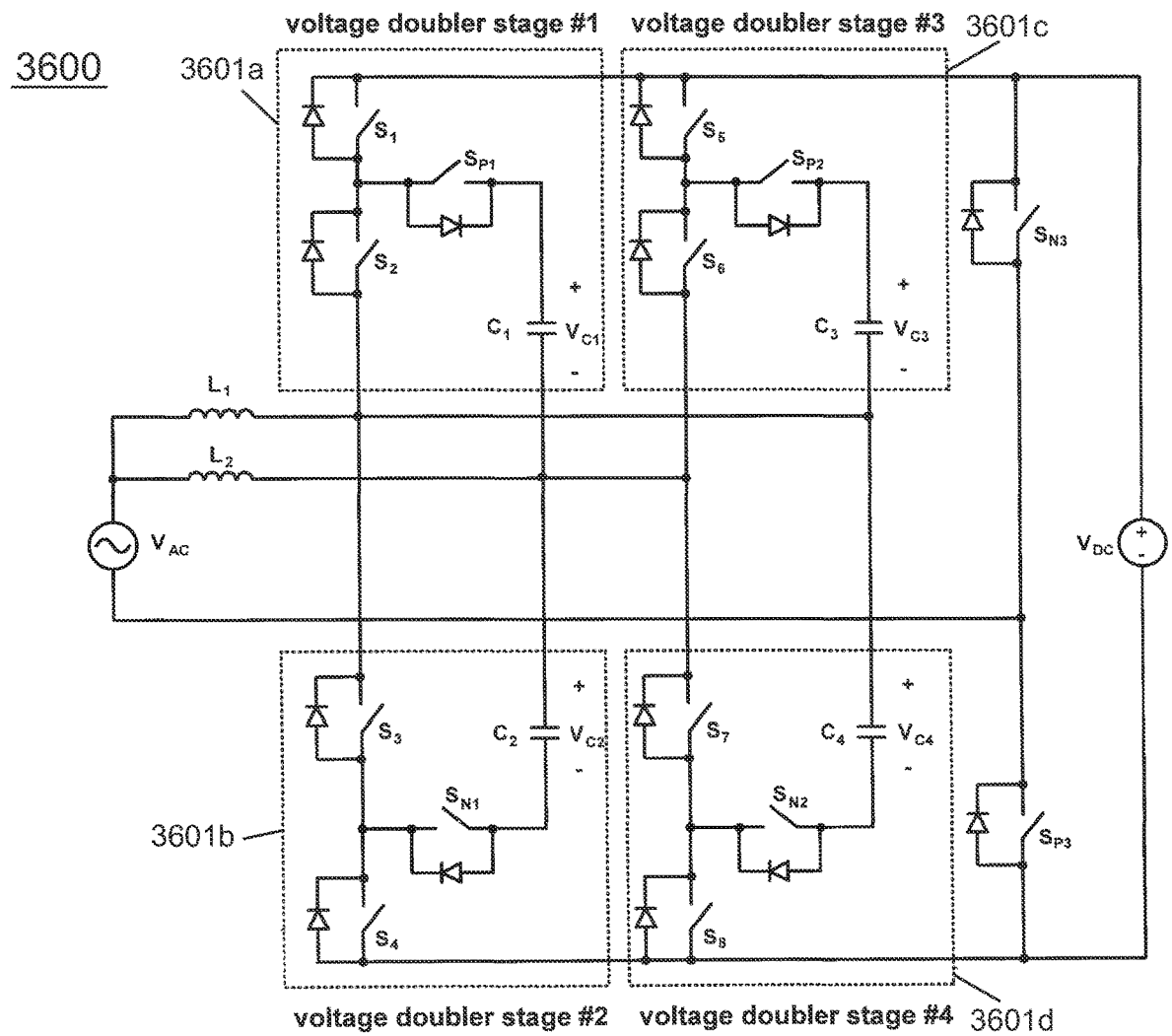
FIG. 36 shows bidirectional AC-DC power conversion system 3600 with two phase-symmetrical legs, formed by (i) voltage-doubler stages 3601a and 3601b and (ii) voltage-doubler stages 3601c and 3601d, respectively, according to one embodiment of the present invention.

FIG. 36 shows bidirectional AC-DC power conversion system 3600 with two phase-symmetrical legs, formed by (i) voltage-doubler stages 3601a and 3601b and (ii) voltage-doubler stages 3601c and 3601d, respectively, according to one embodiment of the present invention. Bidirectional AC-DC power conversion system 3600 couples between AC voltage source $V_{AC}$ and DC voltage source Vic and includes voltage-doubler stages 3601a, 3601b, 3601c, and 3601d, inductors $L_1$ and $L_2$, and synchronous rectifiers $S_{N3}$ and $S_{P3}$. Voltage-doubler stage 3601a includes series-connected switches $S_1$ and $S_2$ that operate at the frequency of the switching cycle (i.e., "operating frequency") of bidirectional AC-DC power conversion system 3600, while switch $S_{P1}$ operates at line frequency of AC voltage source $V_{AC}$. The operating frequency is substantially higher than the line frequency. Switch $S_{P1}$ is conducting during the positive half-cycle of AC voltage $V_{AC}$ and is non-conducting during the negative half-cycle of AC voltage $V_{AC}$. Voltage-doubler stage 3601a further includes energy storage capacitor $C_1$, which connected to the common terminal between series-connected switches $S_1$ and $S_2$ by switch $S_{P1}$. The common terminal between synchronous rectifier or switches $S_{N3}$ and $S_{P3}$ is coupled to the negative terminal of AC voltage source $V_{AC}$.

Voltage-doubler stage 3601b includes series-connected switches $S_3$ and $S_4$ that operate at the operating frequency, while switch $S_{N1}$ operates at line frequency of AC voltage source $V_{AC}$. Switch $S_{N1}$ is conducting during the negative half-cycle of AC voltage $V_{AC}$ and is non-conducting during the positive half-cycle of AC voltage $V_{AC}$. Voltage-doubler stage 3601b further includes energy storage capacitor $C_2$, which connected to the common terminal between series-connected switches $S_3$ and $S_4$ by switch $S_{N1}$.

Voltage-doubler stage 3601c includes series-connected switches $S_5$ and $S_6$ that operate at the operating frequency, while switch $S_{P2}$ operates at line frequency of AC voltage source $V_{AC}$. Switch $S_{P2}$ is conducting during the positive half-cycle of AC voltage $V_{AC}$ and is non-conducting during the negative half-cycle of AC voltage $V_{AC}$. Voltage-doubler stage 3601c further includes energy storage capacitor $C_3$, which connected to the common terminal between series-connected switches $S_5$ and $S_6$ by switch $S_{P2}$.

Voltage-doubler stage 3601d includes series-connected switches $S_7$ and $S_8$ that operate at the operating frequency, while switch $S_{N2}$ operates at line frequency of AC voltage source $V_{AC}$. Switch $S_{N2}$ is conducting during the negative half-cycle of AC voltage $V_{AC}$ and is non-conducting during the positive half-cycle of AC voltage $V_{AC}$. Voltage-doubler stage 3601d further includes energy storage capacitor $C_4$, which connected to the common terminal between series-connected switches $S_7$ and $S_8$ by switch $S_{N2}$.

As shown in FIG. 36, switch $S_2$ of voltage-doubler stages 3601a and switch $S_3$ of voltage-doubler state 3601b are connected at a common terminal, which is also the common terminal connecting energy storage capacitors $C_3$ and $C_4$ of voltage-doubler stages 3601c and 3601d. Likewise, switch $S_5$ of voltage-doubler stages 3601c and switch $S_6$ of voltage-doubler state 3601d are connected at a common terminal, which is also the common terminal connecting energy storage capacitors $C_1$ and $C_2$ of voltage-doubler stages 3601a and 3601b. AC voltage $V_{AC}$ is coupled through inductor $L_1$ to the common terminal between switches $S_2$ and $S_3$ in voltage-doubler stages 3601a and 3601b, which is also the common terminal between energy capacitors $C_3$ and $C_4$ of voltage-doubler stages 3601c and 3601d. Likewise, AC voltage $V_{AC}$ is coupled through inductor $L_2$ to the common terminal between switches $S_6$ and $S_7$ in voltage-doubler stages 3601c and 3601d, which is also the common terminal between energy capacitors $C_1$ and $C_2$ of voltage-doubler stages 3601a and 3601b.

Figure 37:
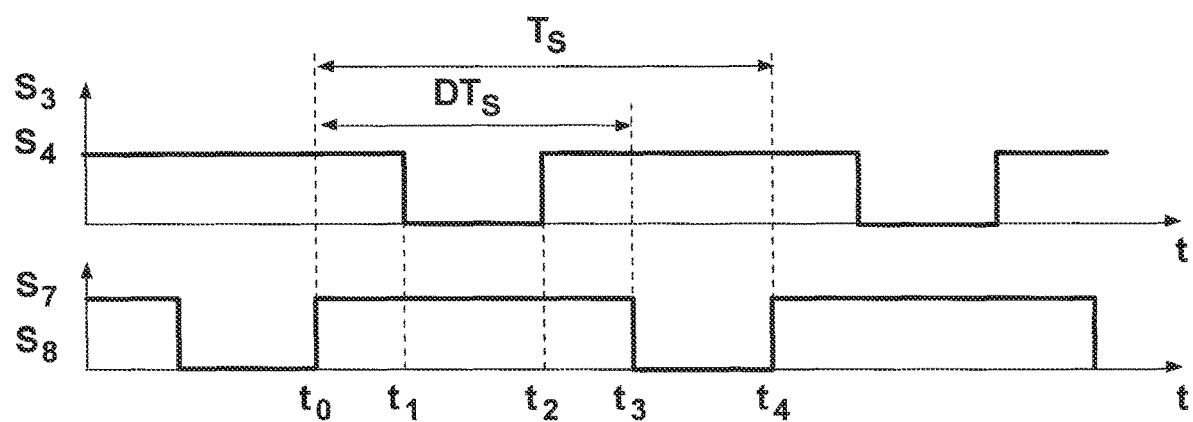
FIG. 37 shows the activation timing diagrams of the switch-activation control signals $S_3$, $S_4$, $S_7$ and $S_8$ that control switches $S_3$, $S_4$, $S_7$ and $S_8$, when input AC voltage $V_{AC}$ is in a positive half-cycle and the magnitude of input AC voltage $V_{AC}$ is less than one-quarter of output voltage $V_{DC}$ for bidirectional AC-DC power conversion system 3600 of FIG. 36, when energy is delivered from input AC voltage source $V_{AC}$ to output DC voltage $V_{DC}$.

FIGS. 37-44 illustrate AC-DC conversion operations in bidirectional AC-DC power conversion system 3600 of FIG. 36. FIG. 37 shows the activation timing diagrams of the switch-activation control signals $S_3$, $S_4$, $S_7$, and $S_8$ that control switches $S_3$, $S_4$, $S_7$, and $S_8$, when input AC voltage $V_{AC}$ is in a positive half-cycle and the magnitude of input AC voltage $V_{AC}$ is less than one-quarter output voltage $V_{DC}$ for bidirectional AC-DC power conversion system 3600 of FIG. 36, when energy is delivered from input AC voltage source $V_{AC}$ to output DC voltage $V_{DC}$. Under these operating conditions, switches $S_{P1}$, $S_{P2}$, and $S_{P3}$ are conducting, and switches $S_1$, $S_2$, $S_5$, $S_6$, $S_{N1}$, $S_{N2}$, and $S_{N3}$ are not conducting.

As shown in FIG. 37, switch-activation control signals $S_3$ and $S_4$ switch simultaneously and have the same switching waveforms, and switches $S_7$ and $S_8$ also switch simultaneously and have the same switching waveforms. Each switch-activation control signal has a duty cycle D. Switch-activation control signals $S_4$ and $S_8$ each are phase-shifted 180° relative to each other, so that the active portions of switch-activation control signals $S_3$ and $S_4$ overlap the active portions of switch-activation control signals $S_3$ and $S_4$ (i.e., D>0.5). Thus, switches $S_3$, $S_4$, $S_7$, and $S_8$ are simultaneously conducting during time intervals $(t_0, t_1)$ and $(t_2, t_3)$. The switching cycle $T_S$ is much shorter than a period of the line frequency.

Figure 38:
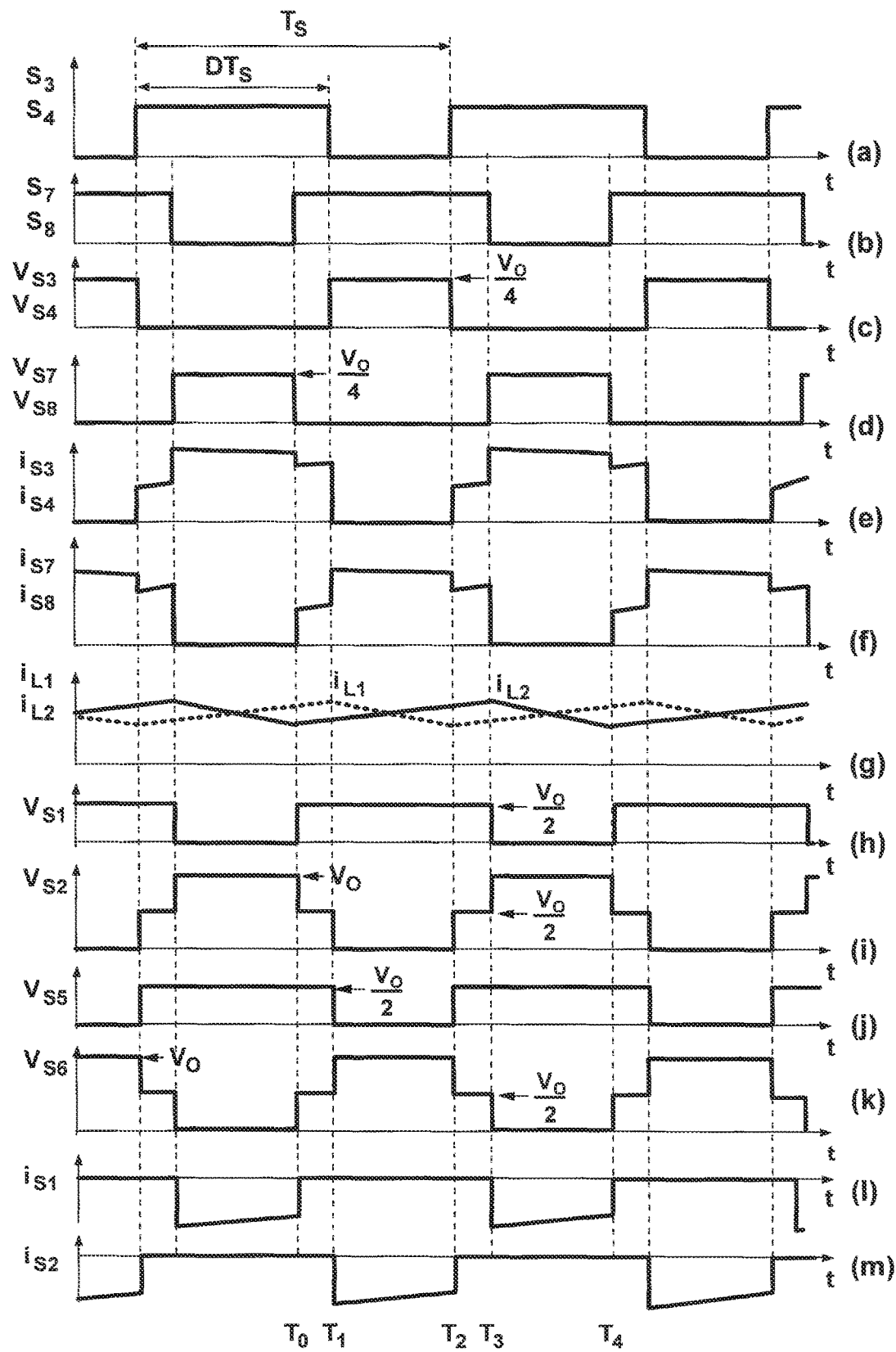
FIG. 38 shows idealized voltage and current waveforms for the elements of the bidirectional AC-DC power conversion system 3600 of FIG. 36 under the operation conditions of FIG. 37.

FIG. 38 shows idealized voltage and current waveforms for the elements of bidirectional AC-DC power conversion system 3600 of FIG. 36 under the operation conditions of FIG. 37.

Figure 39:
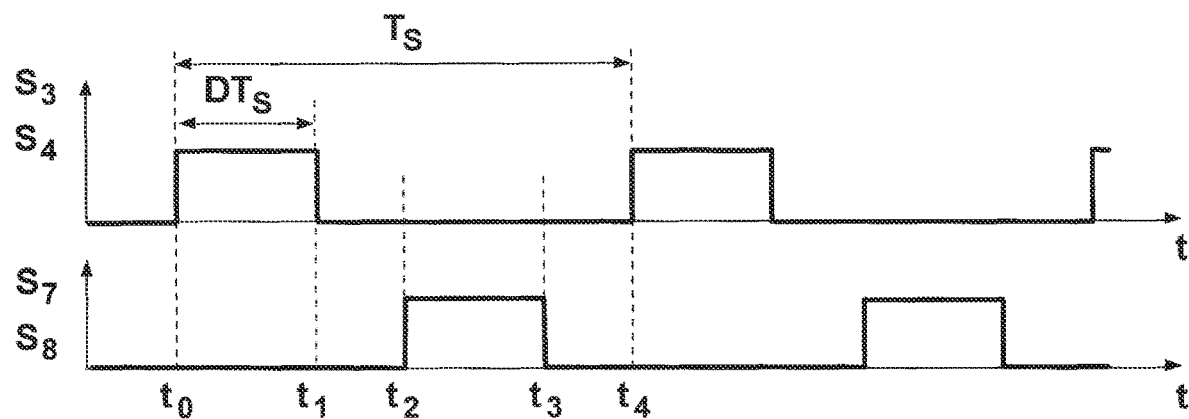
FIG. 39 is an activation timing diagram showing switch-activation control signals $S_3$, $S_4$, $S_7$, and $S_8$ that control switches $S_3$, $S_4$, $S_7$, and $S_8$ in bidirectional AC-DC power conversion system 3600 of FIG. 36, during the time interval when input voltage $V_{AC}$ is in a positive half-cycle and the magnitude of input AC voltage $V_{AC}$ is greater than one quarter output DC voltage $V_{DC}$, when energy is delivered from input AC voltage source $V_{AC}$ to output DC voltage $V_{DC}$.

FIG. 39 is an activation timing diagram showing switch-activation control signals $S_3$, $S_4$, $S_7$, and $S_8$ that control switches $S_3$, $S_4$, $S_7$, and $S_8$ in bidirectional AC-DC power conversion system 3600 of FIG. 36, during the time interval when input voltage $V_{AC}$ is in a positive half-cycle and the magnitude of input AC voltage $V_{AC}$ is greater than one quarter output DC voltage $V_{DC}$, when energy is delivered from input AC voltage source $V_{AC}$ to output DC voltage $V_{DC}$. During this time period, line-frequency switches $S_{P1}$, $S_{Pa}$, and $S_{P3}$ are conducting, and switches $S_1$, $S_2$, $S_5$, $S_6$, $S_{N1}$, $S_{N2}$, and $S_{N3}$ are not conducting.

As shown in FIG. 39, switch-activation control signals $S_3$ and $S_4$ switch simultaneously and have the same switching waveforms, and switches $S_7$ and $S_8$ also switch simultaneously and have the same switching waveforms. Each switch-activation control signal has a duty cycle D. Switch-activation control signals $S_3$ and $S_7$ are phase-shifted 180° relative to each other. The active portions of the duty cycles of switches $S_3$ and $S_7$ do not overlap (i.e., D<0.5), such that neither switch $S_3$ nor switch $S_7$ are conducting during time intervals ($t_1$, $t_2$) and ($t_3$, $t_4$). The switching cycle $T_S$ is much shorter than a period of the line frequency.

Figure 40:
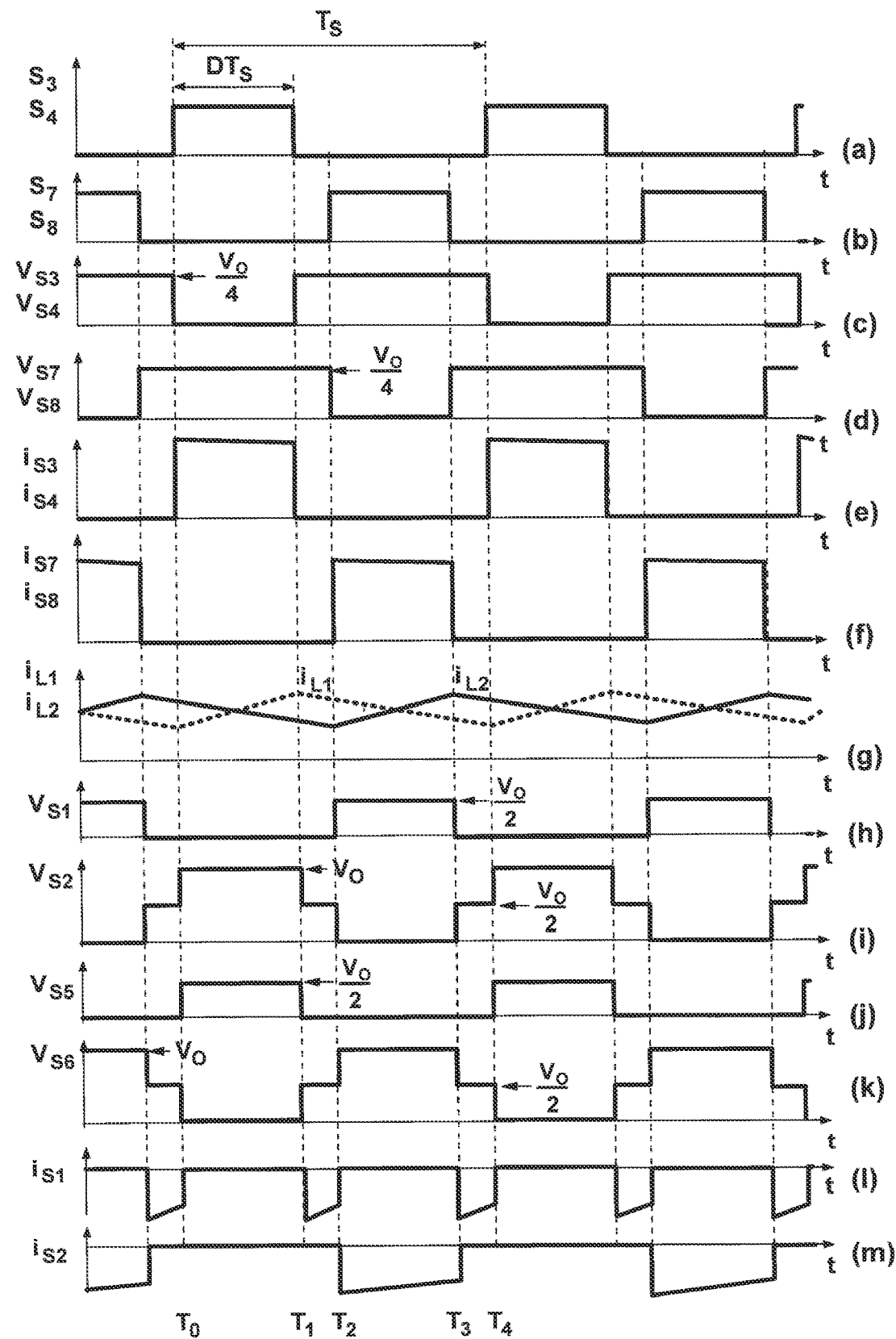
FIG. 40 shows idealized voltage and current waveforms for the elements of bidirectional AC-DC power conversion system 3600 of FIG. 36 under the operation conditions of FIG. 39.

FIG. 40 shows idealized voltage and current waveforms for the elements of bidirectional AC-DC power conversion system 3600 of FIG. 36 under the operation conditions of FIG. 39.

Figure 41:
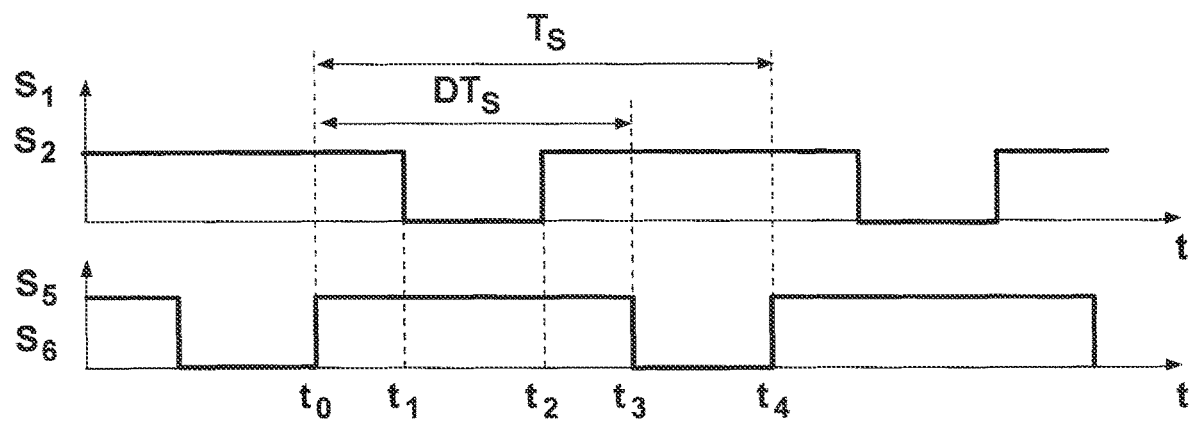
FIG. 41 shows the activation timing diagrams of the switch-activation control signals $S_1$, $S_2$, $S_5$, and $S_6$ that control switches $S_1$, $S_2$, $S_5$, and $S_6$, when input AC voltage $V_{AC}$ is in a negative half-cycle and the magnitude of input AC voltage $V_{AC}$ is less than one-quarter of output voltage $V_{DC}$ for bidirectional AC-DC power conversion system 3600 of FIG. 36, when energy is delivered from input AC voltage source $V_{AC}$ to output DC voltage $V_{DC}$.

FIG. 41 shows the activation timing diagrams of the switch-activation control signals $S_1$, $S_2$, $S_5$, and $S_6$ that control switches $S_1$, $S_2$, $S_5$, and $S_6$, when input AC voltage $V_{AC}$ is in a negative half-cycle and the magnitude of input AC voltage $V_{AC}$ is less than one-quarter output voltage $V_{DC}$ for bidirectional AC-DC power conversion system 3600 of FIG. 36, when energy is delivered from input AC voltage source $V_{AC}$ to output DC voltage $V_{DC}$. Under these operating conditions, switches $S_{N1}$, $S_{N2}$, and $S_{N3}$ are conducting, and switches $S_3$, $S_4$ $S_7$, $S_8$, $S_{P1}$, $S_{P2}$, and $S_{P3}$ are not conducting.

As shown in FIG. 41, switch-activation control signals $S_1$ and $S_2$ switch simultaneously and have the same switching waveforms, and switches $S_5$ and $S_6$ also switch simultaneously and have the same switching waveforms. Each switch-activation control signal has a duty cycle D. Switch-activation control signals $S_1$ and $S_5$ each are phase-shifted 180° relative to each other, so that the active portions of switch-activation control signals $S_1$ and $S_2$ overlap the active portions of switch-activation control signals $S_5$ and $S_6$ (i.e., D>0.5). Thus, switches $S_1$, $S_2$, $S_5$, and $S_6$ are simultaneously conducting during time intervals ($t_0$, $t_1$) and ($t_2$, $t_3$). The switching cycle $T_S$ is much shorter than a period of the line frequency.

Figure 42:
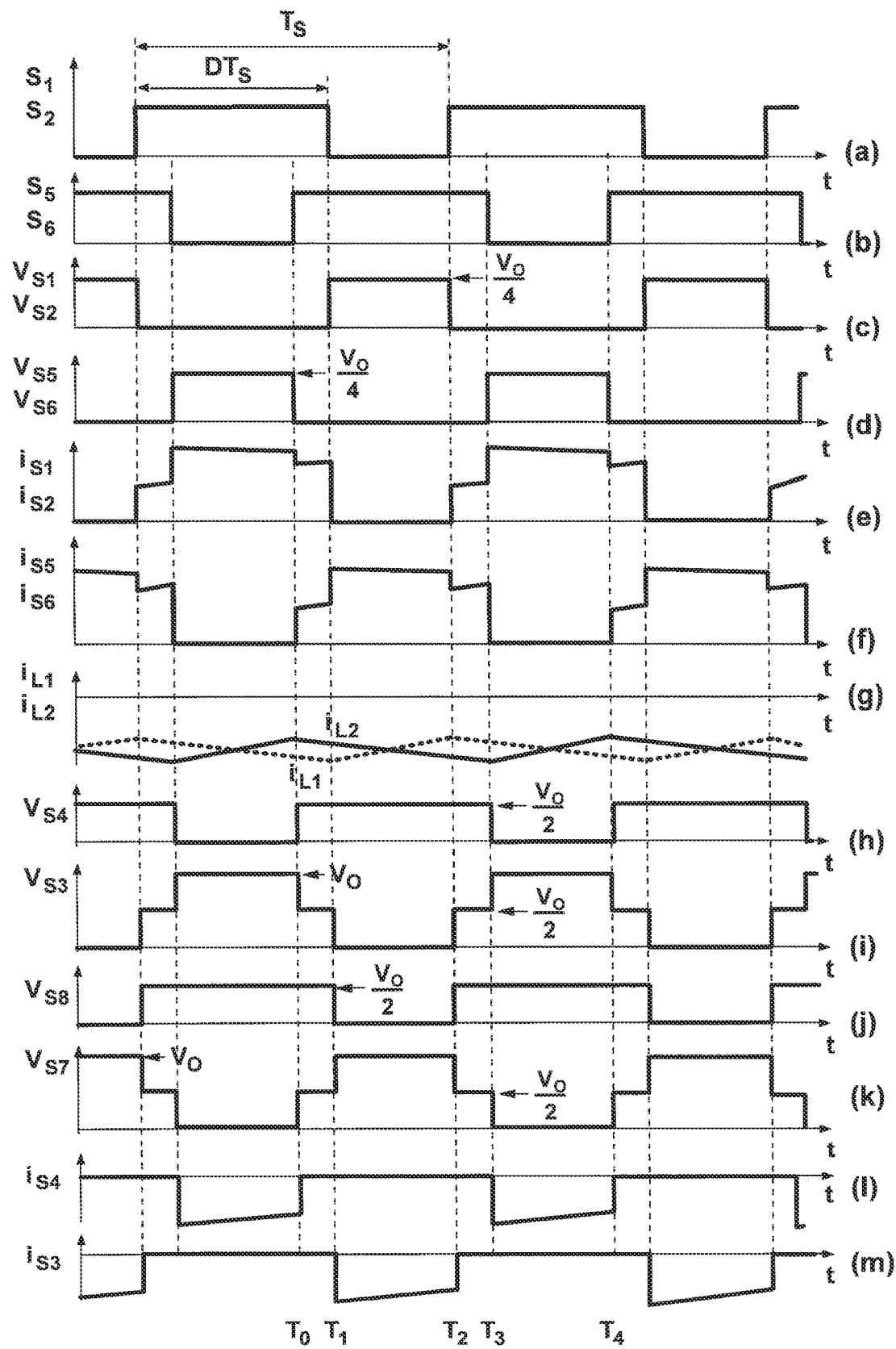
FIG. 42 shows idealized voltage and current waveforms for the elements of bidirectional AC-DC power conversion system 3600 of FIG. 36 under the operation conditions of FIG. 41.

FIG. 42 shows idealized voltage and current waveforms for the elements of bidirectional AC-DC power conversion system 3600 of FIG. 36 under the operation conditions of FIG. 41.

Figure 43:
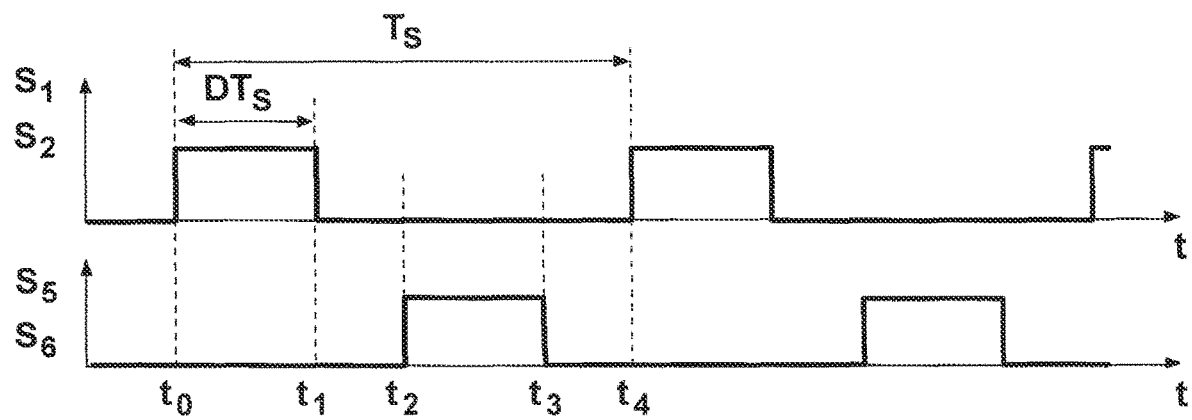
FIG. 43 is an activation timing diagram showing switch-activation control signals $S_1$, $S_2$, $S_5$, and $S_6$ that control switches $S_1$, $S_2$, $S_5$, and $S_6$ in bidirectional AC-DC power conversion system 3600 of FIG. 36, during the time interval when input voltage $V_{AC}$ is in a negative half-cycle and the magnitude of input AC voltage $V_{AC}$ is greater than one quarter output DC voltage $V_{DC}$, when energy is delivered from input AC voltage source $V_{AC}$ to output DC voltage $V_{DC}$.

FIG. 43 is an activation timing diagram showing switch-activation control signals $S_1$, $S_2$, $S_5$, and $S_6$ that control switches $S_1$, $S_2$, $S_5$, and $S_6$ in bidirectional AC-DC power conversion system 3600 of FIG. 36, during the time interval when input voltage $V_{AC}$ is in a negative half-cycle and the magnitude of input AC voltage $V_{AC}$ is greater than one quarter output DC voltage $V_{DC}$, when energy is delivered from input AC voltage source $V_{AC}$ to output DC voltage $V_{DC}$. During this time period, line-frequency switches $S_{N1}$, $S_{N2}$, and $S_{N3}$ are conducting, and switches $S_3$, $S_4$ $S_7$, $S_8$, $S_{P1}$, $S_{P2}$, and $S_{P3}$ are not conducting.

As shown in FIG. 43, switch-activation control signals $S_1$ and $S_2$ switch simultaneously and have the same switching waveforms, and switches $S_5$ and $S_6$ also switch simultaneously and have the same switching waveforms. Each switch-activation control signal has a duty cycle D. Switch-activation control signals $S_1$ and $S_5$ are phase-shifted 180° relative to each other. The active portions of the duty cycles of switches $S_1$ and $S_5$ do not overlap (i.e., D<0.5), such that neither switch $S_1$ nor switch $S_5$ are conducting during time intervals ($t_1$, $t_2$) and ($t_3$, $t_4$). The switching cycle $T_S$ is much shorter than a period of the line frequency.

Figure 44:
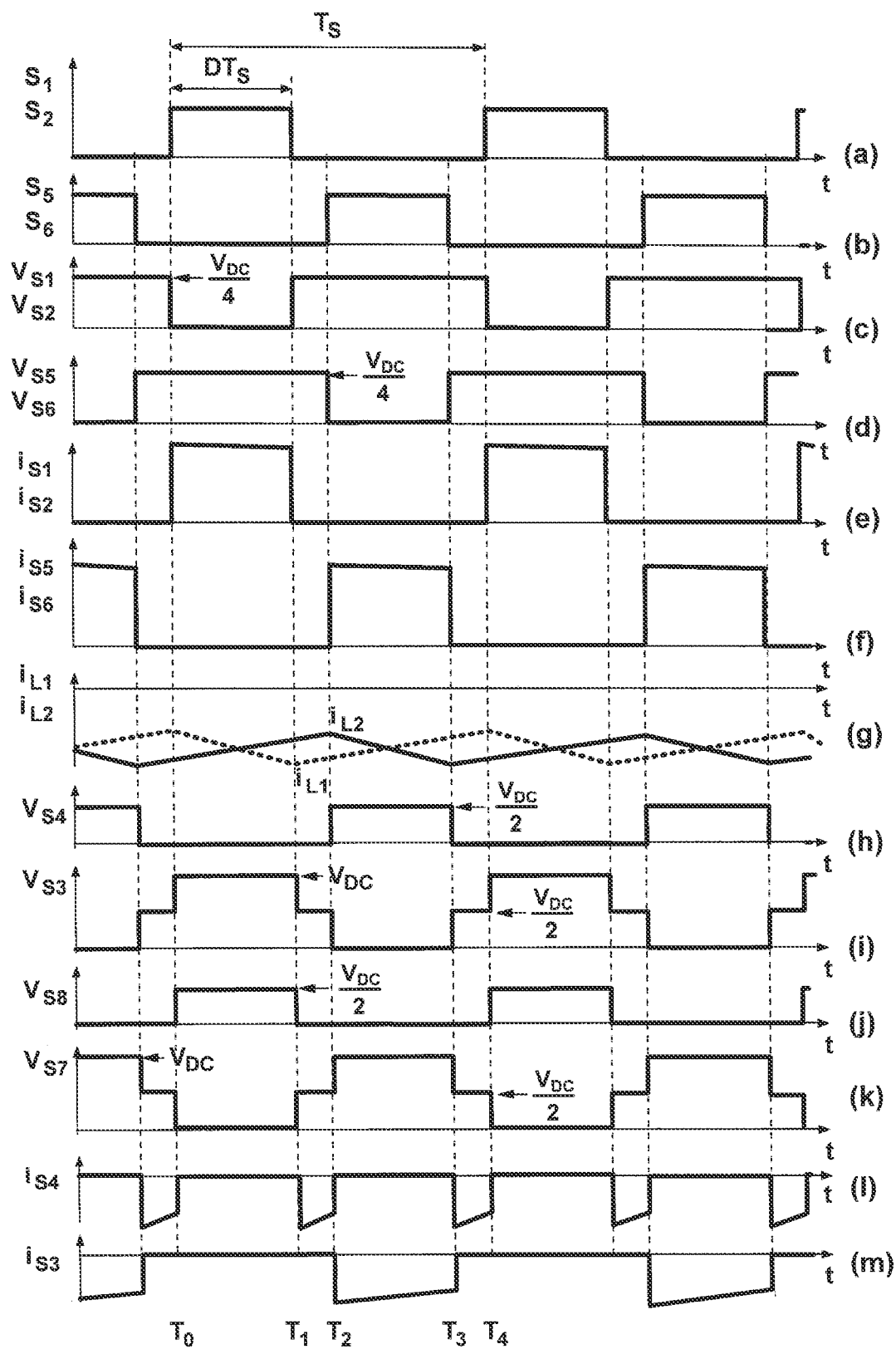
FIG. 44 shows idealized voltage and current waveforms for the elements of bidirectional AC-DC power conversion system 3600 of FIG. 36 under the operation conditions of FIG. 43.

FIG. 44 shows idealized voltage and current waveforms for the elements of bidirectional AC-DC power conversion system 3600 of FIG. 36 under the operation conditions of FIG. 43.

FIGS. 45-48 illustrate the DC-to-AC operations of bidirectional AC-DC conversion system 3600 of FIG. 36. Under DC-to-AC operations, switches $S_1$ and $S_5$ cannot be both be conducting, and switches $S_4$ and $S_8$ cannot both be conducting.

Figure 45:
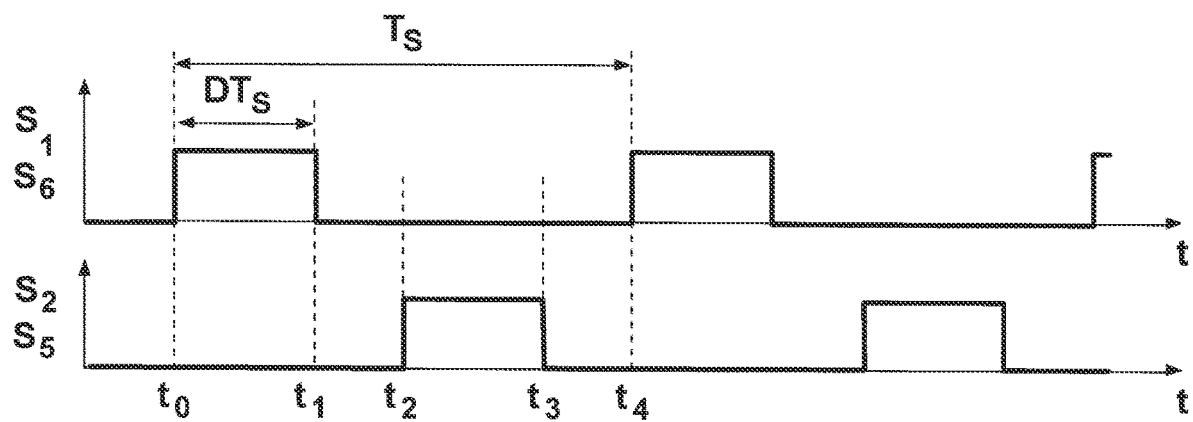
FIG. 45 is an activation timing diagram showing switch-activation control signals $S_1$, $S_2$, $S_5$, and $S_6$ that control switches $S_1$, $S_2$, $S_5$, and $S_6$ in bidirectional AC-DC power conversion system 3600 of FIG. 36, during the time interval when output voltage $V_{AC}$ is in a positive half-cycle and the magnitude of output AC voltage $V_{AC}$ is greater than one quarter input DC voltage $V_{DC}$, when energy is delivered from input DC voltage source $V_{DC}$ to output AC voltage $V_{AC}$.

FIG. 45 is an activation timing diagram showing switch-activation control signals $S_1$, $S_2$, $S_5$, and $S_6$ that control switches $S_1$, $S_2$, $S_5$, and $S_6$ in bidirectional AC-DC power conversion system 3600 of FIG. 36, during the time interval when output voltage $V_{AC}$ is in a positive half-cycle and the magnitude of output AC voltage $V_{AC}$ is greater than one quarter input DC voltage $V_{DC}$, when energy is delivered from input DC voltage source $V_{DC}$ to output AC voltage $V_{AC}$. During this time period, line-frequency switches $S_{P1}$, $S_{P2}$, and $S_{P3}$ are conducting, and switches $S_3$, $S_4$, $S_7$, $S_8$, $S_{N1}$, $S_{N2}$, and $S_{N3}$ are not conducting. As shown in FIG. 45, switch-activation control signals $S_1$ and $S_6$ switch simultaneously and have the same switching waveforms, and switches $S_2$ and $S_5$ also switch simultaneously and have the same switching waveforms. Each switch-activation control signal has a duty cycle D. Switch-activation control signals $S_1$ and $S_2$ are phase-shifted 180° relative to each other. The active portions of the duty cycles of switches $S_1$ and $S_2$ do not overlap (i.e., D<0.5), such that none of switches $S_1$, $S_2$, $S_5$, and $S_6$ are conducting during time intervals ($t_1$, $t_2$) and ($t_3$, $t_4$). The switching cycle $T_S$ is much shorter than a period of the line frequency.

Under the operating conditions of FIG. 45, during time intervals ($t_0$, $t_1$) and ($t_2$, $t_3$), AC-DC power conversion system 3600 has a topological stage which is substantially the combination of the topological stages of FIGS. 24 and 26. During time intervals ($t_1$, $t_2$) and ($t_3$, $t_4$), AC-DC power conversion system 3600 has a topological stage which is substantially the topological stage of FIG. 25.

Figure 46:
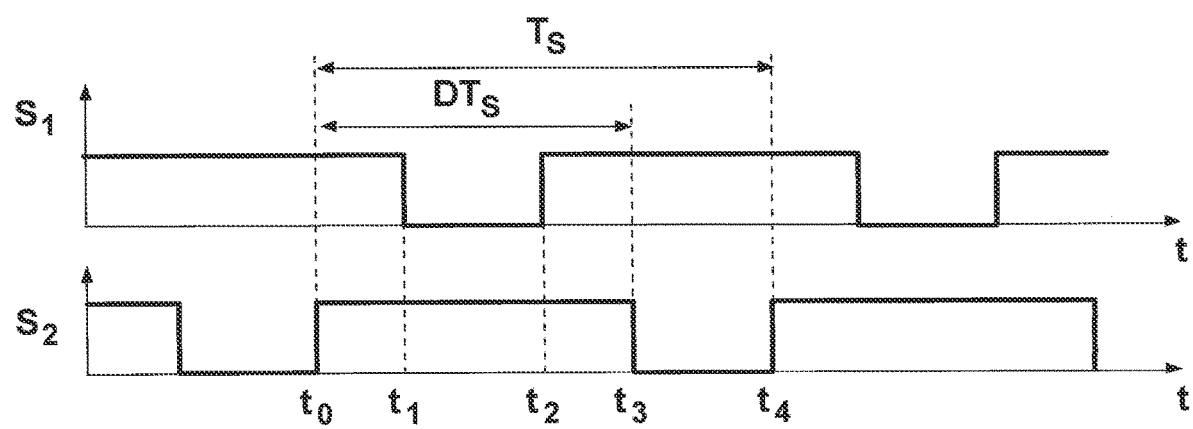
FIG. 46 shows the activation timing diagrams of the switch-activation control signals $S_1$ and $S_2$ that control switches $S_1$ and $S_2$, when output AC voltage $V_{AC}$ is in a positive half-cycle and the magnitude of output AC voltage $V_{AC}$ is greater than one-quarter input voltage $V_{DC}$ for bidirectional AC-DC power conversion system 3600 of FIG. 36, when energy is delivered from input DC voltage source $V_{DC}$ to output AC voltage $V_{AC}$.

FIG. 46 shows the activation timing diagrams of the switch-activation control signals $S_1$ and $S_2$ that control switches $S_1$ and $S_2$, when output AC voltage $V_{AC}$ is in a positive half-cycle and the magnitude of output AC voltage $V_{AC}$ is greater than one-quarter input voltage $V_{DC}$ for bidirectional AC-DC power conversion system 3600 of FIG. 36, when energy is delivered from input DC voltage source $V_{DC}$ to output AC voltage $V_{AC}$. Under these operating conditions, switches $S_{P1}$ and $S_{P3}$ are conducting, and switches $S_3$, $S_4$, $S_5$, $S_6$, $S_7$, $S_8$, $S_{P2}$, $S_{N1}$, $S_{N2}$, and $S_{N3}$ are not conducting. As shown in FIG. 46, switch-activation control signals $S_1$ and $S_2$ each have a duty cycle D. Switch-activation control signals $S_1$ and $S_2$ each are phase-shifted 180° relative to each other, so that the active portions of switch-activation control signals $S_1$ and $S_2$ overlap each other (i.e., D>0.5). Thus, switches $S_1$ and $S_2$ are simultaneously conducting during time intervals ($t_0$, $t_1$) and ($t_2$, $t_3$). The switching cycle $T_S$ is much shorter than a period of the line frequency.

Under the operating conditions of FIG. 46, during time intervals ($t_0$, $t_1$) and ($t_2$, $t_3$), AC-DC power conversion system 3600 has a topological stage which is substantially the topological stage of FIG. 28. During time intervals ($t_1$, $t_2$) and ($t_3$, $t_4$), AC-DC power conversion system 3600 has a topological stage which is substantially the topological stages of FIGS. 25 and 24, respectively.

Figure 47:
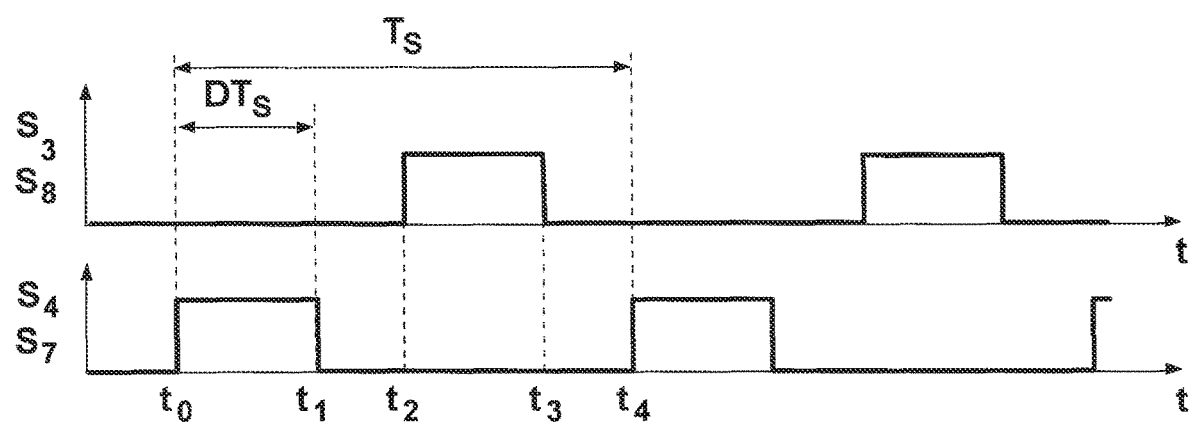
FIG. 47 is an activation timing diagram showing switch-activation control signals $S_3$, $S_4$, $S_7$, and $S_8$ that control switches $S_3$, $S_4$, $S_7$, and $S_8$ in bidirectional AC-DC power conversion system 3600 of FIG. 36, during the time interval when output voltage $V_{AC}$ is in a negative half-cycle and the magnitude of output AC voltage $V_{AC}$ is less than one quarter input DC voltage $V_{DC}$, when energy is delivered from input DC voltage source $V_{DC}$ to output AC voltage $V_{AC}$.

FIG. 47 is an activation timing diagram showing switch-activation control signals $S_3$, $S_4$, $S_7$, and $S_8$ that control switches $S_3$, $S_4$, $S_7$, and $S_8$ in bidirectional AC-DC power conversion system 3600 of FIG. 36, during the time interval when output voltage $V_{AC}$ is in a negative half-cycle and the magnitude of output AC voltage $V_{AC}$ is less than one quarter input DC voltage $V_{DC}$, when energy is delivered from input DC voltage source $V_{DC}$ to output AC voltage $V_{AC}$. During this time period, line-frequency switches $S_{N1}$, $S_{N2}$, and $S_{N3}$ are conducting, and switches $S_1$, $S_2$, $S_5$, $S_6$, $S_{P1}$, $S_{P2}$, and $S_{P3}$ are not conducting. As shown in FIG. 47, switch-activation control signals $S_3$ and $S_5$ switch simultaneously and have the same switching waveforms, and switches $S_4$ and $S_7$ also switch simultaneously and have the same switching waveforms. Each switch-activation control signal has a duty cycle D. Switch-activation control signals $S_3$ and $S_4$ are phase-shifted 180° relative to each other. The active portions of the duty cycles of switches $S_3$ and $S_4$ do not overlap (i.e., D<0.5), such that none of switches $S_3$, $S_4$, $S_7$ and $S_8$ are conducting during time intervals $(t_1, t_2)$ and $(t_3, t_4)$. The switching cycle $T_S$ is much shorter than a period of the line frequency.

Under the operating conditions of FIG. 43, during time intervals (to, and $(t_2, t_3)$, AC-DC power conversion system 3600 has a topological stage which is substantially the combination of the topological stages of FIGS. 30 and 32. During time intervals $(t_1, t_2)$ and $(t_3, t_4)$, AC-DC power conversion system 3600 has a topological stage which is substantially the topological stage of FIG. 31.

Figure 48:
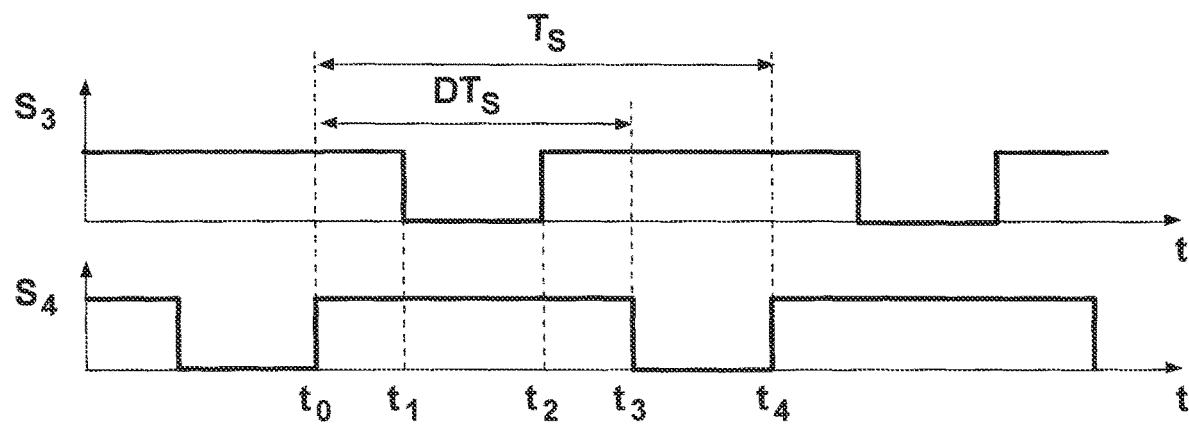
FIG. 48 shows the activation timing diagrams of the switch-activation control signals $S_3$ and $S_4$ that control switches $S_3$ and $S_4$, when output AC voltage $V_{AC}$ is in a negative half-cycle and the magnitude of output AC voltage $V_{AC}$ is greater than one-quarter input voltage $V_{DC}$ for bidirectional AC-DC power conversion system 3600 of FIG. 36, when energy is delivered from input DC voltage source $V_{DC}$ to output AC voltage $V_{AC}$.

FIG. 48 shows the activation timing diagrams of the switch-activation control signals $S_3$ and $S_4$ that control switches $S_3$ and $S_4$, when output AC voltage $V_{AC}$ is in a negative half-cycle and the magnitude of output AC voltage $V_{AC}$ is greater than one-quarter input voltage $V_{DC}$ for bidirectional AC-DC power conversion system 3600 of FIG. 36, when energy is delivered from input DC voltage source $V_{DC}$ to output AC voltage $V_{AC}$. Under these operating conditions, switches $S_{N1}$ and $S_{N3}$ are conducting, and switches $S_1$, $S_2$, $S_5$, $S_6$, $S_7$, $S_8$, $S_{N2}$, $S_{P1}$, $S_{P2}$, and $S_{P3}$ are not conducting. As shown in FIG. 48, switch-activation control signals $S_3$ and $S_4$ each have a duty cycle D. Switch-activation control signals $S_3$ and $S_4$ each are phase-shifted 180° relative to each other, so that the active portions of switch-activation control signals $S_3$ and $S_4$ overlap (i.e., D>0.5). Thus, switches $S_3$ and $S_4$ are simultaneously conducting during time intervals $(t_0, t_1)$ and $(t_2, t_3)$. The switching cycle $T_S$ is much shorter than a period of the line frequency.

Under the operating conditions of FIG. 48, during time intervals $(t_0, t_1)$ and $(t_2, t_3)$, AC-DC power conversion system 3600 has a topological stage which is substantially the topological stage of FIG. 34. During time intervals $(t_1, t_2)$ and $(t_3, t_4)$, AC-DC power conversion system 3600 has a topological stage which is substantially the topological stages of FIGS. 30 and 32, respectively.

Figure 49:
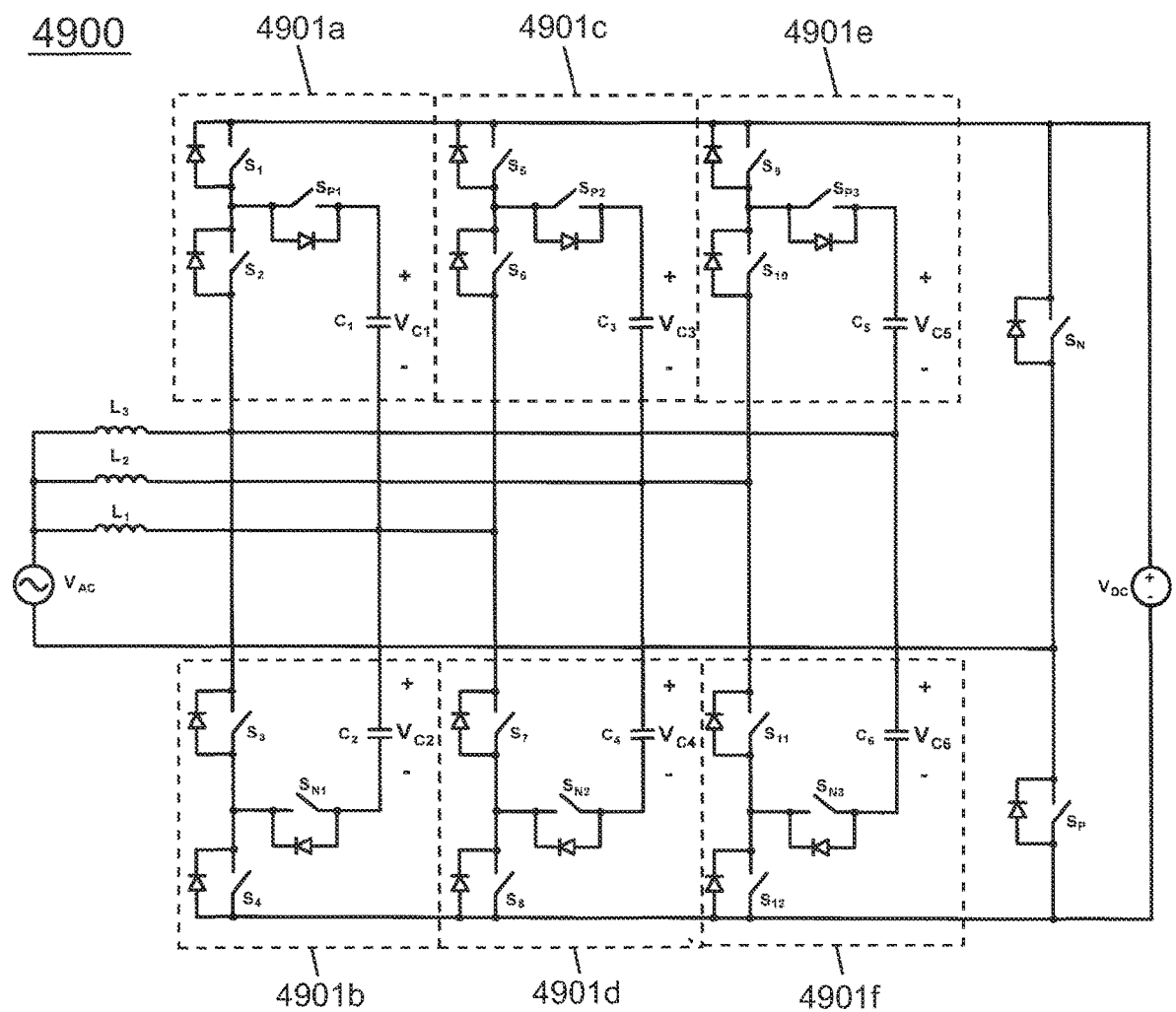
FIG. 49 shows bidirectional AC-DC power conversion system 4900 with three phase-symmetrical legs formed by voltage-doubler stages 4901a-4901f, according to one embodiment of the present invention.
Figure 50:
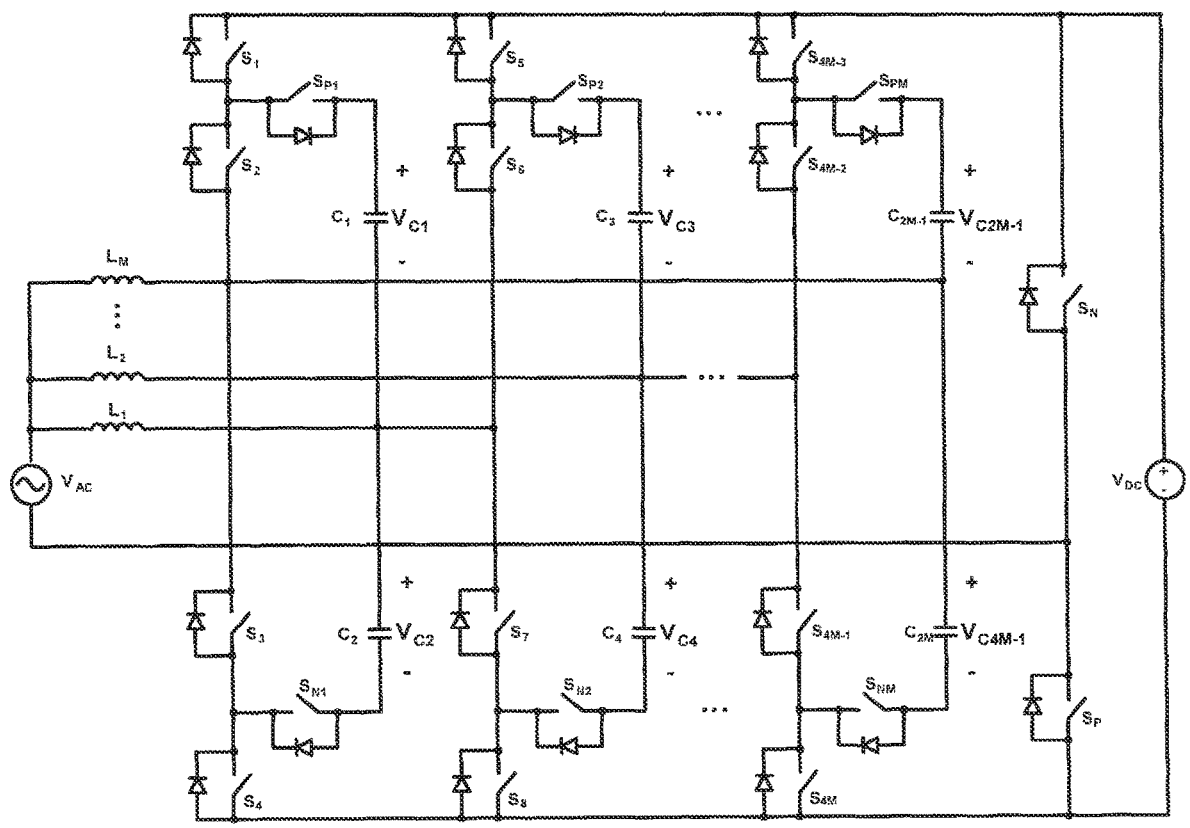
FIG. 50 shows AC-DC power conversion system 5000 with M phase-symmetrical legs, according to one embodiment of the present invention.

FIG. 49 shows bidirectional AC-DC power conversion system 4900 with three phase-symmetrical legs formed by voltage-doubler stages 4901a-4901f, according to one embodiment of the present invention. As shown in FIG. 49, as compared to AC-DC power conversion system 3600 of FIG. 36, AC-DC power conversion system 4900 has an additional phase-symmetrical leg—formed by voltage-doubler stages 4901e and 4901f—and additional inductor $L_3$. During AC-to-DC operations, the three phase-symmetrical legs may operate based on the magnitudes of input voltage $V_{DC}$ and output voltage $V_{AC}$, without limitations on duty cycle, in a manner similar to that discussed in conjunction with FIGS. 37-44. For example, the additional phase-symmetrical leg (i.e. the phase-symmetrical leg formed by voltage-doubler stages 4901e and 4901f) may operate in lock-step with one of the other phase-symmetrical legs. During DC-to-AC voltage conversion operations, however, no two of switches $S_1$, $S_5$, and $S_9$ can be simultaneously conducting and no two of switches $S_4$, $S_5$, and $S_{12}$ can be simultaneously conducting. As a result, during DC-to-AC operations, only one of the phase-symmetrical leg, (e.g., switches $S_1$, $S_2$, $S_3$, and $S_4$) may operate under a duty cycle greater than 0.5, substantially as illustrated in FIGS. 46 and 48 for bidirectional AC-DC conversion system 3600. The number of phase-symmetrical legs in a bidirectional AC-DC conversion system of the present invention may be extended to any desirable number for applications that require high power delivery. For example, FIG. 50 shows AC-DC power conversion system 5000 with M phase-symmetrical legs, according to one embodiment of the present invention. The greater number of phase-symmetrical legs (i.e., the pairs of switches and energy storage devices desired) reduces current stress in each voltage-doubler stage. Also, multiple bidirectional AC-DC power conversion systems may be connected in parallel for high current applications.

Figure 51:
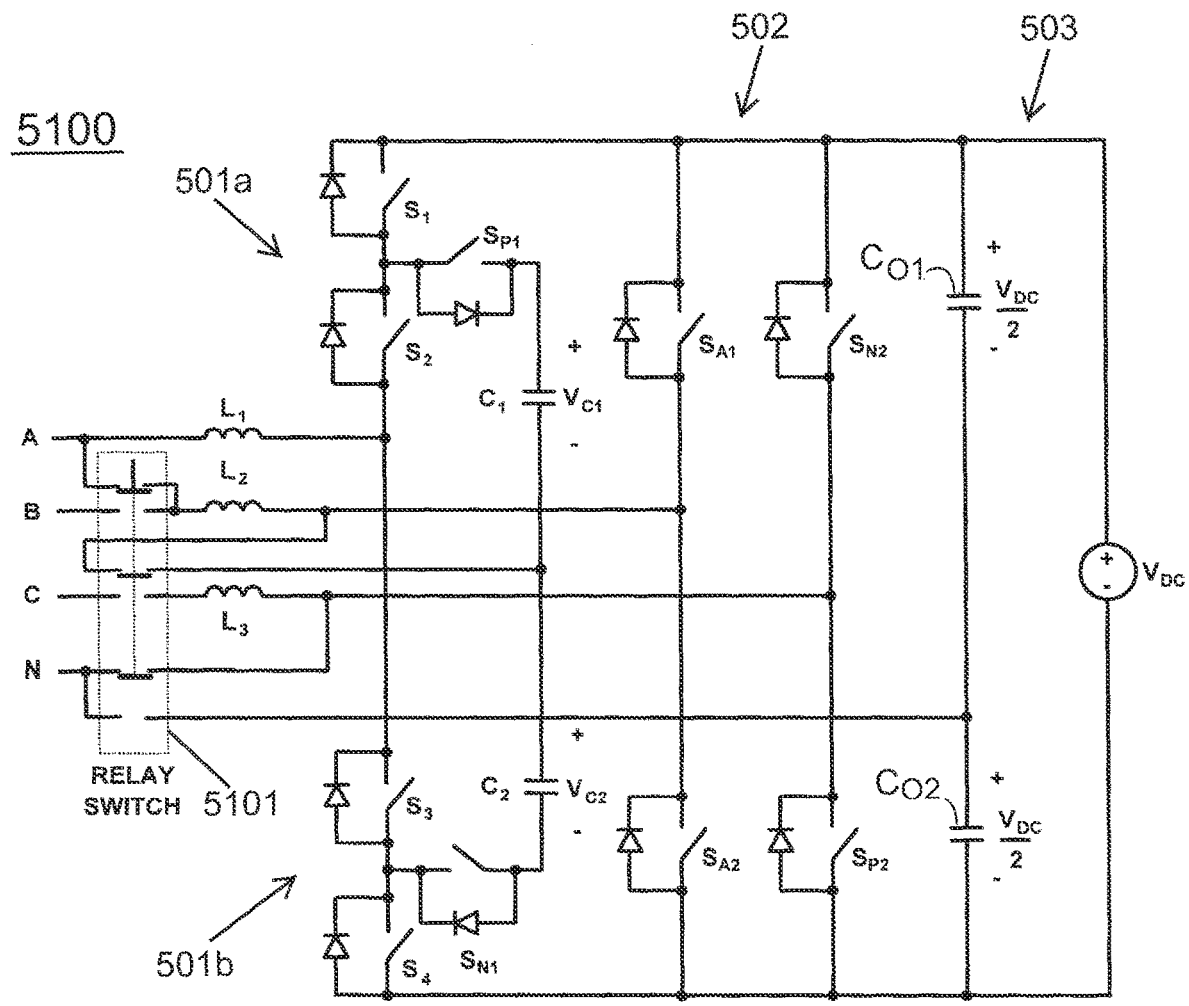
FIG. 51 shows bidirectional AC-DC power conversion system 5100, according to another embodiment of the present invention.
Figure 52:
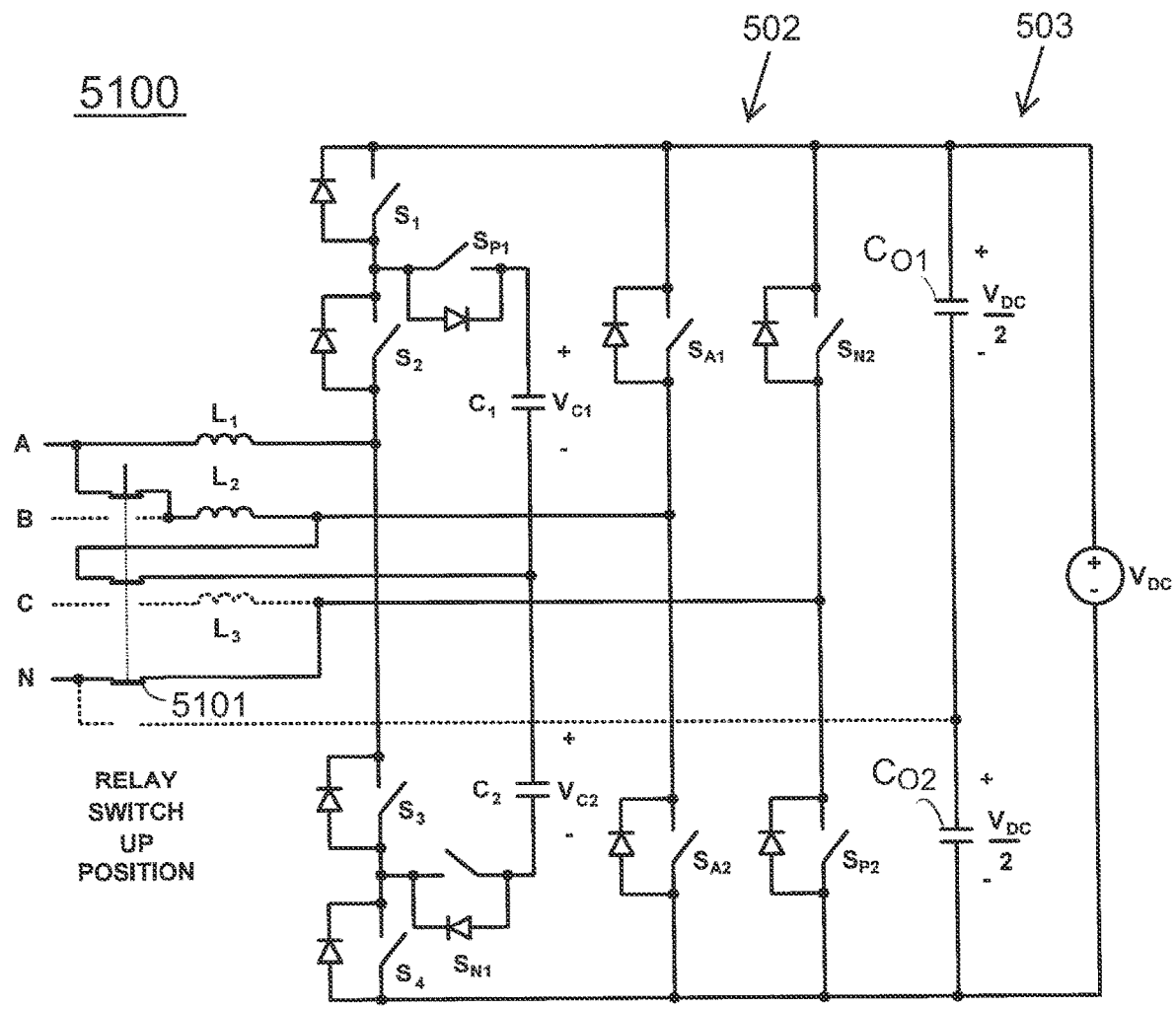
FIG. 52 shows the circuit configuration of bidirectional AC-DC power conversion system 5100, when relay switch 5100 is in the "up" position, for receiving a single-phase AC voltage $V_{AC}$ coupled between terminals A and N.
Figure 53:
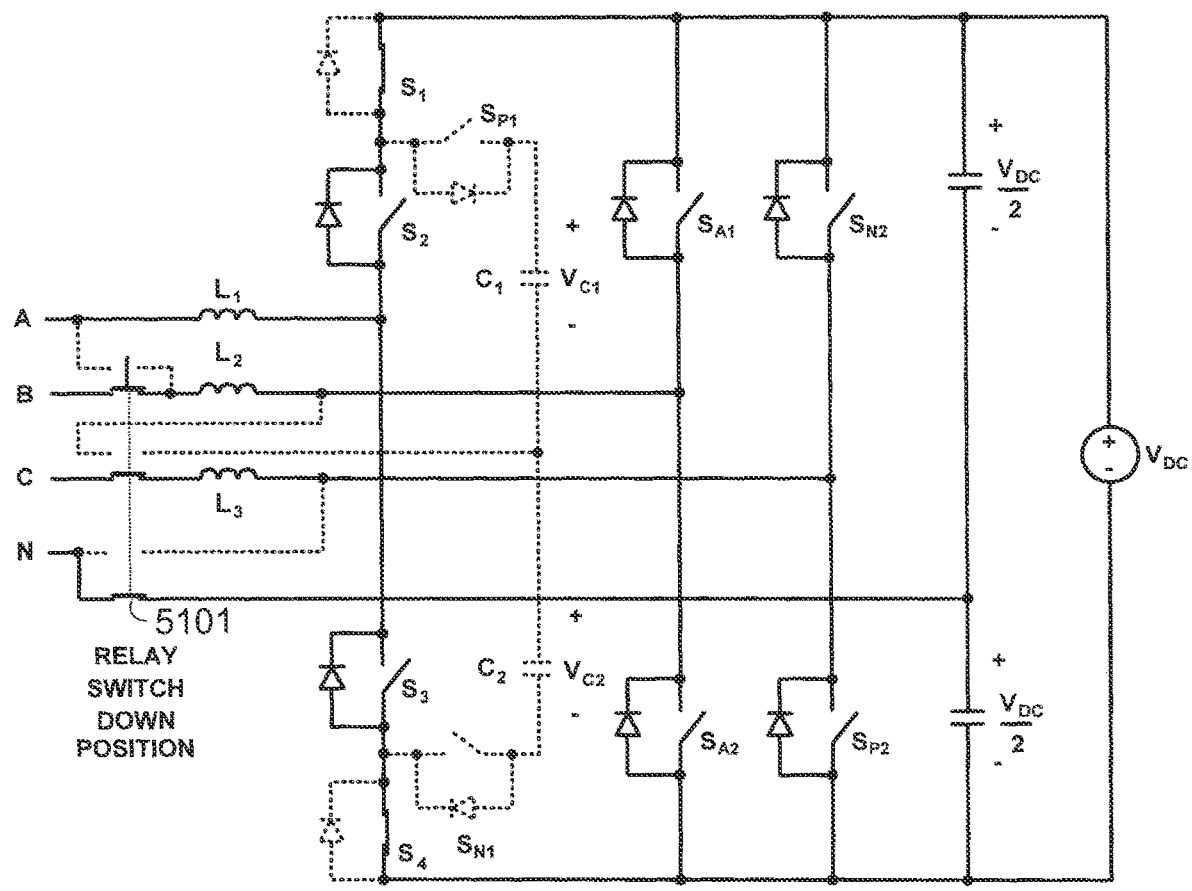
FIG. 53 shows the circuit configuration of bidirectional AC-DC power conversion system 5100, when relay switch 5100 is in the "down" position, for receiving a three-phase AC voltage $V_{AC}$, with the phases being coupled between terminals A and N, B and N, and C and N, respectively.

FIG. 51 shows bidirectional AC-DC power conversion system 5100, according to another embodiment of the present invention. As shown in FIG. 51, bidirectional AC-DC power conversion system 5100 introduces relay switch 5101, inductors $L_3$, and output capacitors $C_{O1}$ and $C_{o2}$ into bidirectional AC-DC power conversion system 2200 of FIG. 22. Relay switch 5101 allows bidirectional AC-DC conversion system to receive either a single-phase AC source or a three-phase AC source. Bidirectional AC-DC power conversion system 5100 may be used to implement, for example, a battery charger for an electric vehicle (EV) that can accept both 400-volt, single-phase outlets and 800-volt, three-phase AC outlets. FIGS. 52 and 53 show, respectively, the circuit configurations of bidirectional AC-DC power conversion system 5100 under the two positions of relay switch 5101. It should be noted that capacitors $C_1$ and $C_2$ are disconnected by the relay when it operates from 3-phase input.

FIG. 52 shows the circuit configuration of bidirectional AC-DC power conversion system 5100, when relay switch 5101 is in the "up" position, for receiving a single-phase AC voltage $V_{AC}$ coupled between terminals A and N. In this circuit configuration, relay switch 5101 renders inductor $L_3$ in active, so that bidirectional AC-DC power conversion system 5100 operates substantially in the same manner as bidirectional AC-DC power conversion system 2200 of FIG. 22, as described in conjunction with FIGS. 23-35.

FIG. 53 shows the circuit configuration of bidirectional AC-DC power conversion system 5100, when relay switch 5101 is in the "down" position, for receiving a three-phase AC voltage $V_{AC}$, with the phases being coupled between terminals A and N, B and N, and C and N, respectively. In this configuration, switches $S_1$ and $S_4$ are conducting, such that switches $S_{N1}$ and $S_{P1}$, and capacitors $C_1$ and $C_2$ are rendered inactive, and AC-DC power conversion system 5100 operates substantially as a 6-switch, 3-phase PFC circuit known to those of ordinary skill in the art.

Figure 54:
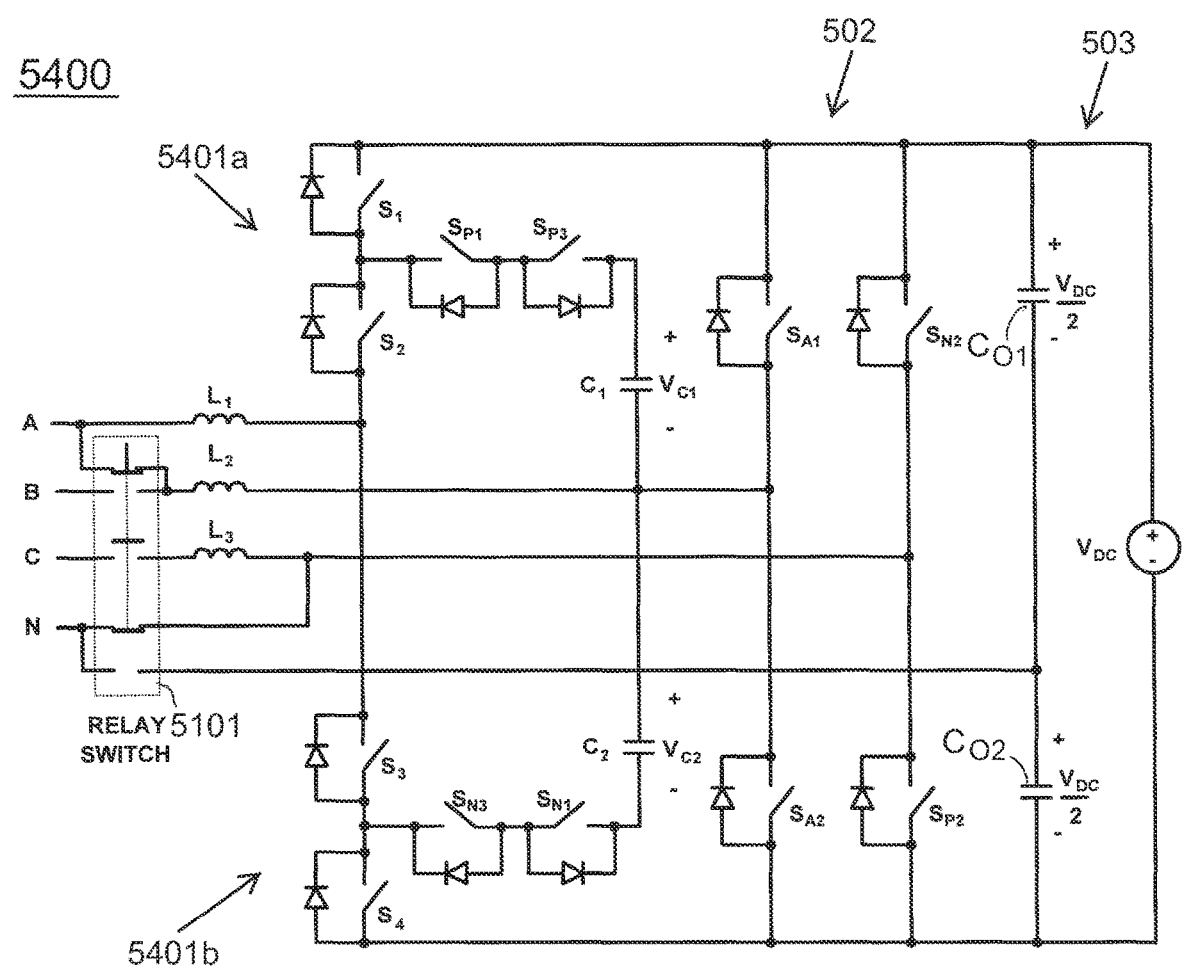
FIG. 54 shows bidirectional AC-DC power conversion system 5400, according to another embodiment of the present invention.

FIG. 54 shows bidirectional AC-DC power conversion system 5400, according to another embodiment of the present invention. Bidirectional AC-DC power conversion system 5400 replaces switches $S_{P1}$ and $S_{N1}$ in voltage-doubler stages 501a and 501b of bidirectional AC-DC power conversion system 5100 of FIG. 51 by bidirectional switches. As shown in FIG. 54, voltage-doubler stages 5401a includes a bidirectional switch that comprises switch devices $S_{P1}$ and $S_{P3}$. Likewise, voltage-doubler stages 5401b includes a bidirectional switch that comprises switch devices $S_{N1}$ and $S_{N3}$. As the body diodes in each bidirectional switch are oriented in opposite directions, substantially no current flows in either direction when the bidirectional switch is open. In FIG. 54, the bidirectional switch of voltage-doubler stage 5401a is formed by connected semiconductor switch devices $S_{P1}$ and Spa, with their body diodes connected in opposite polarities. Likewise, the bidirectional switch of voltage-doubler stages 5401b is formed by connected semiconductor switch devices $S_{N1}$ and $S_{N3}$, with their body diodes connected in opposite polarities.

Figure 55:
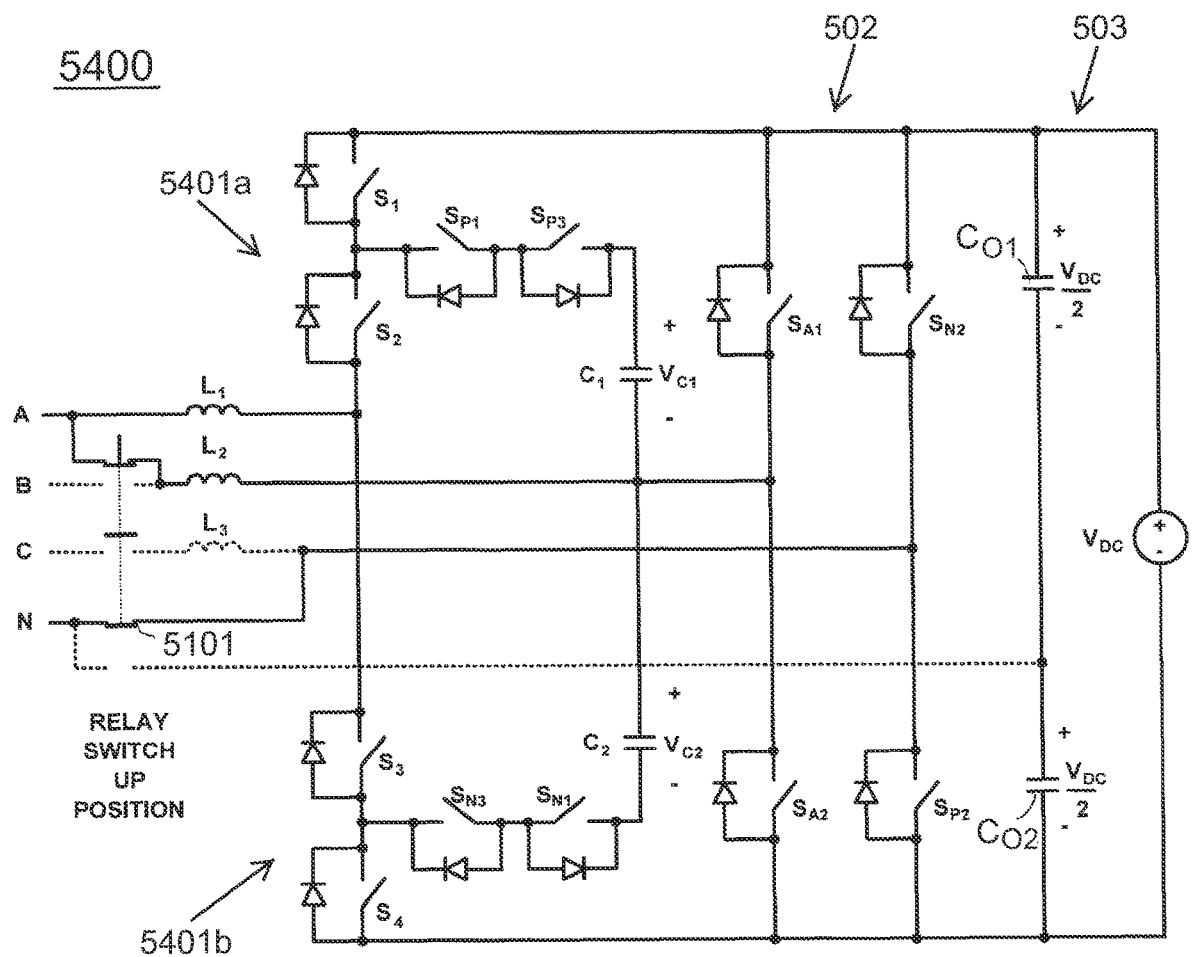
FIG. 55 shows the circuit configuration of bidirectional AC-DC power conversion system 5400, when relay switch 5101 is in the "up" position, for receiving a single-phase AC voltage $V_{AC}$ coupled between terminals A and N.

FIG. 55 shows the circuit configuration of bidirectional AC-DC power conversion system 5400, when relay switch 5101 is in the "up" position, for receiving a single-phase AC voltage $V_{AC}$ coupled between terminals A and N. During AC-to-DC operations, switches $S_{P3}$ and $S_{P1}$ are activated simultaneously. Likewise, during AC-to-DC operations, switches $S_{N3}$ and $S_{N1}$ are activated simultaneously. In this configuration, relay switch 5101 renders inductor $L_3$ inactive.

Figure 56:
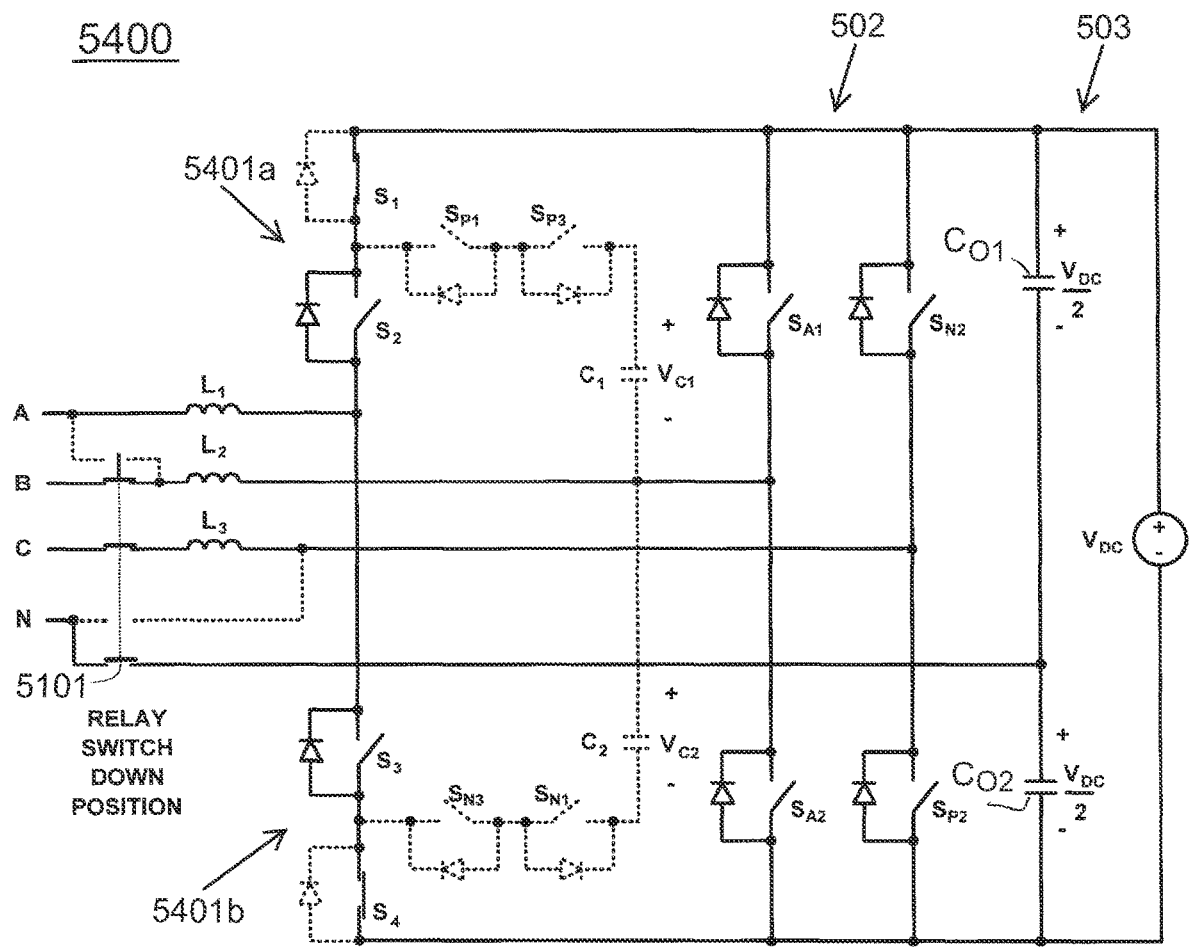
FIG. 56 shows the circuit configuration of bidirectional AC-DC power conversion system 5400, when relay switch 5101 is in the "down" position, for receiving a three-phase AC voltage $V_{AC}$, with the phases being coupled between terminals A and N, B and N, and C and N, respectively.

FIG. 56 shows the circuit configuration of bidirectional AC-DC power conversion system 5400, when relay switch 5101 is in the "down" position, for receiving a three-phase AC voltage $V_{AC}$, with the phases being coupled between terminals A and N, B and N, and C and N, respectively. In this configuration, switches $S_1$ and $S_4$ are conducting, such that bidirectional switches (i.e., switches $S_{N1}$, $S_{N3}$, $S_{P1}$ and $S_{P3}$) and capacitors $C_1$ and $C_2$ are rendered inactive, and AC-DC power conversion system 5400 operates substantially as a 6-switch, 3-phase PFC circuit known to those of ordinary skill in the art. As the body diodes of each bidirectional switch are oriented in opposite directions, no current flows through disconnected capacitors $C_1$ and $C_2$, when the bidirectional switches are open. This level of isolation is preferred in some applications.

The above detailed description is provided to illustrate the various embodiments of the present invention and is not intended to be limiting. Numerous variations and modifications within the scope of the present invention are possible. The scope of the present invention is set forth in the following claims.

We claim:

1. An AC-DC power conversion system, comprising:
an AC-stage comprising first and second terminals;
first and second inductors;
first and second voltage-doubler stages, each voltage-doubler stage comprising a first terminal, a second terminal, a third terminal, a capacitor and first, second, and third switches, wherein the first terminal of the AC-stage is coupled by the first inductor to the first terminal of each voltage-doubler stage and by the second inductor to the third terminal of each voltage-doubler stage, and wherein the first and second switches of the voltage-doubler stage are connected in series across the first and second terminals of the voltage-doubler stage, and the first and second switches of the voltage-doubler stage are connected at a common node, and wherein the third switch and the capacitor of the voltage-doubler stage are connected in series between the common node and the third terminal of the voltage-doubler stage;
a totem-pole rectifier stage having first and second terminals coupled, respectively, to the second terminal of the first voltage-doubler stage and the second terminal of the second voltage-doubler stage; and
a DC-stage coupled across the totem-pole rectifier stage.

2. The AC-DC power conversion system of claim 1, wherein the totem-pole rectifier stage comprises first and second half-bridge legs each comprising first and second components serially connected at a common terminal, wherein the second terminal of the AC-stage is coupled to the common terminal of the second half-bridge leg, and the common terminal of the first half-bridge leg is coupled to the third terminal of each voltage-doubler stage.

3. The AC-DC power conversion system of claim 2, wherein the first and second components of the first and second half-bridge legs of the totem-pole rectifier stage comprise synchronous rectifiers.

4. The AC-DC power conversion system of claim 2, wherein the first and second components of one of the first and second half-bridge legs of the totem-pole rectifier stage comprise diodes.

5. The AC-DC power conversion system of claim 1, wherein the third switch operates in a signal frequency of the AC-stage.

6. The AC-DC power conversion system of claim 1, wherein each voltage-doubler stage further comprises a balance resistor connected across the capacitor of the voltage-doubler stage.

7. The AC-DC power conversion system of claim 1, wherein each voltage-doubler stage further comprises a pre-charge resistor connecting between the second terminal of the voltage-doubler stage and a terminal of the capacitor.

8. The AC-DC power conversion system of claim 1, wherein the third switch of each voltage-doubler stage comprises a bidirectional switch.

9. The AC-DC power conversion system of claim 8, wherein the bidirectional switch comprises two connected semiconductor switch devices connected, with respective body diodes connected in opposite polarities.

10. The AC-DC power conversion system of claim 1 wherein, during a AC-to-DC operation, the AC-DC power conversion system achieves a gain determined by operating the first and second switches of each voltage-doubler stage at predetermined duty cycles.

11. The AC-DC power conversion system of claim 10, wherein both predetermined duty cycles at each voltage-doubler stage exceed 0.5.

12. The AC-DC power conversion system of claim 1 wherein, during a DC-to-AC operation, at least one of the first and second switches of each voltage-doubler stage is open at any given time.

13. The AC-DC power conversion system of claim 1, wherein the first and second voltage-doubler stages form a first phase-symmetrical leg and wherein the AC-DC power conversion system further comprises a second phase-symmetrical leg connected between the AC-stage and the totem-pole rectifier stage.

14. The AC-DC power conversion system of claim 13, wherein the totem-pole rectifier stage comprises a half-bridge leg that includes first and second components serially connected at a common terminal, wherein the second terminal of the AC-stage is coupled to the common terminal of the half-bridge leg.

15. The AC-DC power conversion system of claim 14, wherein the second phase-symmetrical leg comprises first and second voltage-doubler stages substantially identical, respectively, to the first and second voltage-doubler stages of the first phase-symmetrical leg, and wherein the first and third terminals of each voltage-doubler stage of the second phase-symmetrical leg are connected, respectively, to the second and first inductors to the first terminal of the AC-stage.

16. The AC-DC power conversion system of claim 15, further comprising a third inductor and a third phase-symmetrical leg, wherein (i) the third phase-symmetrical leg comprises first and second voltage-doubler stages substantially identical, respectively, to the first and second voltage-doubler stages of the first phase-symmetrical leg, (ii) the first terminal of each voltage-doubler stage of the third phase-symmetrical leg is connected by the third inductor to the first terminal of the AC-stage, and (iii) the third terminal of each voltage-doubler stage of the third phase-symmetrical leg is connected to the first terminal of each voltage-doubler stage of the second phase-symmetrical leg.

17. The AC-DC power conversion system of claim 1, wherein the DC-stage comprises an output capacitor.

18. An AC-DC power conversion system, comprising:
an AC-stage comprising a switching element and first, second, third, and neutral terminals;
first, second, and third inductors;
first and second voltage-doubler stages, each voltage-doubler stage comprising a first terminal, a second terminal, a third terminal, a capacitor and first, second, and third switches, wherein the first and second switches of the voltage-doubler stage are connected in series across the first and second terminals of the voltage-doubler stage, and the first and second switches of the voltage-doubler stage are connected at a common node, and wherein the third switch and the capacitor of the voltage-doubler stage are connected in series between the common node and the third terminal of the voltage-doubler stage;
a totem-pole rectifier stage comprising first and second half-bridge legs, each half-bridge leg (i) being connected between the second terminal of the first voltage-doubler stage and the second terminal of the second voltage-doubler stage, and (ii) comprising first and second components serially connected at a common terminal; and
a DC-stage coupled across the totem-pole rectifier stage, wherein the DC-stage comprises first and second serially connected capacitors connected at a common terminal;
wherein the switching element has first and second configurations, such that (i) in the first configuration, (a) the first terminal of the AC-stage is coupled by the first inductor to the first terminal of each voltage-doubler stage and by the second inductor to both the third terminal of each voltage-doubler stage and the common terminal of the first half-bridge leg, and (b) the neutral terminal is coupled to the common terminal of the second half-bridge leg; and (ii) in the second configuration, (a) the first terminal of the AC-stage is coupled by the first inductor to the first terminal of each voltage-doubler stage, (b) the second terminal of the AC-stage is coupled by the second inductor to the common terminal of the first half-bridge leg, (c) the third terminal of the AC-stage is coupled by the third inductor to the common terminal of the second half-bridge leg, and (d) the neutral terminal is coupled to the common terminal of the DC-stage.

19. The AC-DC power conversion system of claim 18, wherein the third switch operates in a signal frequency of the AC-stage.

20. The AC-DC power conversion system of claim 18, wherein the third switch of each voltage-doubler stage comprises a bidirectional switch.

21. The AC-DC power conversion system of claim 20, wherein the bidirectional switch comprises two connected semiconductor switch devices connected with respective body diodes connected in opposite polarities.

22. The AC-DC power conversion system of claim 18, wherein the switching element comprises a relay switch.

23. The AC-DC power conversion system of claim 18, wherein, in the first configuration, the AC-stage receives single-phase AC input power.

24. The AC-DC power conversion system of claim 18, wherein, in the second configuration, the AC-stage receives three-phase AC input power.

* * * * *